United States Patent [19]

Ogawa et al.

[11] Patent Number: 4,716,543

[45] Date of Patent: Dec. 29, 1987

[54] TERMINAL DEVICE FOR EDITING DOCUMENT AND COMMUNICATING DATA

[75] Inventors: Toshiya Ogawa, Kawasaki; Hiroaki Ueno, Tsuchiura; Toshiaki Yamada, Kawasaki; Tomoyuki Haganuma, Yokohama, all of Japan

[73] Assignee: Ricoh Company, Ltd., Tokyo, Japan

[21] Appl. No.: 453,024

[22] Filed: Dec. 27, 1982

[30] Foreign Application Priority Data

Dec. 29, 1981 [JP] Japan .............................. 56-212194
Feb. 24, 1982 [JP] Japan .............................. 57-27504

[51] Int. Cl.[4] ............................................. G06F 3/00
[52] U.S. Cl. ................................................ 364/900
[58] Field of Search ... 364/200 MS File, 900 MS File

[56] References Cited

U.S. PATENT DOCUMENTS

| | | | |
|---|---|---|---|
| 4,180,854 | 12/1979 | Walden et al. | 364/200 |
| 4,193,112 | 3/1980 | Gilbert et al. | 364/200 |
| 4,195,353 | 3/1980 | Abe et al. | 364/900 |
| 4,296,476 | 10/1981 | Mayer et al. | 364/900 |
| 4,298,957 | 11/1981 | Duvall et al. | 364/900 |
| 4,398,246 | 8/1983 | Frediani et al. | 364/900 |
| 4,399,538 | 8/1983 | Cholakian et al. | 371/66 |
| 4,433,377 | 2/1984 | Eustis et al. | 364/200 |
| 4,435,774 | 3/1984 | Mayer et al. | 364/900 |
| 4,451,900 | 5/1984 | Mayer et al. | 364/900 |
| 4,458,311 | 7/1984 | Clements et al. | 364/200 |
| 4,534,012 | 8/1985 | Yokozawa | 364/900 |
| 4,553,223 | 11/1985 | Bouhelier et al. | 364/900 |

*Primary Examiner*—Thomas M. Heckler
*Attorney, Agent, or Firm*—David G. Alexander

[57] ABSTRACT

A terminal device capable of preparing a document and communicating data includes a system control section having storage means in which are resident a control program for outputting received document data either to an output section or an external storage, and a supervisor program for alternately practicing the control program and another program necessary for system control. Based on these resident programs, the system control is practiced to permit received document data to be fed to the output section or the external storage even when local work such as preparation of a document is under way. When printing operation is disabled due to a failure in a printer of the output section or the like after the received document data has been loaded in a memory of the communication control, the document data is immediately delivered to the external storage to open the document data storage area. Power is supplied only to the equipments which are indispensable for storing received document data in the memory, except for the duration of any local work such as preparation of document data.

18 Claims, 51 Drawing Figures

Fig. 10

| b3 | b2 | b1 | b0 | #\* | b7=0 b6=0 b5=0 b4=0 / 0 | 0 0 0 1 / 1 | 0 0 1 0 / 2 | 0 0 1 1 / 3 | 0 1 0 0 / 4 | 0 1 0 1 / 5 | 0 1 1 0 / 6 | 0 1 1 1 / 7 | 1 0 0 0 / 8 | 1 0 0 1 / 9 | 1 0 1 0 / A | 1 0 1 1 / B | 1 1 0 0 / C | 1 1 0 1 / D | 1 1 1 0 / E | 1 1 1 1 / F |
|---|---|---|---|---|---|---|---|---|---|---|---|---|---|---|---|---|---|---|---|---|
| 0 | 0 | 0 | 0 | 0 |   |   | SP | 0 | $\mu$ | P | ² | p | SYMB | JUSTI |   |   |   |   |   |   |
| 0 | 0 | 0 | 1 | 1 |   |   | ! | 1 | A | Q | a | q | DIAC | XXX |   |   |   |   |   |   |
| 0 | 0 | 1 | 0 | 2 |   | 田 | " | 2 | B | R | b | r | TELEX | x |   |   |   |   |   |   |
| 0 | 0 | 1 | 1 | 3 | 뫈 | — | # | 3 | C | S | c | s | ↔ | BLOCK |   |   |   |   |   |   |
| 0 | 1 | 0 | 0 | 4 | — |   | $ | 4 | D | T | d | t |   | LINE |   |   |   |   |   |   |
| 0 | 1 | 0 | 1 | 5 | ! |   | % | 5 | E | U | e | u | 10 | WORD |   |   |   |   |   |   |
| 0 | 1 | 1 | 0 | 6 |   |   | & | 6 | F | V | f | v | 12 | CHAR |   |   |   |   |   |   |
| 0 | 1 | 1 | 1 | 7 |   | · | ' | 7 | G | W | g | w | 15 | SEND |   |   |   |   |   |   |
| 1 | 0 | 0 | 0 | 8 |   | ↓ | ( | 8 | H | X | h | x | 1 | PRINT |   |   |   |   |   |   |
| 1 | 0 | 0 | 1 | 9 |   |   | ) | 9 | I | Y | i | y | 1.5 | SEARC |   |   |   |   |   |   |
| 1 | 0 | 1 | 0 | A | ⇒ |   | ∗ | : | J | Z | j | z | 2 | MERGE |   |   |   |   |   |   |
| 1 | 0 | 1 | 1 | B |   | ESC | + | ; | K | Ä | k | ä | LHM | CENTE |   |   |   |   |   |   |
| 1 | 1 | 0 | 0 | C |   |   | , | § | L | Ö | l | ö | RHM | ▭ |   |   |   |   |   |   |
| 1 | 1 | 0 | 1 | D | ↵ |   | - | = | M | Ü | m | ü | +TAB | ▯ |   |   |   |   |   |   |
| 1 | 1 | 1 | 0 | E |   |   | . | ° | N | ß | n | ³ | -TAB | ˋ |   |   |   |   |   |   |
| 1 | 1 | 1 | 1 | F |   |   | / | ? | O | _ | o | ⌫ | EOF | ´ |   |   |   |   |   |   |

∗ COLUMN

\# ROW

Fig. 11

| b3 b2 b1 b0 | # \ * | b7 b6 b5 b4 | 0 0 0 0 | 0 0 0 1 | 0 0 1 0 | 0 0 1 1 | 0 1 0 0 | 0 1 0 1 | 0 1 1 0 | 0 1 1 1 | 1 0 0 0 | 1 0 0 1 | 1 0 1 0 | 1 0 1 1 | 1 1 0 0 | 1 1 0 1 | 1 1 1 0 | 1 1 1 1 |
|---|---|---|---|---|---|---|---|---|---|---|---|---|---|---|---|---|---|---|
| | | | 0 | 1 | 2 | 3 | 4 | 5 | 6 | 7 | 8 | 9 | A | B | C | D | E | F |
| 0 0 0 0 | 0 | | | | SP | 0 | @ | P | | p | | | | ° | | | Ω | κ |
| 0 0 0 1 | 1 | | | | ! | 1 | A | Q | a | q | | | ¡ | ± | ` | | Æ | œ |
| 0 0 1 0 | 2 | | | | " | 2 | B | R | b | r | | | ¢ | ² | ´ | | Ð | ď |
| 0 0 1 1 | 3 | | | | | 3 | C | S | c | s | | | £ | ³ | ˆ | | ª | ȝ |
| 0 1 0 0 | 4 | | | | | 4 | D | T | d | t | | | $ | × | ~ | | Ħ | ħ |
| 0 1 0 1 | 5 | | | | % | 5 | E | U | e | u | | | ¥ | μ | − | | | ʟ |
| 0 1 1 0 | 6 | | | | & | 6 | F | V | f | v | | | # | π | ˘ | | IJ | ij |
| 0 1 1 1 | 7 | | | | ' | 7 | G | W | g | w | | | § | · | ˙ | | Ŀ | ŀ |
| 1 0 0 0 | 8 | | | | ( | 8 | H | X | h | x | | | ¤ | ÷ | ¨ | | Ł | ł |
| 1 0 0 1 | 9 | | | | ) | 9 | I | Y | i | y | | | | | | | Ø | ø |
| 1 0 1 0 | A | | | | * | : | J | Z | j | z | | | | | ° | | Œ | œ |
| 1 0 1 1 | B | | | | + | ; | K | [ | k | | | | « | » | ¸ | | º | β |
| 1 1 0 0 | C | | | | , | < | L | | l | | | | | ¼ | ③ | | Þ | þ |
| 1 1 0 1 | D | | | | - | = | M | ] | m | | | | | ½ | ʺ | | Ŧ | ŧ |
| 1 1 1 0 | E | | | | . | > | N | | n | | | | | ¾ | ˌ | | Ŋ | ŋ |
| 1 1 1 1 | F | | | | / | ? | O | ⓛ | o | | | | | ¿ | ˇ | | ʼn | |

\* COLUMN

\# ROW

Fig. 12

| | | | | b7 | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|---|---|---|---|
| | | | | b6 | 0 | 0 | 0 | 0 | 1 | 1 | 1 | 1 | 0 | 0 | 0 | 0 | 1 | 1 | 1 | 1 |
| | | | | b5 | 0 | 0 | 1 | 1 | 0 | 0 | 1 | 1 | 0 | 0 | 1 | 1 | 0 | 0 | 1 | 1 |
| | | | | b4 | 0 | 1 | 0 | 1 | 0 | 1 | 0 | 1 | 0 | 1 | 0 | 1 | 0 | 1 | 0 | 1 |
| b3 | b2 | b1 | b0 | \*# | 0 | 1 | 2 | 3 | 4 | 5 | 6 | 7 | 8 | 9 | A | B | C | D | E | F |
| 0 | 0 | 0 | 0 | 0 | | | SP | 0 | | P | | p | SYMB | JUSTI | | | | | | |
| 0 | 0 | 0 | 1 | 1 | | | | 1 | A | Q | a | q | DIAC | XXX | | | | | | |
| 0 | 0 | 1 | 0 | 2 | | ⌗ | | 2 | B | R | b | r | TELEX | x | | | | | | |
| 0 | 0 | 1 | 1 | 3 | ⌗ | — | | 3 | C | S | c | s | ↔ | BLOCK | | | | | | |
| 0 | 1 | 0 | 0 | 4 | → | | | 4 | D | T | d | t | | LINE | | | | | | |
| 0 | 1 | 0 | 1 | 5 | ↑ | | % | 5 | E | U | e | u | 10 | WORD | | | | | | |
| 0 | 1 | 1 | 0 | 6 | | | & | 6 | F | V | f | v | 12 | CHAR | | | | | | |
| 0 | 1 | 1 | 1 | 7 | | | ' | 7 | G | W | g | w | 15 | SEND | | | | | | |
| 1 | 0 | 0 | 0 | 8 | | ↓ | ( | 8 | H | X | h | x | 1 | PRINT | | | | | | |
| 1 | 0 | 0 | 1 | 9 | | | ) | 9 | I | Y | i | y | 1.5 | SEARC | | | | | | |
| 1 | 0 | 1 | 0 | A | ⇨ | | | : | J | Z | j | z | 2 | MERGE | | | | | | |
| 1 | 0 | 1 | 1 | B | | ESC | + | | K | | k | | LHM | CENTE | | | | | | |
| 1 | 1 | 0 | 0 | C | | | , | | L | | l | | RHM | ⌐ | | | | | | |
| 1 | 1 | 0 | 1 | D | ↵ | | - | = | M | | m | | +TAB | ⌐ | | | | | | |
| 1 | 1 | 1 | 0 | E | | | . | | N | | n | | -TAB | | | | | | | |
| 1 | 1 | 1 | 1 | F | | | / | ? | O | | o | | ⌫ | EOF | | | | | | |

\* COLUMN

\# ROW

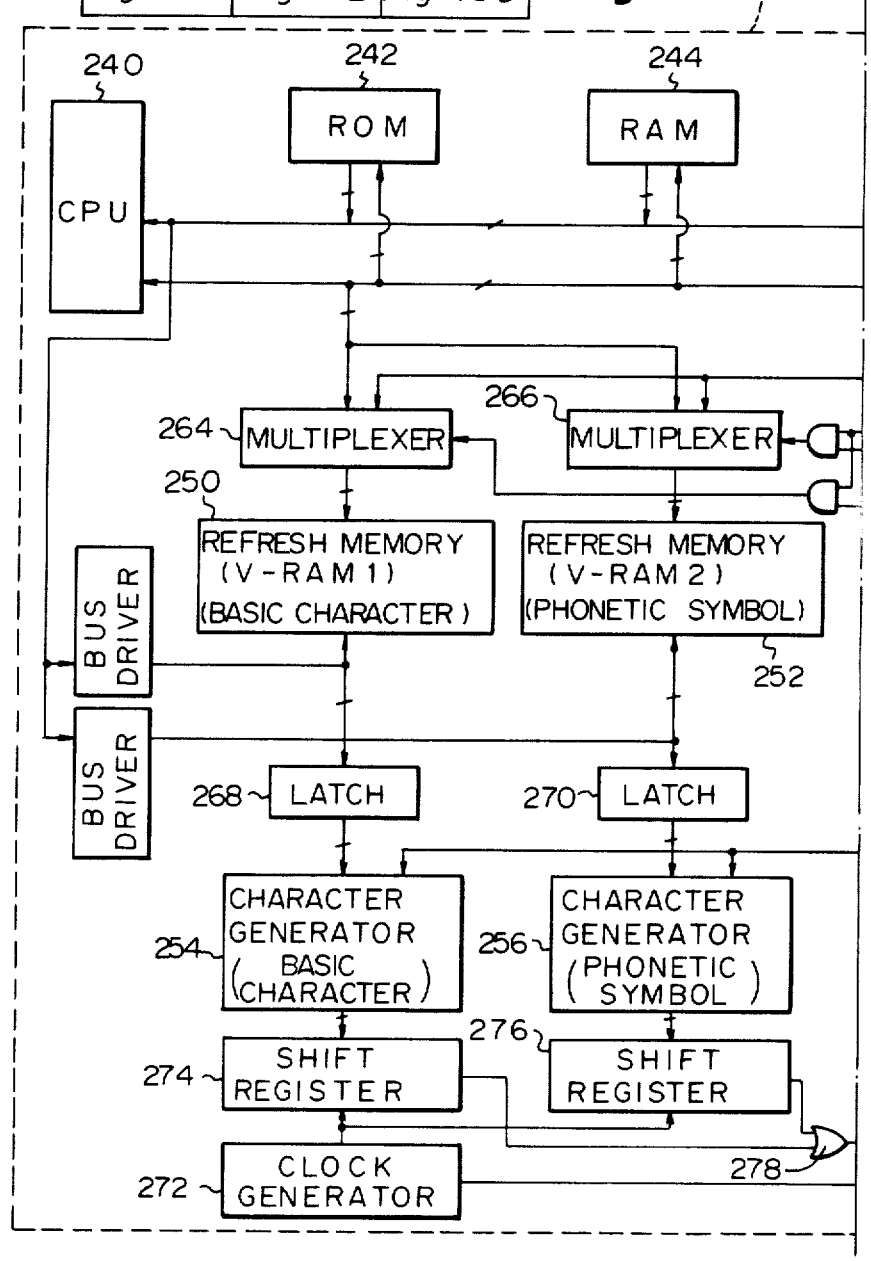

Fig. 15

| b3 b2 b1 b0 | # \ * | b7 b6 b5 b4 | 0 0 0 0 | 0 0 0 1 | 0 0 1 0 | 0 0 1 1 | 0 1 0 0 | 0 1 0 1 | 0 1 1 0 | 0 1 1 1 | 1 0 0 0 | 1 0 0 1 | 1 0 1 0 | 1 0 1 1 | 1 1 0 0 | 1 1 0 1 | 1 1 1 0 | 1 1 1 1 |
|---|---|---|---|---|---|---|---|---|---|---|---|---|---|---|---|---|---|---|
| | | | 0 | 1 | 2 | 3 | 4 | 5 | 6 | 7 | 8 | 9 | A | B | C | D | E | F |
| 0 0 0 0 | 0 | | | | SP | 0 | @ | P | ù | p | | | | ° | | | Ω | κ |
| 0 0 0 1 | 1 | | | | ! | 1 | A | Q | a | q | | | ¡ | ± | ` | ˋ | Æ | æ |
| 0 0 1 0 | 2 | | | | " | 2 | B | R | b | r | | | ¢ | ² | ´ | ´ | Đ | đ |
| 0 0 1 1 | 3 | | | | β | 3 | C | S | c | s | | | £ | ³ | ^ | ^ | ª | ð |
| 0 1 0 0 | 4 | | | | Ä | 4 | D | T | d | t | | | $ | × | ~ | ~ | Ħ | ħ |
| 0 1 0 1 | 5 | | | | % | 5 | E | U | e | u | | | ¥ | μ | ¯ | ¯ | | ι |
| 0 1 1 0 | 6 | | | | & | 6 | F | V | f | v | | | # | PT | ˘ | ˘ | IJ | ij |
| 0 1 1 1 | 7 | | | | ' | 7 | G | W | g | w | | | § | · | · | · | Ŀ | ŀ |
| 1 0 0 0 | 8 | | | | ( | 8 | H | X | h | x | | | ¤ | ÷ | ¨ | ¨ | Ł | ł |
| 1 0 0 1 | 9 | | | | ) | 9 | I | Y | i | y | | | | ② | | | Ø | ø |
| 1 0 1 0 | A | | | | ✶ | : | J | Z | j | z | | | | ° | ° | | Œ | œ |
| 1 0 1 1 | B | | | | + | ; | K | [ | k | ä | | | « | » | ˛ | ˛ | º | β |
| 1 1 0 0 | C | | | | , | < | L | ö | l | | | | | ¼ | ③ | | Þ | þ |
| 1 1 0 1 | D | | | | - | = | M | ] | m | ö | | | | ½ | " | " | Ŧ | ŧ |
| 1 1 1 0 | E | | | | . | > | N | ∧ | n | ü | | | | ¾ | ˪ | ˬ | Ŋ | ŋ |
| 1 1 1 1 | F | | | | / | ? | O | ⓘ | o | DEL | | | | ¿ | ˇ | ˇ | ʼn | |

\* COLUMN

\# ROW

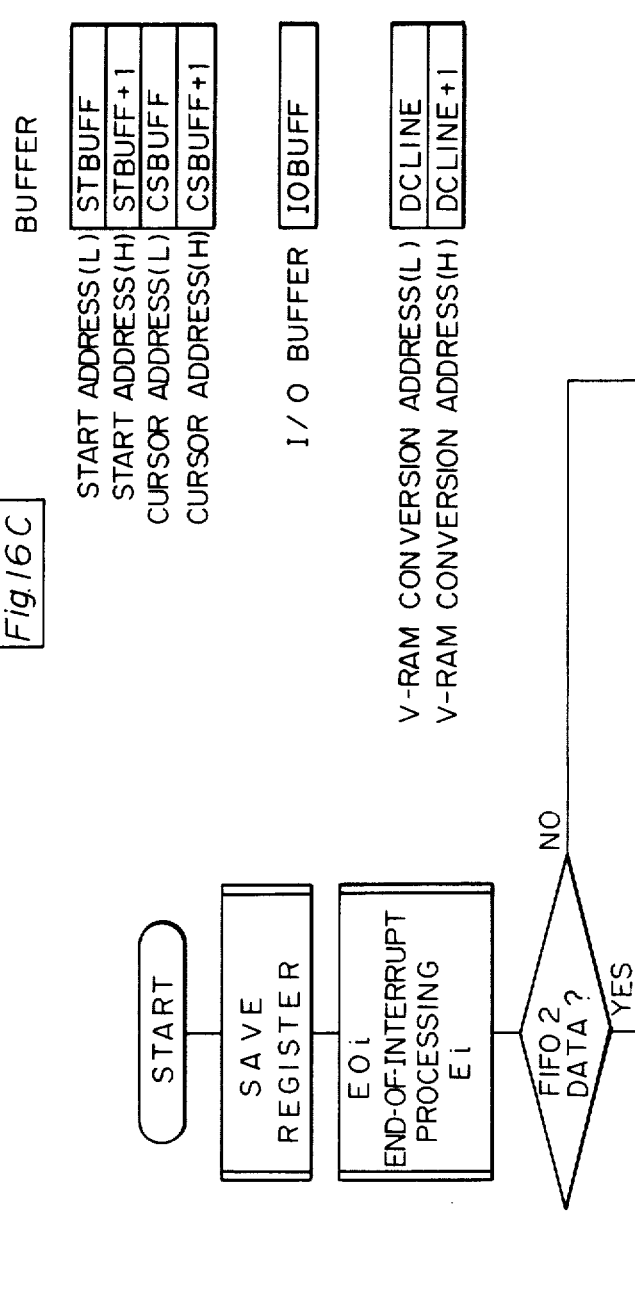

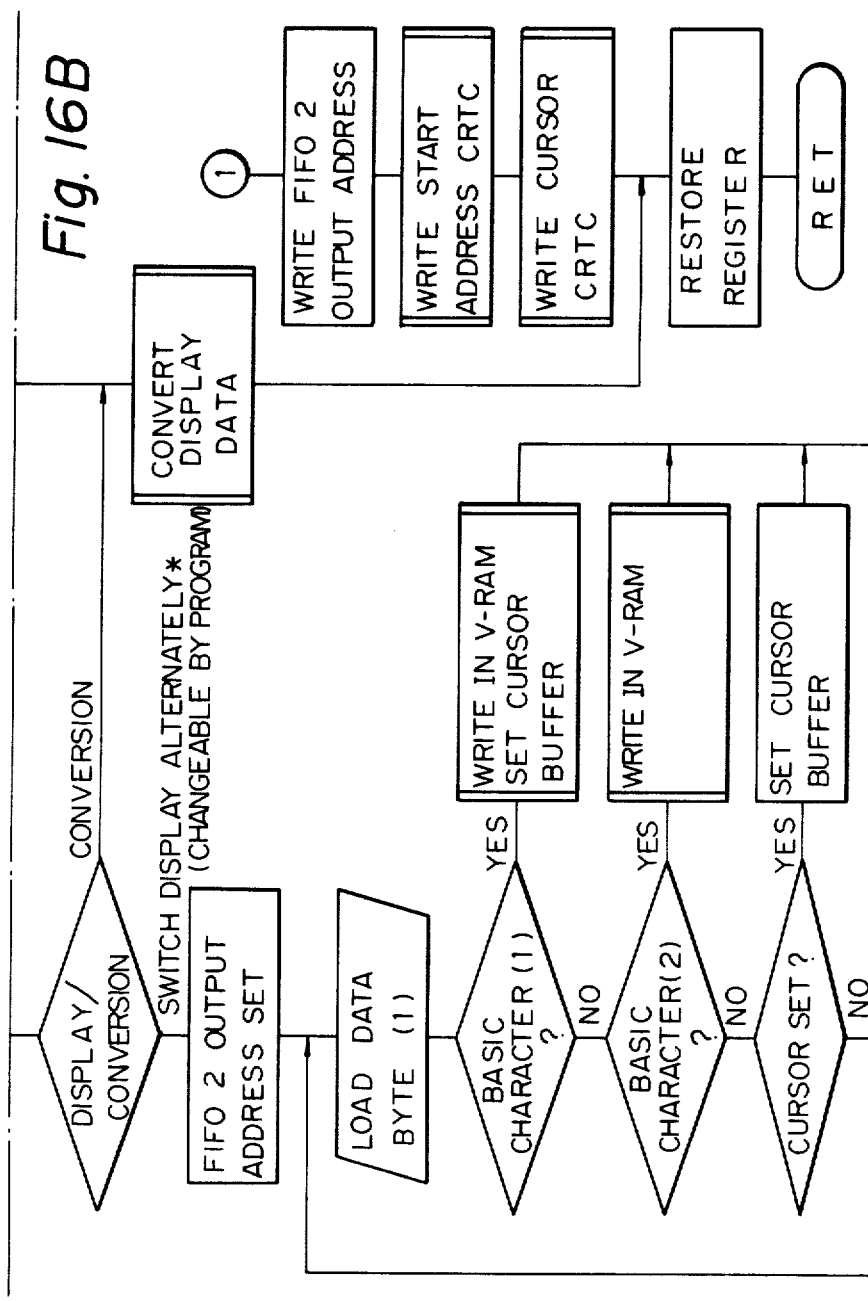

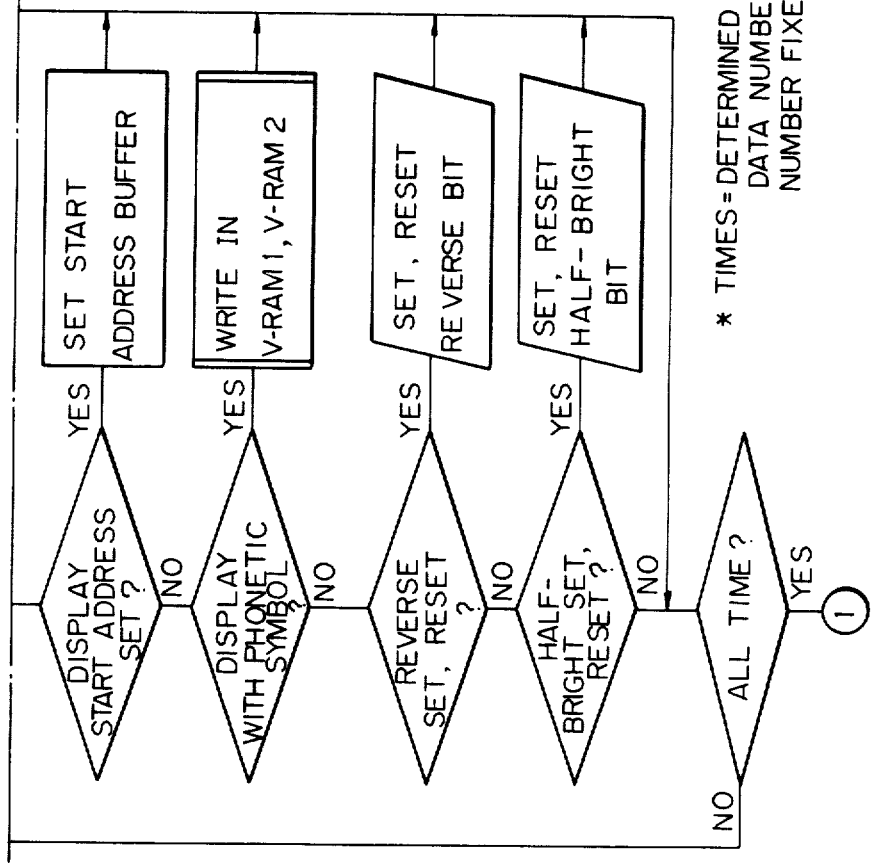

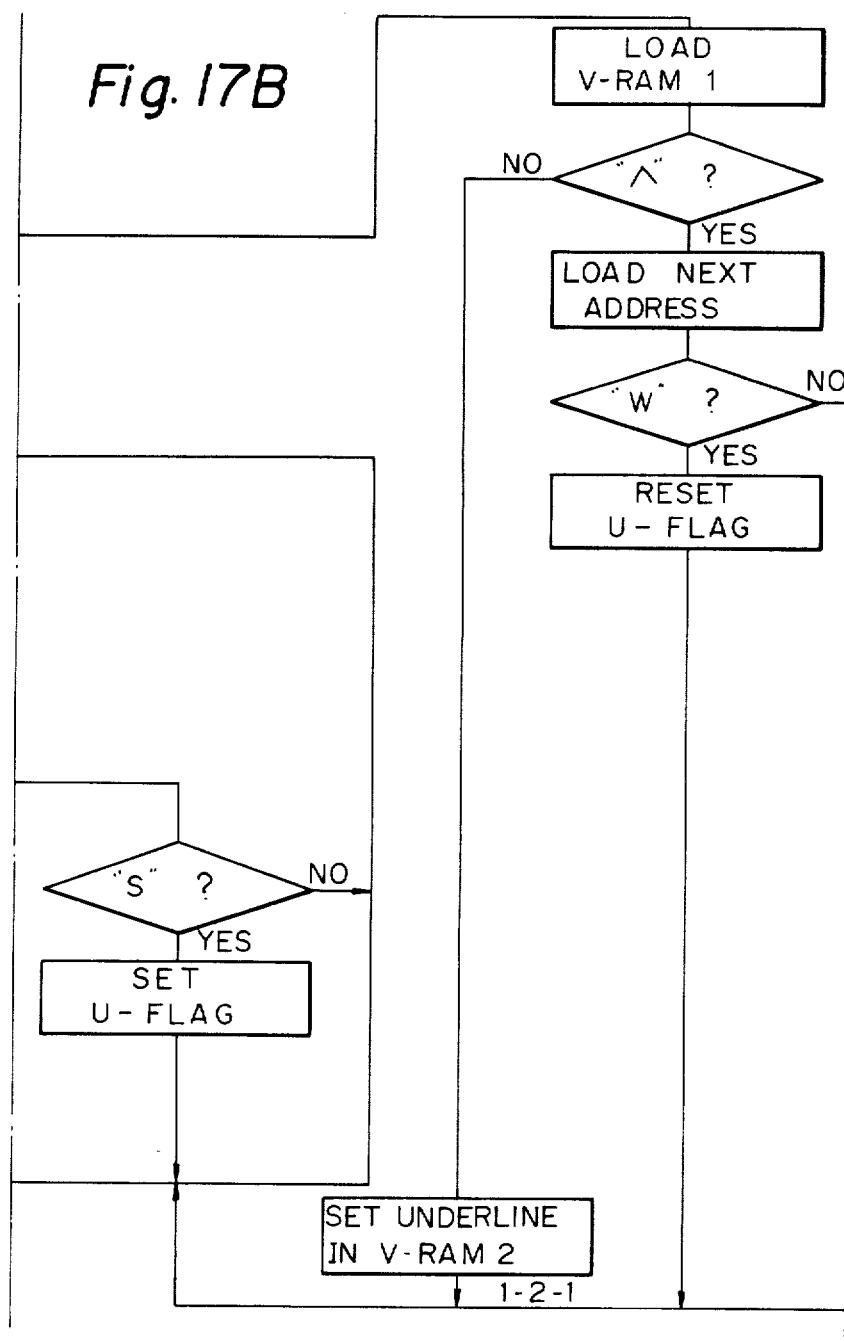

Fig. 18

| b3 b2 b1 b0 | #\* | b7 0<br>b6 0<br>b5 0<br>b4 0<br>0 | 0<br>0<br>0<br>1<br>1 | 0<br>0<br>1<br>0<br>2 | 0<br>0<br>1<br>1<br>3 | 0<br>1<br>0<br>0<br>4 | 0<br>1<br>0<br>1<br>5 | 0<br>1<br>1<br>0<br>6 | 0<br>1<br>1<br>1<br>7 | 1<br>0<br>0<br>0<br>8 | 1<br>0<br>0<br>1<br>9 | 1<br>0<br>1<br>0<br>A | 1<br>0<br>1<br>1<br>B | 1<br>1<br>0<br>0<br>C | 1<br>1<br>0<br>1<br>D | 1<br>1<br>1<br>0<br>E | 1<br>1<br>1<br>1<br>F |
|---|---|---|---|---|---|---|---|---|---|---|---|---|---|---|---|---|---|
| 0 0 0 0 | 0 | | | | | | | | | | | | | | | | |
| 0 0 0 1 | 1 | | | | | | | | | | | | | | | | |
| 0 0 1 0 | 2 | | | | | | | | | | | | | | | | |
| 0 0 1 1 | 3 | | | | | | | | | | | | | | | | |
| 0 1 0 0 | 4 | | | | | | | | | | | | | | | | |
| 0 1 0 1 | 5 | | | | | | | | | | | | | | | | |
| 0 1 1 0 | 6 | | | | | | | | | | | | | | | | |
| 0 1 1 1 | 7 | | | | | | | | | | | | | | | | |
| 1 0 0 0 | 8 | BS | | | | | | | | | | | | | | | |
| 1 0 0 1 | 9 | HT | | | | | | | | | | | | | | | |
| 1 0 1 0 | A | LF | SUB | | | | | | | | | | | | | | |
| 1 0 1 1 | B | | ESC | | | | | | | | | | | | | | |
| 1 1 0 0 | C | FF | | | | | | | | | | | | | | | |
| 1 1 0 1 | D | CR | | | | | | | | | | | | | | | |
| 1 1 1 0 | E | | | | | | | | | | | | | | | | |
| 1 1 1 1 | F | | | | | | | | | | | | | | | | |

\* COLUMN

\# ROW

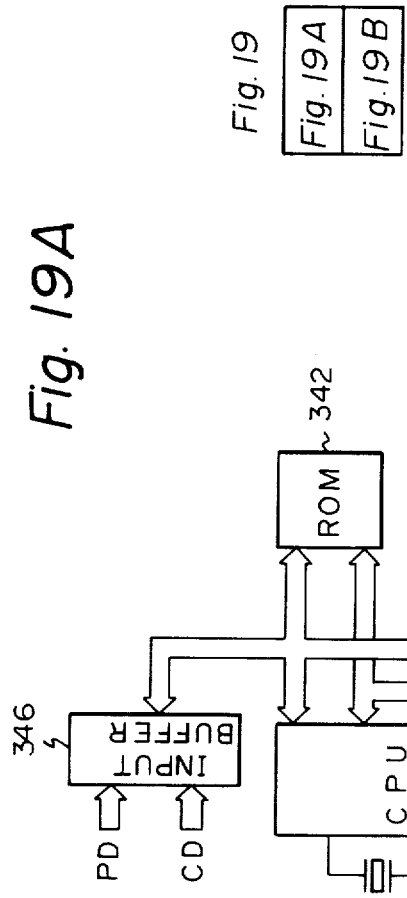

Fig. 20

| b7 | | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|---|
| b6 | | 0 | 0 | 0 | 0 | 1 | 1 | 1 | 1 | 0 | 0 | 0 | 0 | 1 | 1 | 1 | 1 |
| b5 | | 0 | 0 | 1 | 1 | 0 | 0 | 1 | 1 | 0 | 0 | 1 | 1 | 0 | 0 | 1 | 1 |
| b4 | | 0 | 1 | 0 | 1 | 0 | 1 | 0 | 1 | 0 | 1 | 0 | 1 | 0 | 1 | 0 | 1 |
| b3 b2 b1 b0 | #\\* | 0 | 1 | 2 | 3 | 4 | 5 | 6 | 7 | 8 | 9 | A | B | C | D | E | F |
| 0 0 0 0 | 0 | | | SP | 0 | @ | P | | p | | | | ° | | | Ω | к |
| 0 0 0 1 | 1 | | | ! | 1 | A | Q | a | q | | | ¡ | ± | ` | | Æ | æ |
| 0 0 1 0 | 2 | | | " | 2 | B | R | b | r | | | ¢ | ² | ´ | | Ð | đ |
| 0 0 1 1 | 3 | | | | 3 | C | S | c | s | | | £ | ³ | ^ | | ª | ð |
| 0 1 0 0 | 4 | | | | 4 | D | T | d | t | | | $ | × | ~ | | Ħ | ħ |
| 0 1 0 1 | 5 | | | % | 5 | E | U | e | u | | | ¥ | µ | ‾ | | | ι |
| 0 1 1 0 | 6 | | | & | 6 | F | V | f | v | | | # | ¶ | ˘ | | IJ | ij |
| 0 1 1 1 | 7 | | | ' | 7 | G | W | g | w | | | § | · | ˙ | | Ŀ | ŀ |
| 1 0 0 0 | 8 | BS | | ( | 8 | H | X | h | x | | | ¤ | ÷ | ¨ | | Ł | ł |
| 1 0 0 1 | 9 | | | ) | 9 | I | Y | i | y | | | ' | ' | | | Ø | ø |
| 1 0 1 0 | A | LF | SUB | * | : | J | Z | j | z | | | " | " | ° | | Œ | œ |
| 1 0 1 1 | B | | ESC | + | ; | K | [ | k | { | PLD | CSI | « | » | ¸ | | º | β |
| 1 1 0 0 | C | FF | | , | < | L | \\ | l | \| | PLU | | ← | ¼ | _ | | Þ | þ |
| 1 1 0 1 | D | CR | | - | = | M | ] | m | } | RLF | | ↑ | ½ | " | | Ŧ | ŧ |
| 1 1 1 0 | E | | | . | > | N | ^ | n | ‾ | | | → | ¾ | ˪ | | ŋ | ŋ |
| 1 1 1 1 | F | | | / | ? | O | _ | o | | | | ↓ | ¿ | ˇ | | 'n | |

\\*     COLUMN

ROW

Fig. 21

| b7 | | | | 0 | 0 | 0 | 0 | 1 | 1 | 1 | 1 |
|---|---|---|---|---|---|---|---|---|---|---|---|
| b6 | | | | 0 | 0 | 1 | 1 | 0 | 0 | 1 | 1 |
| b5 | | | | 0 | 1 | 0 | 1 | 0 | 1 | 0 | 1 |
| b4 b3 b2 b1 | | | | *COLUMN<br># ROW | 0 | 1 | 2 | 3 | 4 | 5 | 6 | 7 |
| 0 | 0 | 0 | 0 | 0 |  |  | SP | 0 | @ | P | ` | p |
| 0 | 0 | 0 | 1 | 1 |  |  | ! | 1 | A | Q | a | q |
| 0 | 0 | 1 | 0 | 2 |  |  | " | 2 | B | R | b | r |
| 0 | 0 | 1 | 1 | 3 |  |  | # | 3 | C | S | c | s |
| 0 | 1 | 0 | 0 | 4 |  |  | $ | 4 | D | T | d | t |
| 0 | 1 | 0 | 1 | 5 |  |  | % | 5 | E | U | e | u |
| 0 | 1 | 1 | 0 | 6 |  |  | & | 6 | F | V | f | v |
| 0 | 1 | 1 | 1 | 7 |  |  | ' | 7 | G | W | g | w |
| 1 | 0 | 0 | 0 | 8 | BS |  | ( | 8 | H | X | h | x |
| 1 | 0 | 0 | 1 | 9 |  |  | ) | 9 | I | Y | i | y |
| 1 | 0 | 1 | 0 | A | LF |  | * | : | J | Z | j | z |
| 1 | 0 | 1 | 1 | B |  | ESC | + | ; | K | [ | k | { |
| 1 | 1 | 0 | 0 | C | FF |  | , | < | L | \ | l | | |
| 1 | 1 | 0 | 1 | D | CR |  | - | = | M | ] | m | } |
| 1 | 1 | 1 | 0 | E | SO |  | . | > | N | ^ | n | ~ |
| 1 | 1 | 1 | 1 | F | SI |  | / | ? | O | _ | o | DEL |

Fig. 23

| b7 | | 0 | 0 | 0 | 0 | 0 | 0 | 0 | 0 | 1 | 1 | 1 | 1 | 1 | 1 | 1 | 1 |
|---|---|---|---|---|---|---|---|---|---|---|---|---|---|---|---|---|---|
| b6 | | 0 | 0 | 0 | 0 | 1 | 1 | 1 | 1 | 0 | 0 | 0 | 0 | 1 | 1 | 1 | 1 |
| b5 | | 0 | 1 | 1 | 1 | 0 | 1 | 1 | 1 | 0 | 0 | 1 | 1 | 0 | 0 | 1 | 1 |
| b4 | | 0 | 1 | 0 | 1 | 0 | 1 | 0 | 1 | 0 | 1 | 0 | 1 | 0 | 1 | 0 | 1 |
| b3 b2 b1 b0 # \ * | | 0 | 1 | 2 | 3 | 4 | 5 | 6 | 7 | 8 | 9 | A | B | C | D | E | F |
| 0 0 0 0 | 0 | | | SP | 0 | @ | P | ` | p | | | ≡ | ° | | | Ω | κ |
| 0 0 0 1 | 1 | | | ! | 1 | A | Q | a | q | | | ¡ | ± | ` | ` | Æ | æ |
| 0 0 1 0 | 2 | | | ˇ | 2 | B | R | b | r | | | ¢ | ² | ´ | ´ | Ð | d |
| 0 0 1 1 | 3 | | | # | 3 | C | S | c | s | | | £ | ³ | ^ | ^ | ª | ʒ |
| 0 1 0 0 | 4 | | | $ | 4 | D | T | d | t | | | $ | × | ~ | ~ | Ħ | ħ |
| 0 1 0 1 | 5 | | | % | 5 | E | U | e | u | | | ¥ | μ | ¯ | ¯ | | ʟ |
| 0 1 1 0 | 6 | | | & | 6 | F | V | f | v | | | # | π | ˘ | ˘ | IJ | ij |
| 0 1 1 1 | 7 | | | ' | 7 | G | W | g | w | | | § | · | · | · | Ŀ | ŀ |
| 1 0 0 0 | 8 | | | ( | 8 | H | X | h | x | | | ¤ | ÷ | ·· | ·· | Ł | ł |
| 1 0 0 1 | 9 | | | ) | 9 | I | Y | i | y | | | · | , | | | Ø | ø |
| 1 0 1 0 | A | | | * | : | J | Z | j | z | | | ʺ | ʺ | ° | ° | Œ | œ |
| 1 0 1 1 | B | | | + | ; | K | [ | k | { | | | « | » | ȷ | ȷ | º | ß |
| 1 1 0 0 | C | | | , | < | L | \ | l | \| | | | — | ¼ | — | — | Þ | þ |
| 1 1 0 1 | D | | | - | = | M | ] | m | } | | | ‖ | ½ | ʺ | ʺ | Ŧ | ŧ |
| 1 1 1 0 | E | | | . | > | N | ^ | n | ¯ | | | — | ¾ | ˛ | ˛ | ŋ | ŋ |
| 1 1 1 1 | F | | | / | ? | O | _ | o | ‖‖‖ | | | ¿ | ¿ | ˇ | ˇ | 'n | ■ |

\* COLUMN

\# ROW

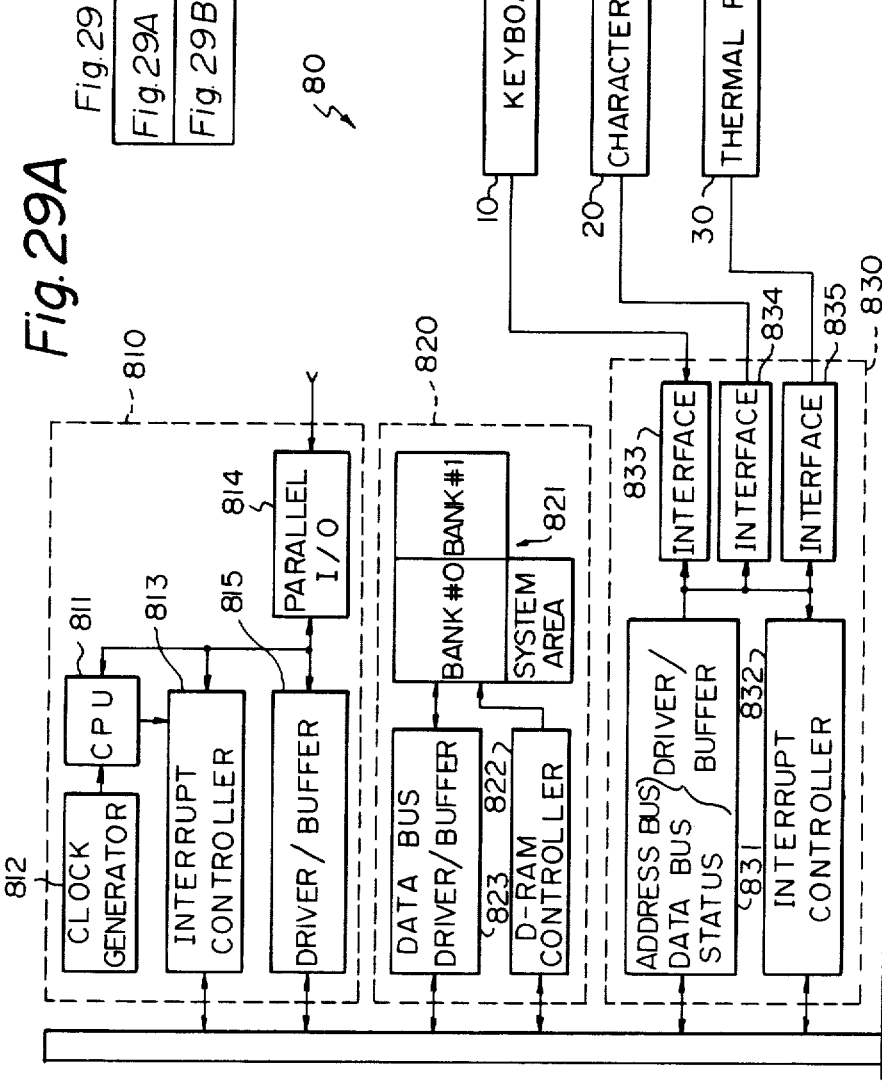

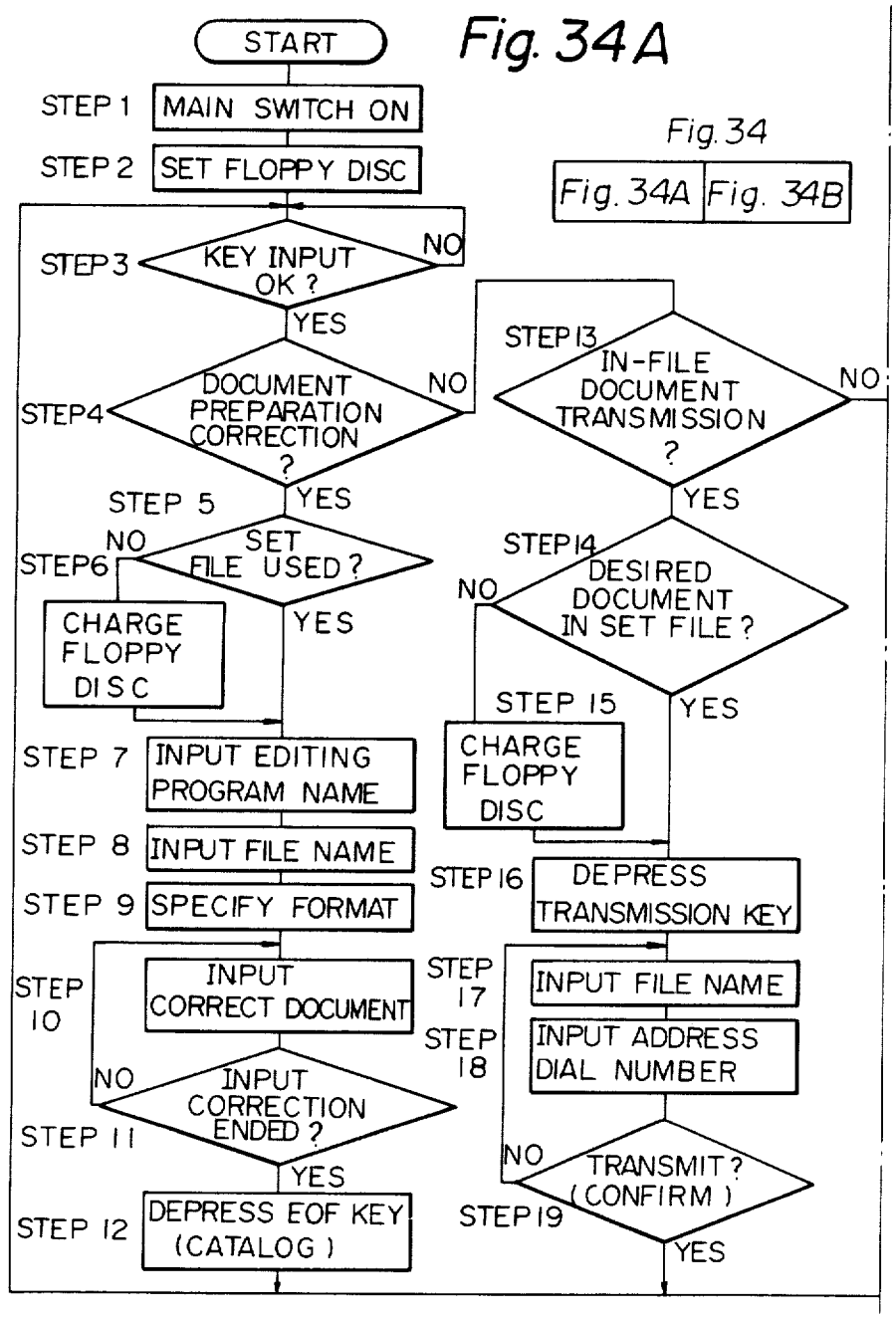

TERMINAL DEVICE FOR EDITING DOCUMENT AND COMMUNICATING DATA

BACKGROUND OF THE INVENTION

The present invention relates to a terminal unit which is capable of both preparing and editing a document and communicating data with a remote terminal device.

In parallel with the remarkable progress of office automation, there have recently been developed various terminal devices equivalent to a word processor which is capable of advanced data communication in addition to its original function or a telex terminal unit which is capable of document preparation or communication processing in addition to its original function. Such devices may be typified by a communication word processor and a telex terminal unit for international communication.

A document preparing terminal device capable of the two different functions generally comprises an input section equipment with a keyboard for inputting character data, form data and control data necessary for document transmission and system control, a display section having a character display for displaying various data required for document preparation, an output section having a printer for printing out prepared document data and received document data, an external storage section accommodating a floppy disc for storing prepared document data or received document data, a communication control section for controlling the transmission and reception of documents, a section for connecting the terminal device to a communication line, and a system control section for controlling the entire system according to a program. This bifunctional terminal unit, due to its very nature, may receives document data from a remote terminal device while it is operated for preparing a document. It is desirable, therefore, that the terminal unit be capable of delivering the received document either to its output section or external storage without interrupting the preparation of a document.

However, a prior art terminal device of the type described cannot run in parallel a word processing program for preparing a document and a control program for delivering received data to the output section or the external storage. This is because the system control of the prior art device is furnished only with a memory in which a program for running and supervising one program is resident. When document data is received while the device is operating to prepare a document, it cannot be printed out or stored immediately but has to be done so after the document preparation or interrupting it.

Another drawback is that when the printing operation is disabled due to a failure in a printer or the like during reception of a document or waiting period, "failure" or "reception unable" is displayed after the memory of the communication control has become full. This makes it impossible to receive any further document data.

Furthermore, such a terminal device is made up of a number of equipments which are usually connected to a common power source to be constantly supplied with power. This degrades the durability and reliability of various equipments for which the constant supply of power is needless, particularly those constituting the input section, display section and external storage, while inviting wasteful consumption of power.

SUMMARY OF THE INVENTION

A terminal device capable of editing a document and communicating data embodying the present invention includes input means for inputting character data, form data and control data which are necessary for preparing and transmitting data and system control and character data conversion instruction data for instructing the character data to be converted into predetermined character data, and outputting the input character data, form data and control data and the converted character data corresponding to the input character data, in response to a result of the input of the various data. Display means is supplied with the character data, form data and control data necessary for preparing a document and display control and character data conversion instruction data for instructing the character data to be converted into predetermining character data, thereby displaying the input character data and converted character data in response to a result of input of the various data. Printer means is supplied with data of a prepared document, data of a received document and form data and control data which are necessary for print control, thereby printing out the prepared document data and received document data on a sheet in response to the various data. External storage means is supplied with data of a prepared documents, data of a received document and control data which is necessary for storage control, thereby storing the prepared document data and received document data in response to the various data. Communication control means receives data of a document to be transmitted and control data necessary for transmission control, so as to control the transmission of the prepared document data in response to the input data and the reception of a document transmitted to the terminal device from a remote terminal device. Further, a system control section controls the display means, printer means, external storage means and communication control means in response to the character data, converted character data, form data and control data fed from the data input means, and the received data fed from the communication control section. The system control section is operated by general purpose software.

In accordance with the present invention, a terminal device capable of preparing a document and communicating data includes a system control section having storage means in which are resident a control program for outputting received document data either to an output section or an external storage, and a supervisor program for alternately practicing the control program and another program necessary for system control. Based on these resident programs, the system control is practiced to permit received document data to be fed to the output section or the external storage even when local work such as preparation of a document is under way. When printing operation is disabled due to a failure in a printer of the output section or the like after the received document data has been loaded in a memory of the communication control, the document data is immediately delivered to the external storage to open the document data storage area. Power is supplied only to the equipments which are indispensable for storing received document data in the memory, except for the duration of any local work such as preparation of document data.

It is an object of the present invention to provide a terminal unit bifunctioning to prepare and edit a document and communicate data which is excellent in the durability and reliability of its equipments, efficiently manipulatable, operable at a high speed, applicable for general purposes, and minimum in power consumption.

It is another object of the present invention to provide a generally improved terminal device for editing a document and communicating data.

Other objects, together with the foregoing, are attained in the embodiment described in the following description and illustrated in the accompanying drawings.

BRIEF DESCRIPTION OF THE DRAWINGS

FIGS. 10-12 are diagrams of graphic character codes which are used for the description of a keyboard & console control program shown in FIG. 3;

FIGS. 13A-13C, arranged as shown in FIG. 13, are a block diagram of a character display shown in FIG. 2;

FIG. 15 is a diagram of graphic character codes which will be used for the description of a CRT control program shown in FIG. 3;

FIGS. 16A-16C, arranged as shown in FIG. 16, and FIGS. 17A-17C, arranged as shown in FIG. 17, are flowcharts respectively showing a display control routine and a display data conversion routine;

FIG. 18 is a diagram showing control codes which will be used for the description of the CRT control program of FIG. 3;

FIGS. 19A-19B, arranged as shown in FIG. 19, are a block diagram of a thermal printer;

FIGS. 20 and 21 are diagrams of graphic character control codes used for the description of a printer control program shown in FIG. 3;

FIG. 23 is a diagram showing graphic characters stored in the character generator;

FIGS. 29A-29B, arranged as shown in FIG. 29, are block diagram of a system control shown in FIG. 2;

FIGS. 34A-34B, arranged as shown in FIG. 34, are a flowchart representing the basic operating procedure of the terminal unit.

DESCRIPTION OF THE PREFERRED EMBODIMENT

While the terminal device for editing a document and communicating data of the present invention is susceptible of numerous physical embodiments, depending upon the environment and requirements of use, a substantial number of the herein shown and described embodiment have been made, tested and used, and all have performed in an eminently satisfactory manner.

Figure 1:
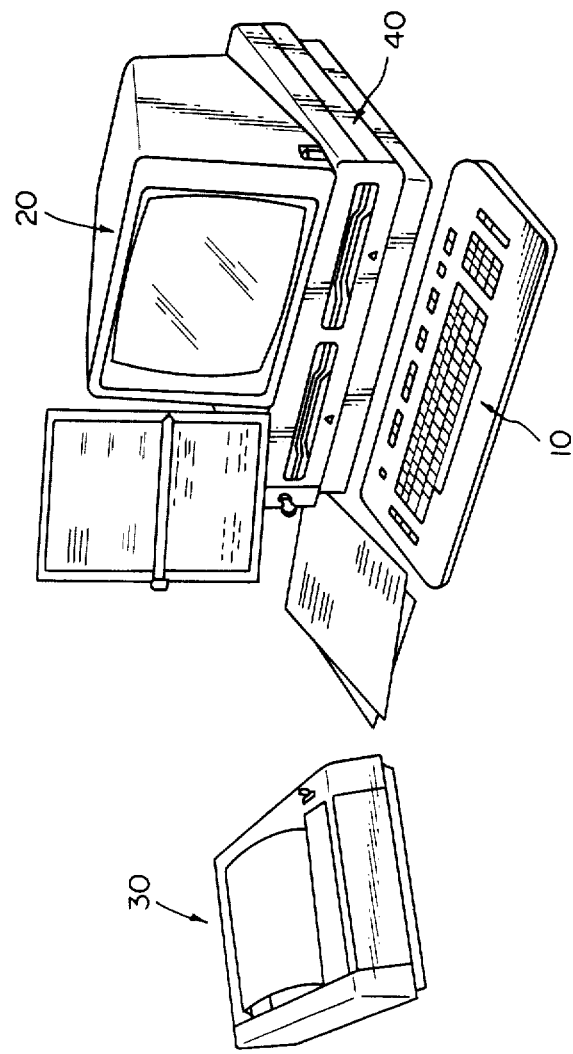
FIG. 1 is a schematic perspective view of a terminal device embodying the present invention.

Referring to FIG. 1 of the drawings, the terminal device generally comprises a keyboard 10 functioning as an input unit, a character display 20 as a display unit, a thermal printer 30 as an output unit, a body 40 made up of an external storage, a communication control and a system control, and a section (not shown) for connecting the device to a communication line. Use is made of curled cords or the like to connect the keyboard 10, character display 20 and thermal printer 30 with the body 40 while permitting them to be separated from the body 40 as for transportation.

Figure 2:
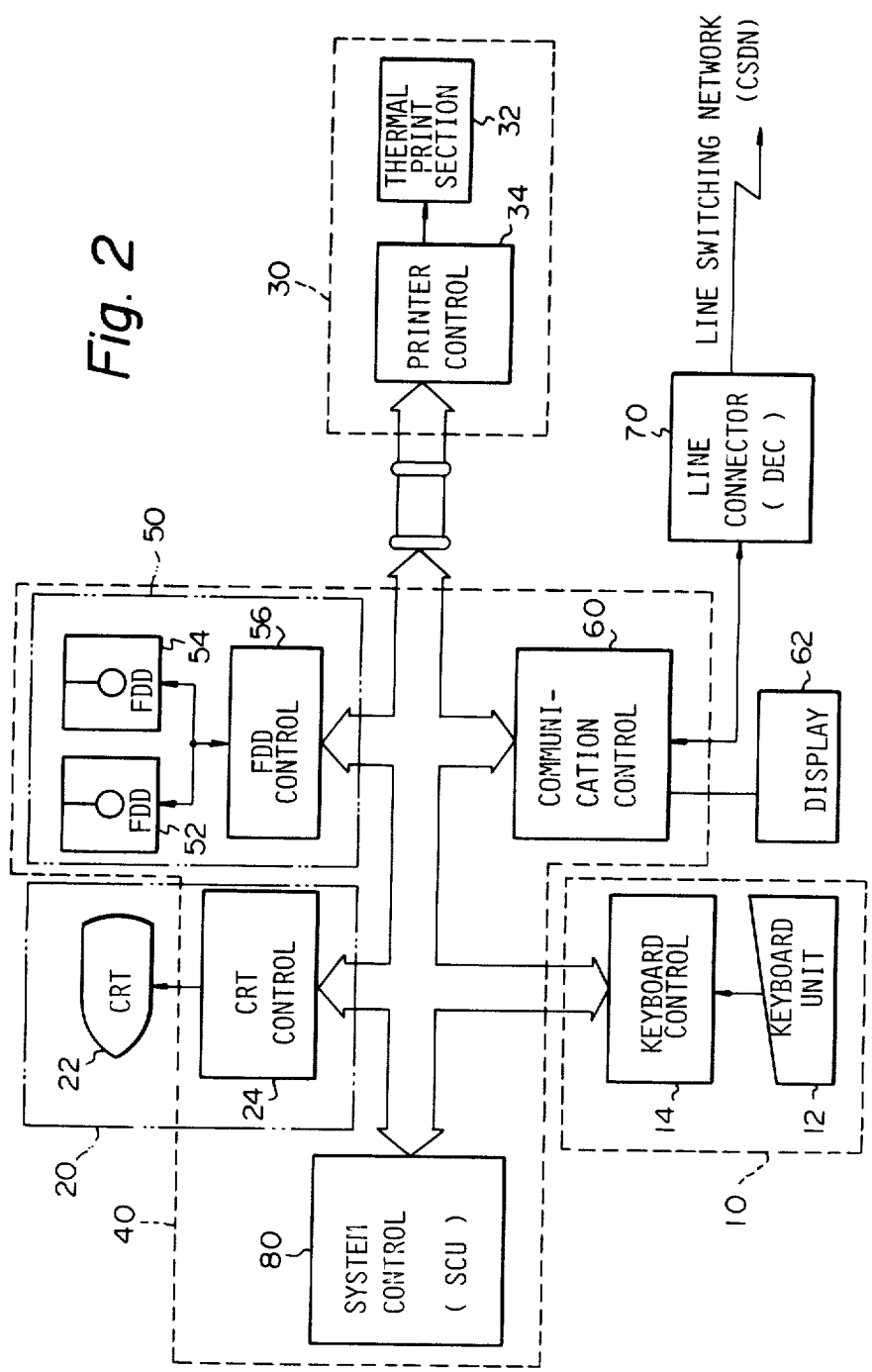
FIGS. 2 and 3 are block diagrams respectively showing the hardware construction and software construction of the terminal device.
Figure 3:
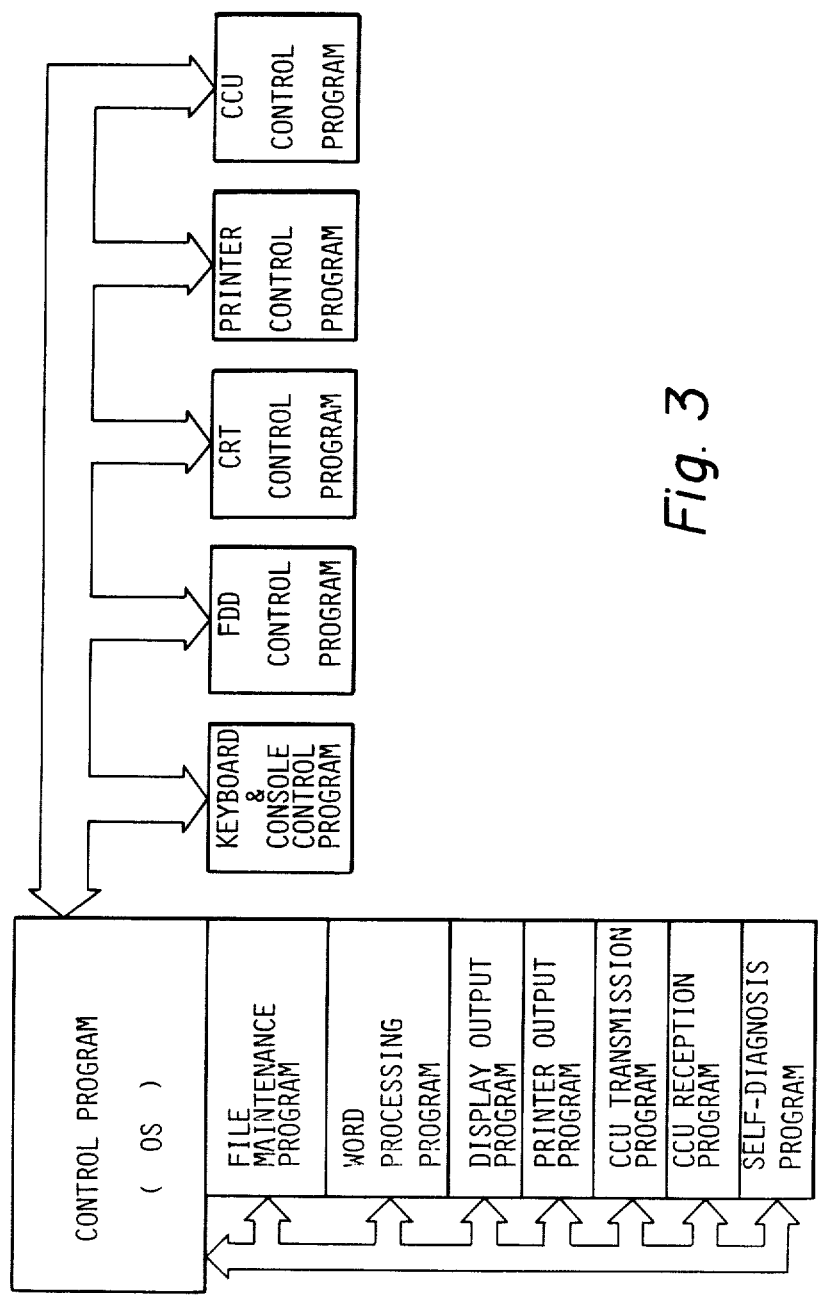

Referring to FIGS. 2 and 3, hardware and software constructions of the terminal device are shown in block diagrams, respectively. In FIG. 2, the keyboard 10 comprises a keyboard unit 12 and a keyboard control 14. The character display 20 comprises a CRT display 22 and a CRT control 24 for controlling the operation of the CRT display 22. The thermal printer 30 comprises a thermal printing section 32 and a printer control 34 for controlling the thermal printer 32. The external storage is generally designated by the reference numeral 50 and made up of two floppy disc drives or FDD's 52 and 54 and an FDD control 56. The device further includes a communication control 60, a display 62, a line connector section (DCE) 70 and a system control 80. The FDD control 56 of the external storage 50 is constituted by the system control 80.

Referring also to FIG. 3, the functions of the various sections stated above will be outlined.

(i) Keyboard 10

The keyboard unit 12 has a number of keys which are operable to supply the keyboard control 14 with various data: character data representing alphabets or numerals, for example, and form data each of which is necessary for preparing a document, control data required for system control, and character data conversion instruction data for commanding the conversion of character data input through the keys into another predetermined character data. In response to these data, the keyboard control 14 supplies the system control 80 through an interface with the input data which has or has not been converted into the predetermined character data. The keyboard 10 is controlled on the basis of a keyboard & console control program stored in the keyboard control 14 and an operating system or OS stored in the system control 80.

(ii) Character Display 20

The CRT control 24 is supplied from the keyboard 10, external storage 50, communication control 60 and system control 80 through an interface with the various data mentioned necessary for preparing a document as well as the conversion instruction of the input character data into another. In response to these data, the CRT display 22 displays thereon the input character data with or without conversion thereof. The character display 20 is controlled by a CRT control program stored in the CRT control 24 and an operation system or OS and a display output program each stored in the system control 80.

(iii) Thermal Printer 30

The printer control 34 receives through an interface the prepared document data displayed on the character display 20, document data stored in a floppy disc loaded in the external storage 50, received document data received by the communication control 60 and form data and control data necessary for print control. The thermal printer 32 is controlled to operate its head and the like to print out the prepared or received document data on a heat-sensitive sheet. The thermal printer 30 is controlled on the basis of a printer control program stored in the printer control 34 and an OS and a printer output control each stored in the system control 80.

(iv) External Storage 50

The FDD control 56 is supplied through an interface with the prepared document data displayed on the character display 20, received document data in the communication control 60 and control data necessary for storage control. The prepared or received document data is stored in a floppy disc which is loaded in the FDD 52 or 54, while being converted into a format suitable for storage. The control over the external storage 50 is governed by an FDD control program stored in the FDD control 56 and an OS and a file maintenance program each stored in the system control 80. The floppy discs in the external storage 50 may also store various programs required for system control, e.g. OS stored in the system control 80.

(v) Communication Control (CCU) 60

The communication control 60 is supplied with data of a document to be transmitted or transmission document data stored in a floppy disc in the external storage 50 and representing a document to be transmitted from the terminal device, as well as control data necessary for transmission control. The transmission document data is once stored in storage means and then fed out to a communication line (line switching network) via a line interface and the connector section 70. The transmission control for the transmission document data occurs on the basis of a CCU control program stored in the communication control 60 and an OS and a CCU transmission program each stored in the system control 80.

Besides, the communication control 60 receives document data from the line via the connector 70 and line interface. The received document data is once stored in storage means while data indicative of the reception is delivered to the system control 80. In response to a command from the system control 80, the communication control 60 feeds the received document data to the character display 20, thermal printer 30 or external storage 50 or keeps it within the storage means. The reception control is governed by a CCU control program stored in a memory (described later) of the communication control 60 and an OS and a CCU reception program stored in the system control 80.

The CCU control program, CCU transmission program and CCU reception program discussed above are provided with a design which can be processed simultaneously with other programs such as a word processing program. This allows the simultaneous processing of the programs to be supervised by the OS task practicing and supervising function of the system control 80, thereby enabling document data to be transmitted or received independently of the operator's local work for writing out a document, for example.

The line connector section (DCE) 8 is adapted for interface control and the like between the communication control 60 of the terminal device and the line switching network. In the illustrated embodiment, the section 8 comprises a domestic line terminal device (DSC) applicable to the digital switching network service and accords to the CCITT's advice in construction and function.

(vi) System Control (SCU) 80

The system control 80 receives character data, converted character data, form data and control data input through the keyboard 10 and reception data from the communication control 60. Based on these data, the system control 80 controls the entire system inclusive of the character display 20, thermal printer 30, external storage 50 and communication control 60 in accordance with those OS and other programs whose major functions are running and supervising tasks, supervising files and controlling an I/O unit.

Major controls performed by the system control 80 are as follows:

(1) controls related with preparing and editing a document such as the delivery of data necessary for preparing a document to the character display 20 and that of prepared document data to the thermal printer 30;

(2) controls related with communication such as the transfer of the prepared document data to the communication control 60 and that of received document data to the character display 20, thermal printer 30 or external storage 50;

(3) controls related with file maintenance such as the delivery of prepared document data or received document data to the external storage 50 and reading prepared document data or received document data from the external storage 50; and (4) controls related with diagnosis such as diagnosis of the whole system and each section of the system and delivery of the result of diagnosis to the character display 20 or thermal printer 30.

The various programs of the system control 80 serve the following functions:

(a) OS: mainly supervising the task running and files and controlling I/O. The OS is the supervisor program adapted to alternately control the run of the CCU reception program, which is the control program, and other programs necessary for the system control (b) file maintenance program: mainly filing input and output data of the external storage 50 and supervising the files (c) word processing program: preparing and editing documents (d) display output program: converting input data into a format suitable for display and supplying the character display 20 with data necessary for display (e) printer output program: converting input data into a format suitable for printing and supplying the thermal printer 30 with data necessary for printing (f) CCU transmission program: delivering transmission document data to the communication control 60

(g) CCU reception program: delivering received document data to the thermal printer 30 or external storage 50. The CCU reception program is the control program adapted to run the control for delivering received document data to the thermal printer 30 or external storage 50

(h) self-diagnosis program: diagnosing the whole system and each section of the system (i) others: initializing the system and the like Such programs of the system control 80 are stored either in its ROM or in a floppy disc loaded in the external storage 50, depending upon the system construction.

The control program, i.e., OS, file maintenance program and word processing program, are constituted by general purpose software. The OS is capable of multitask control and has a resident process function. A certain process can be included in the OS and practiced alternately with another process.

In the illustrated embodiment, the OS and file maintenance program are constituted by MP/M (multi-programming monitor control programming) developed by Digital Research. The MP/M is the higher operating system for CP/M (control program for microprocessor) also developing by Digital Research and capable of multi-user (multi-terminal) multiprogramming.

Figure 4:
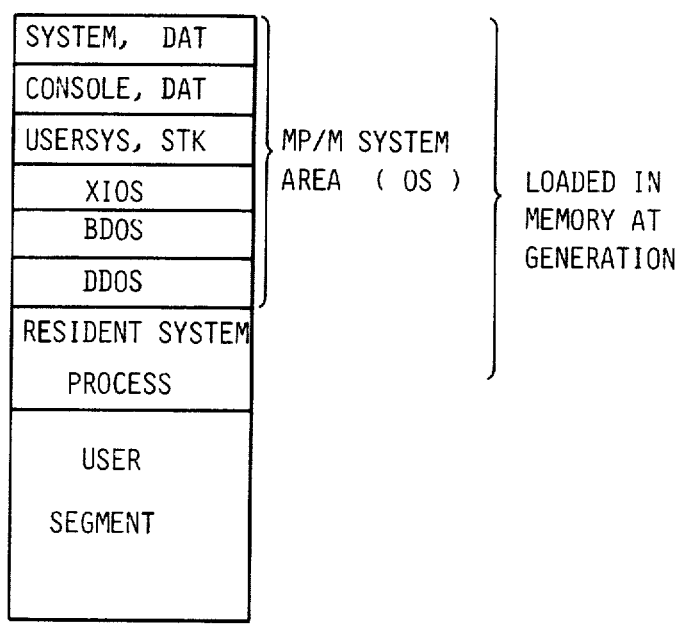
FIG. 4 is a diagram illustrating the basic system of MP/M (multiprogramming monitor control programming) which constitutes an operating system stored in a system control section.

Referring to FIG. 4, the basic system of the MP/M is illustrated. In FIG. 4, XDOS is the core of the MP/M, BDOS supervises the disc files and each console, and XIOS supervises actual data input and output. The MP/M allows a program called "resident system process" to stay on the memory. A program designed by a user can be loaded in the resident system process and whether or not to do so is decided at the time of system generation. In this embodiment, the CCU reception program is inserted in the resident system process during generation. For the others, refer to MP/M User's Manual available from Digital Research.

Meanwhile, the word processing program comprises WordStar developed by MicroPro International Corporation, the details of which will become clear from WordStar User's Manual published by the same firm.

Now, each section of the terminal device of the present invention will be described in detail with reference to FIG. 5 and onward as well.

KEYBOARD 10

Figure 5:
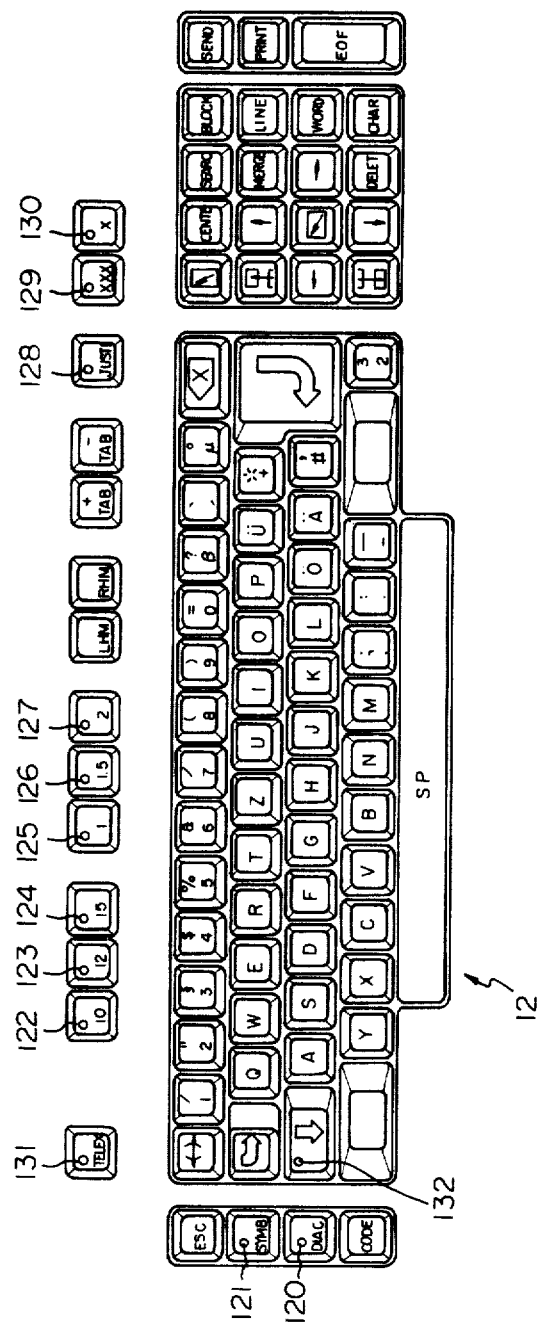
FIGS. 5 and 6 are a view of various keys arranged on a keyboard unit of FIG. 2 and a block diagram of a keyboard control section, respectively.

Referring to FIG. 5, there is shown the layout of various keys which are carried on the keyboard unit 12, which is for German in this case. The keys include major function keys:

(a) Keys Related with Character (Graphic Character) Data & Character Conversion Instruction Data
  graphic character key: entry of graphic characters on key tops
  DIAC key: entry of characters with diacritical marks
  SYMB key: entry of graphic characters other than the graphic characters on key tops (refered to as extra graphic characters hereinafter)
  ⇩ (shift) key: selection of one of two graphic characters on a key top or one of upper and lower case characters
  ⌫ (collection) key: cancellation (b) Keys Related with Form Data
  ⇥ key: tabulation
  LHM, RHM keys: setting left- and right-hand margins
  TAB, TAB keys: setting and clearing tab
  ⟨ and ⟩ keys: determining the cursor home position
  ←, →, ↑, ↓ : moving the cursor to the left, right, up or down
  CENTE key: centering
  SEARC key: searching keyword
  MERGE key: merging files
  ⬆ ⬇ keys: scrolling up or down the image surface
  ←→ key: margin release
  10, 12, 15 keys: designating horizontal spacing of 1/10", 1/12" or 1/15"
  1, 1.5, 2 keys: designating vertical spacing of 1/6", ¼" or ⅓"
  JUSTI key: justification
  xxx key: underline
  x key: bold character
  DELET key: deletion
  CHAR, WORD, LINE, BLOCK keys: designating a deletion unit which is character, word, line or block
  SP key: spacing (c) Key Related with Control Data
  EOF key: end of file
  PRINT key: print document
  SEND key: transmit document
  TELEX key: use in telex terminal unit specification
  CODE key: shift output code (later described)
  ↵ key: carriage return It should be noted that control data is input by combinations of various keys as well.

The DIAC, SYMB, shift, 10, 12, 15, 1, 1.5, 2, JUSTI, xxx, x and TELEX keys are provided with light emitting diodes or LED's 120–132, respectively, to display their operations.

The keyboard unit 12 comprises the keys shown in FIG. 5 and a key switch matrix which outputs code data corresponding to manipulated keys.

Figure 6:
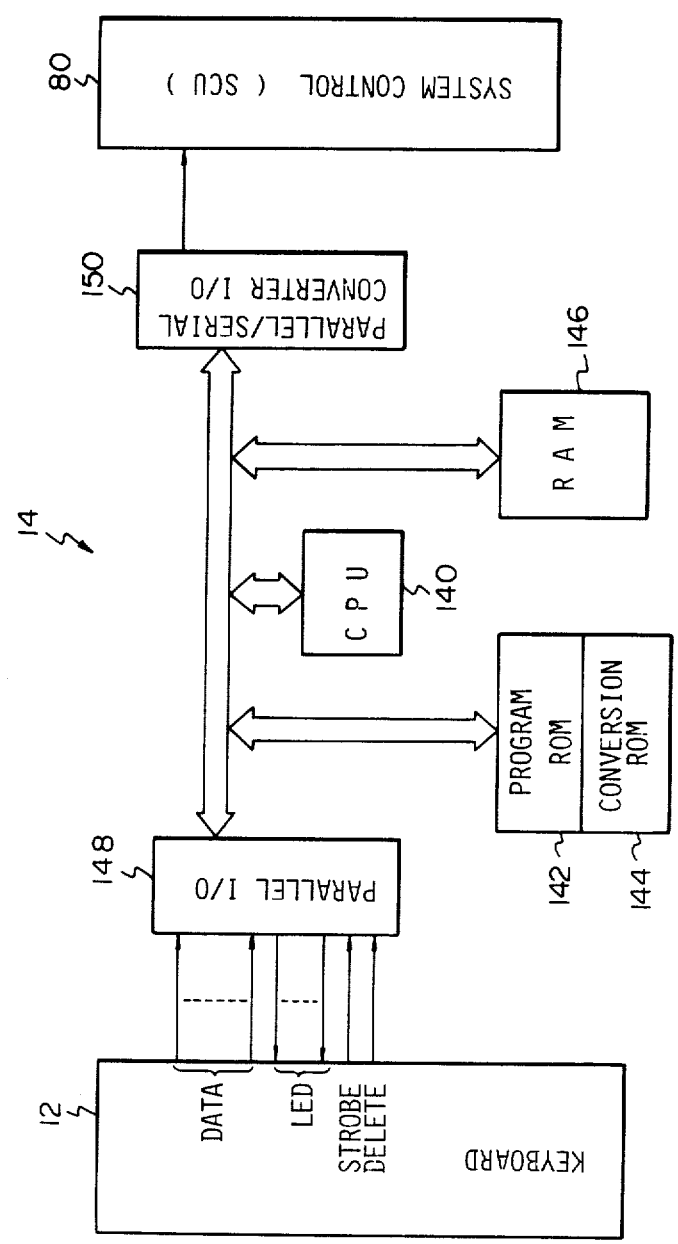

Referring to FIG. 6, the keyboard control 14 includes a central processing unit (CPU) 140, a program ROM 142, a conversion ROM 144, a RAM 146, a parallel of I/O 148 and a parallel/serial conversion I/O 150. The program ROM 142 stores the keyboard & console control program for running the input controls such as the conversion of character data input through the keyboard unit 12. The conversion ROM 144 stores data (conversion table) which will be used for converting input character data into another predetermined character data. The RAM 146 not only stores various data but serves as a working area for running the programs. The parallel I/O 148 is adapted to transfer between the keyboard unit 12 and the CPU 140 the input 8-bit code data, strobe signal, delete signal appearing upon depression of the DELET key, LED turn-on signals, etc. The parallel/serial I/O 150 transforms the parallel input character data, form data, control data and conversion character data into serial data and supplies them to the system control 80. The parallel I/O 148 and parallel/serial I/O 150 are controlled by the CPU 140 according to the control words shown in Table 1, which will appear at the end of the Description of the Preferred Embodiment. It will be noted in Table 1 that "$D_7$ BUZZER ON" in (3) OUT F2 means energizing a buzzer associated with the keyboard unit 12, although not shown in the drawings.

Figure 7:
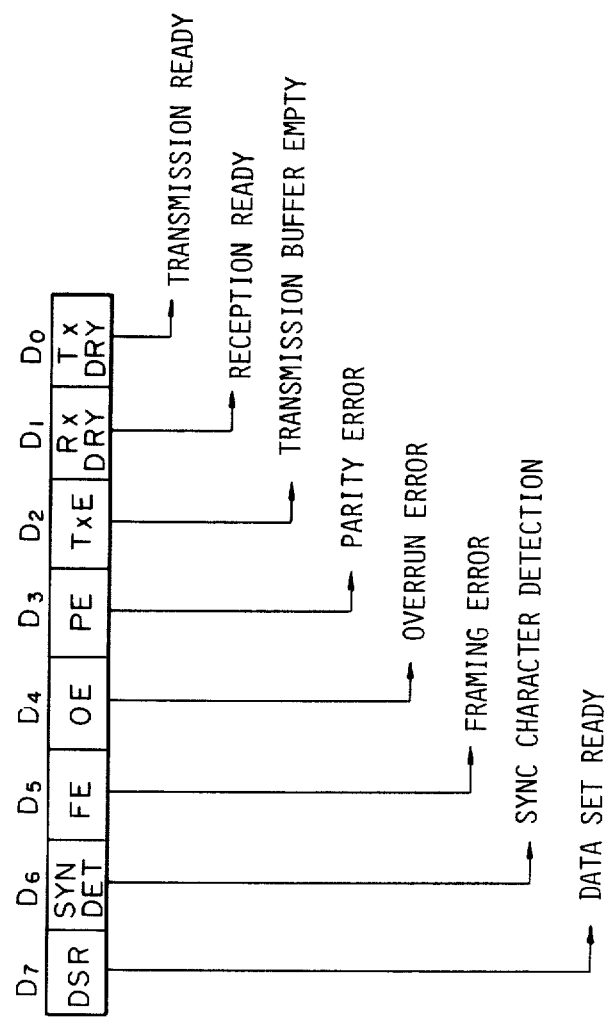
FIGS. 7-9 are diagrams showing a status format, a mode instruction format and a command instruction format of a parallel/serial conversion I/O of FIG. 6, respectively.
Figure 8:
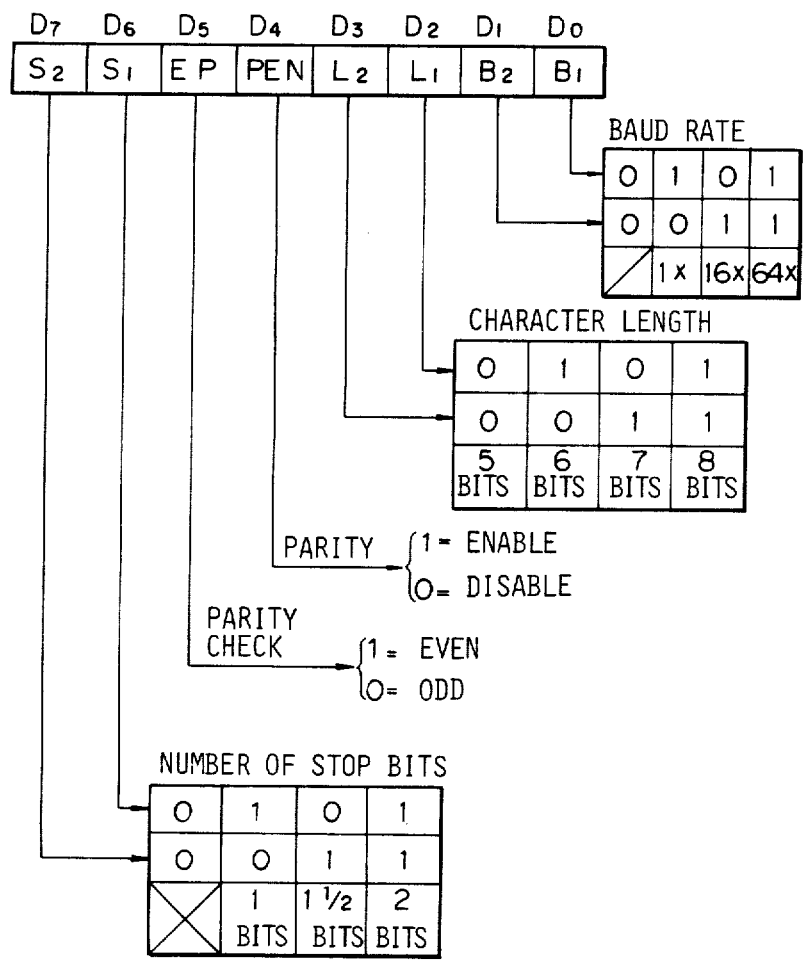
Figure 9:
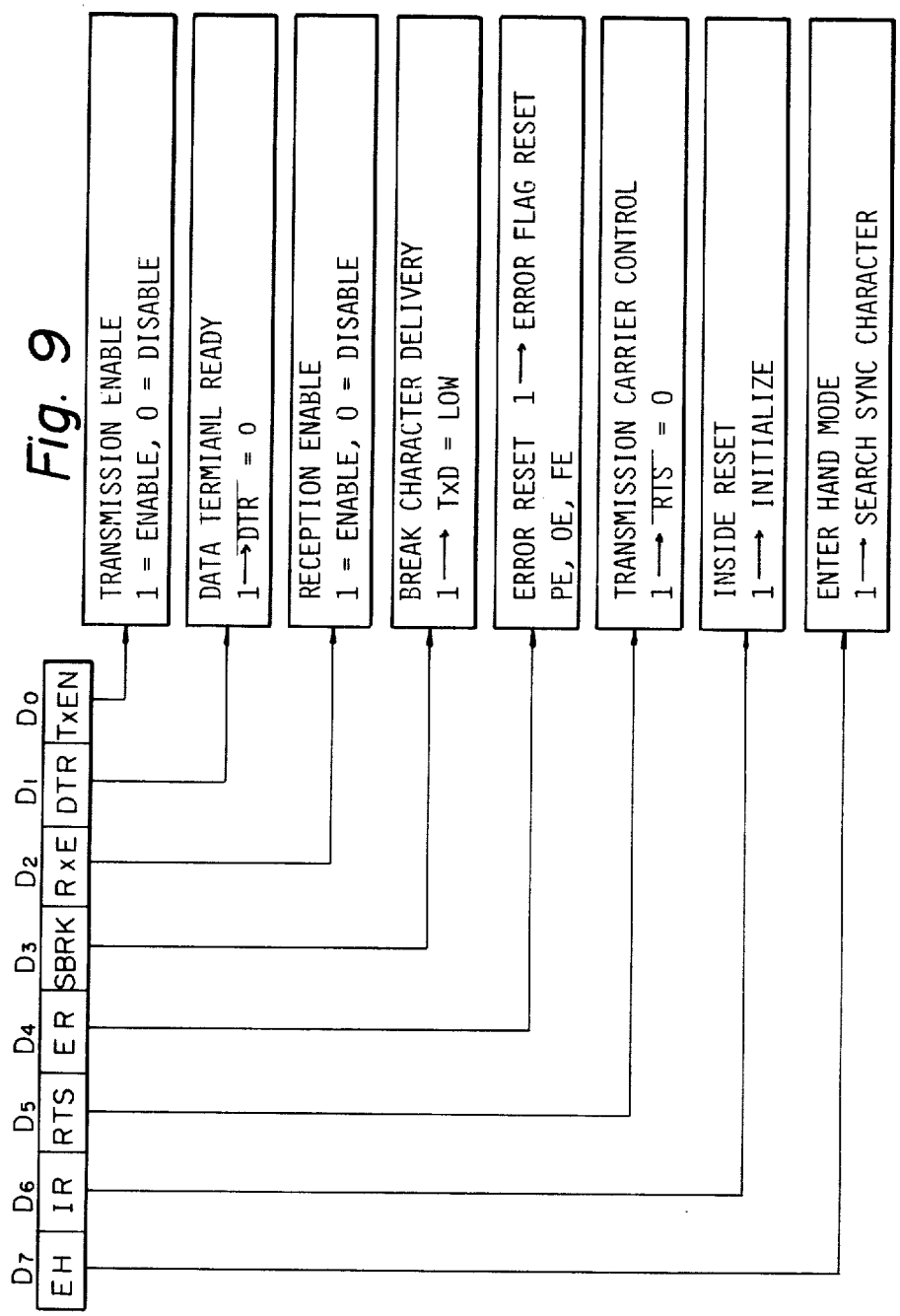

The parallel/serial I/O 150 has a status format, a mode instruction format and a command instruction format which are shown in FIGS. 7-9, respectively. In this embodiment, the mode instruction format of the parallel/serial I/O 150 is the format which is determined by the conditions $B_1=0$, $B_2=1$, $L_1=1$, $L_2=1$, PEN=0, EP=0, $S_1=1$ and $S_2=1$.

The keyboard & console control program stored in the program ROM 142 of the keyboard control 14 will be described. It should be born in mind that, when the keys except the DELETE and CODE keys on the keyboard unit 12 are depressed, the keyboard unit 12 supplies the keyboard control 14 with 8-bit data shown in FIG. 10 which correspond to the depressed keys.

The keyboard & console control program fulfills the following functions (1)–(16).

(1) Data from the keys which do not require code conversion in the terms (2)–(13) to follow are delivered as they are.

(2) DIAC key processing

A character with a diacritical mark is input by a code train "DIAC key code+basic character code+row hexa expression code (FIG. 11)" shown in FIG. 10. It will be noted that the symbols "+" and "," used for indicating a code train are meaningless characters (the same applies to the following).

In this case, the code conversion (conversion of input character data) and the condition of the LED 120 are controlled.

(a) The LED 120 associated with the DIAC key is turned off in the initial condition.

(b) In response to DIAC key data, a diacritical mark character input mode is set up and the LED 120 is turned on.

(c) When two characters of data are input, the code train is changed to "basic character code+10H+08H+diacritical mark code (where $b_7=0$)" shown in FIG. 11 and the LED 120 is turned off.

(d) When the collect ( ⒜ ) key data is input after the entry of DIAC key data or when the collect key data is input after the entry of one character of data, the diacritical mark character input mode is cancelled and the LED 120 is turned off neglecting the other key inputs.

(e) Whether or not the diacritical mark character data (converted character data) given by converting input character data corresponds to any one of the characters with diacritical marks shown in Table 2 is determined; the characters shown in Table 2 are allowed to be input. If the input is permissible, the converted character data is entered. If impermissible, the buzzer is energized without entering the converged character data.

A practical example of the entry of a diacritical mark character through the DIAC key will be described.

In the case of the character "Å", the basic character is determined as "A" and the row hexa expression of the symbol is "A" from FIGS. 10 and 11 and Table 2. It will be noted that " " used for indicating characters and codes are meaningless characters (the same applies to the following).

The DIAC key, A key and A key are operated in the order named to input data of a code train "81H+41H+41H" so that the previously mentioned code conversion occurs. Determining the code of the diacritic """ as $b_7=0$, the code is expressed as "4AH". As a result, a code train "41H+10H+08H+4AH" indicative of the character with diacritic "Å" is output. Thus, the DIAC key is used to input character data conversion instruction data which commands conversion of character data into predetermined character data. Based on the result of the input and the two characters of data entered after the DIAC key data, there is output character data with diacritical mark is output which is the character data given by converting the two characters of character data into predetermined character data.

(3) SYMB Key Processing

An extra graphic character other than the graphic characters on key tops is input by a code train shown in FIG. 10 which is "SYMB key code+row hexa expression code of character code shown in FIG. 11+column hexa expression code of character code shown in FIG. 11" shown in FIG. 10. In this case, the code conversion (conversion of input character data) and the condition of the LED 121 are controlled.

(a) The LED 121 associated with the SYMB key is turned off in the initial condition.

(b) In response to SYMB key data, an extra graphic character input mode is set up and the LED 121 is turned on.

(c) In response to two characters of character data, they are converted into "code shown in FIG. 11" for 0/0 to 7/F of FIG. 11 and into "10H+10H+code shown in FIG. 11 (where $b_7=0$)" for 8/0 to F/F shown in FIG. 11. The LED 121 is turned off.

(d) The same processing as in the DIAC key processing occurs in response to the input of collect key data input after the entry of the SYMB key data.

(e) Whether or not the extra graphic character data (converted character data) given by converting input data coincides with any one of the permissible characters shown in FIG. 11 is determined. If permissible, the converted character data is delivered; if impermissible, the buzzer is energized without delivering the converted character data.

A practical example of the input of an extra graphic character through the SYMB key will be described.

In the case of "<" in the area 0/0 to 7/F of FIG. 11, it will be seen from FIG. 11 that the column hexa expression thereof is "3" and the row hexa expression is "C". Thus, depressing the SYMB key, 3 key and C key in this order enters data of a code train "81H+33H+43H" and carries out the code conversion previously discussed. The resulting output data is "3CH" indicative of "<".

Concerning " ⋐ " in the area 8/0-F/F of FIG. 11, it will be seen from FIG. 11 that the column hexa expression thereof is "E" and the row hexa expression is "1". Thus depressing the SYMB key, E key and 1 key in this order enters the data of a code train "81H+45H+31H" and the code conversion occurs. Making the code of the character " ғ̈ " b₇=0 gives the code as "61H". As a result, there appears the data of a code train "10H+10H+61H" indicative of the character " ғ̈ ".

In short, the SYMB key enters character data conversion instruction data which commands the conversion of character data into extra graphic character data which is predetermined character data. Based on the result of the input and the two characters of character data input after the SYMB key, extra graphic character data is delivered which is the character data given by converting the two characters of character data into predetermined character data.

(4) Ä, Ö, Ü & β Key Processing

Data input through these keys are subjected to code conversion according to Table 3. In Table 3, "SF" means depression of the shift key.

(5) $, #, §, 0, 2, 3 & μ Key Processing

Data input through these keys are output after the code conversion shown in Table 4. In Table 4, the characters in ( ) of the output codes are the characters according to ASCII codes, while those in < > are the characters of the terminal device when b₇=1.

(6) ⟍ & ⟋ Key Processing

Data input through these keys are output after the code conversion shown in Table 5, in which ( ) and < > have the same meanings as in Table 4.

(7) LHM, RHM, TȦB, TĀB, ▨ , ▨ , CENT, SEARC, MERGE, ←⇌→, EOF, PRINT & SEND Key Processing Data input through these keys are output after the code conversion shown in Table 6. In Table 6, " ▴ " indicates the hold condition of the CODE key and " ⌐ " the O/D key operation.

Concerning the CODE key, while depressing the P key makes the code b₇-b₀ "01110000" as seen from FIG. 10, the CODE key depressed together with the P key changes the code to "00010000" shifting the code from the 5th column to the 2nd.

(8), 10, 12 and 15 Key Processing (a) The LED 122 associated with the 10 key is turned on under the initial condition.

(b) In response to data input through any one of the keys, this input data is output after the code conversion shown in Table 7. The LED 122-124 associated with the key in question is turned on while the LED 122-124 having been turned on is turned off.

(9) 1, 1.5 & 2 Key processing (a) The LED 125 associated with the 1 key is turned on under the initial condition.

(b) In response to data input through any one of the keys, the input data is output after the code conversion shown in Table 7. The LED 125-127 associated with the key in question is turned on, while the LED 125-127 having been turned on is turned off.

(10) JUSTI Key Processing (a) The LED 128 is turned on under the initial condition.

(b) In response to the JUSTI key data, the input data is output after code conversion to ∧ OJ.

(c) The LED 128 repeatedly turns on and off every time the JUSTI key data is entered.

(11) xxx Key Processing (a) The LED 129 is turned off under the initial condition.

(b) The data input through this key is output after alternate code conversion to ∧ PS and ∧ PW.

(c) The LED 129 repeatedly turns on and off every time the xxx key data is entered.

(13) CHAR, WORD, LINE & BLOCK Key Processing (a) When data is input through any one of the keys, whether or not data has been entered through the DELET key (delete signal DELET in FIG. 6) is determined. If so, the input data is output after the code conversion shown in Table 8; if not, the input data is neglected.

(b) Such determination is performed before storing the data from the key in a buffer.

(14) TELEX Key Processing

Where the terminal device is interconnected with a telex terminal unit, graphic characters which can be transmitted are limited by the telex terminal unit. Hence, for such an application, characters to be input are limited.

(a) The LED 131 is turned off under the initial condition.

(b) The LED 131 is repeatedly turned on and off in response to each input of TELEX key data.

(c) When the LED 131 is turned on, the permissible input character data is limited to the characters shown in FIG. 12. In response to the entry of any character other than those shown in FIG. 12, the input character data is neglected and the buzzer is energized.

(d) The function keys are freely operable to enter data except for the DIAC and SYMB keys.

(e) The entry of the diacritics " ′ " and " ` " are limited.

(15) EOF Key Processing

Upon entry of EOF key data, the 10, 12, 15, 1, 1.5, 2, JUSTI, xxx, x and TELEX key have their associated LED's 122-131 initialized.

(16) A 32-byte area is prepared as a buffer for buffering input data (FiFo structure). When this buffer becomes full, the subsequent input data is neglected and the buzzer is energized.

In this manner, the keyboard 10 supplies the system control 80 with character data or its converted version together with form data and control data, which are input through the various keys, in response to the result of input of such data and character data conversion instruction through the DIAC or SYMB key. Thus, an ordinary number of keys suffice for the entry of all the graphic characters shown in FIG. 11 and characters with diacritical marks shown in Table 2. It follows that, in a keyboard for German as in this embodiment, which involves characters with umlaut, these characters can be indicated on key tops and entered as simply as other basic alphabets. Apart from German, any desired language such as English, French or Japanese can be input merely by replacing the conversion table with another.

CHARACTER DISPLAY 20

Figure 13B:
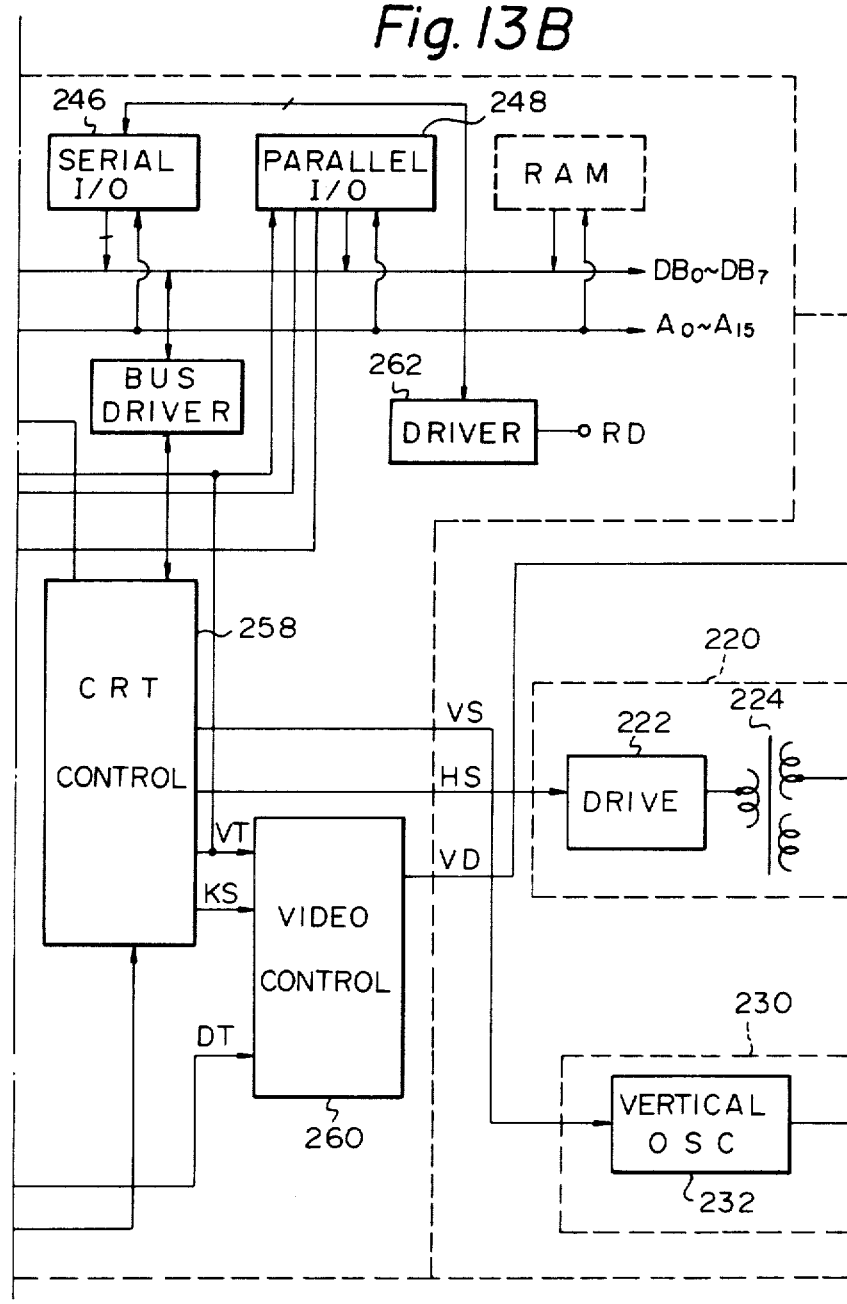
Figure 13C:
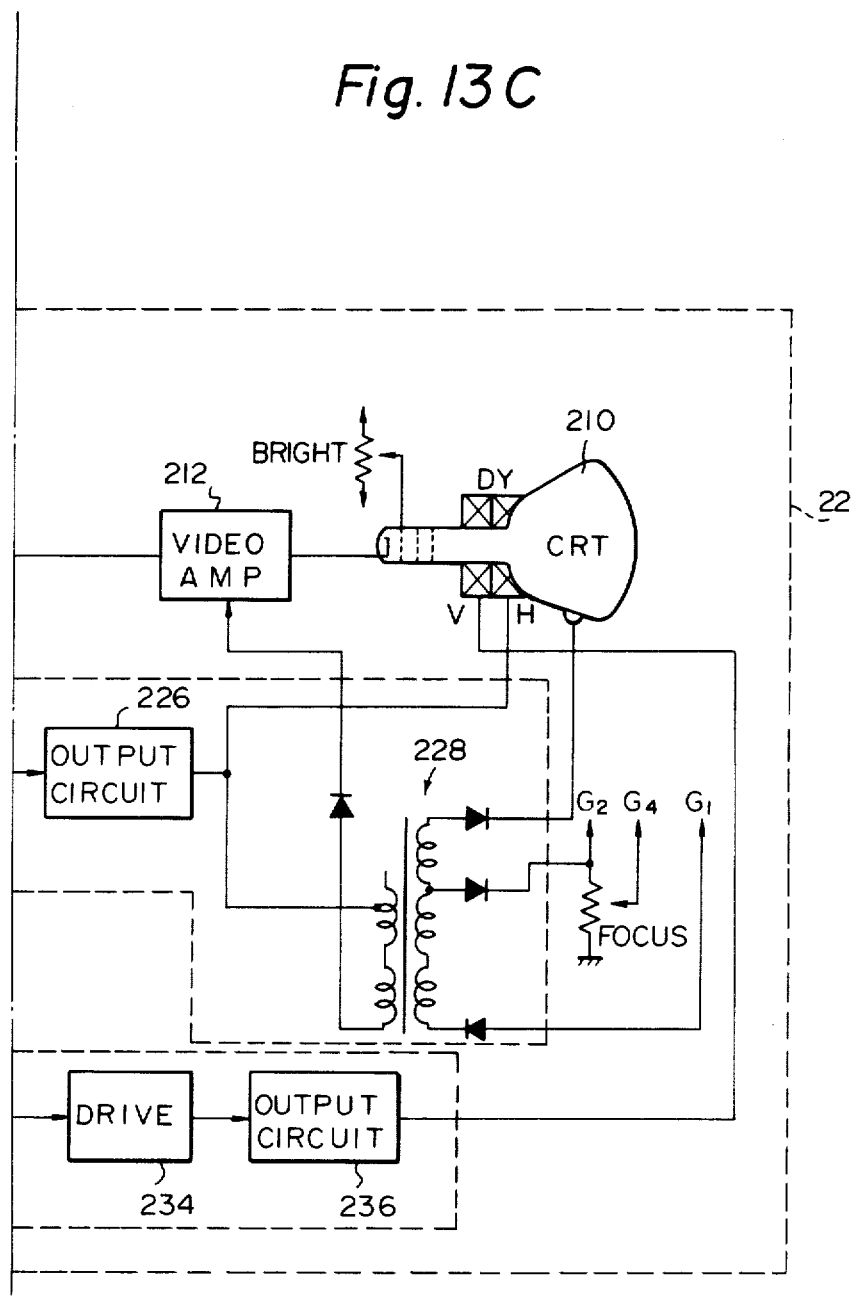

Referring to FIG. 13, the CRT display 22 includes a cathode ray tube or CTR 210, a video amplifier 212 for supplying the grid of the CRT 210 with an amplified video signal VD, a horizontal deflection circuit 220 for controlling the horizontal deflection of the CRT 210 in response to a horizontal sync signal HS coupled thereto from the CRT control 24, and a vertical deflection circuit 230 for controlling the vertical deflection of the CRT 210 in response to a vertical sync signal VS also fed from the CRT control 24. The horizontal deflection control 220 includes a drive circuit 222 supplied with the horizontal sync signal HS, a transformer 224, an output circuit 226 for delivering a horizontal deflection control signal, and a high tension circuit 228. The vertical deflection circuit 230 includes a vertical oscillation circuit 232 supplied with the vertical sync signal VS, a drive circuit 234 and an output circuit 236 for delivering a vertical deflection control signal.

The CRT control 24 includes a central processing unit or CPU 240, a ROM 242, a RAM 244, a serial I/O 246, a parallel I/O 248, refresh memories (referred to as V-RAM's hereinafter) 250 and 252, character generators 254 and 256, a CRT controller 258 and a video control circuit 260. The ROM 242 stores a CRT control program for practicing a display control, while the RAM 244 stores character data or like data received (entered) and serves as a working area for running a program. The serial I/O 246 is allocated for the transfer of character data or like received data RD via the driver 262. The parallel I/O is allocated for the transfer of control data which selects either one of the multiplexers 264 and 266. The V-RAM's 250 and 252 are respectively adapted to handle basic characters (characters other than those with distinctive phonetic symbols) and the characters with distinctive phonetic symbols. The V-RAM's 250 and 252 are selectively accessed by the CPU 240 or the CRT controller 258 via the multiplexer 264 or 266.

Figure 14:
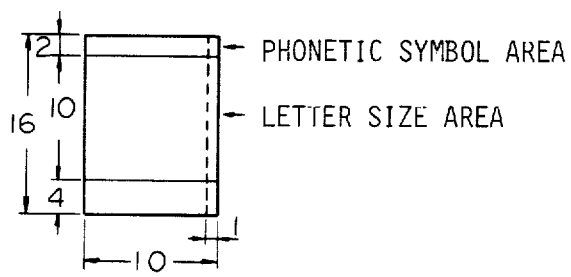
FIG. 14 is a diagram of a character block in a character generator shown in FIG. 11.

The character generators 254 and 256 respectively store the basic characters and the characters with diacritical marks shown in FIG. 15. As shown in FIG. 14, each of the characters with or without diacritical marks has an area defined by 16 dots vertically and 10 dots horizontally. The character generator 254 is adapted to process character data fed thereto from the V-RAM 250 via a latch 268 into a dot pattern indicative of a basic character. Likewise, the character generator 256 is adapted to process character data fed thereto from the other V-RAM 252 via a latch 270 into a dot pattern indicative of a diacritical mark.

The CRT controller 258 is supplied with clock pulses or the like from a clock generator 272 and in turn supplies the horizontal deflection circuit 220 and vertical deflection circuit 230 with the horizontal sync signal HS and vertical sync signal VS, respectively. Also, the CRT controller 258 supplies the video control 260 with a video timing signal VT and a cursor signal KS. The parallel data from the character generator 254 is fed to a shift register 274 and that from the character generator 256 to a second shift register 276. The serial outputs of the shift registers 274 and 276 are combined together by an OR gate 278. The output of the OR gate 278, which is the dot data of the basic character and diacritic, is supplied to the video control circuit 260. Then, the video control 260 delivers a video signal VD to the video amplifier 212 in response to the video timing signal VT and cursor signal KS from the CRT controller 258.

The display control effected by the CRT control 24 over the CRT display 22 will be briefly described.

First, the CPU 240 writes data in the addresses of the V-RAM's 250 and 252 which correspond to a desired display area on the surface of the CRT 210, in response to display data. The CRT controller 258 accesses the V-RAM's 250 and 252 in synchronism with the video timing signal VT adapted for the display on the CRT 210. Then, the data of basic character and diacritic output from the V-RAM's 250 and 252 are respectively converted by the character generators 254 and 256 into dot data of basic character and that of diacritic. The dot data are respectively processed by the shift registers 274 and 276 into serial data, combined by the OR gate 278 and then coupled to the video control 260. As a result, the video control 260 causes the CRT 210 to display character data generating a video signal VD which corresponds to the data stored in the V-RAM's 250 and 252.

Figure 17A:
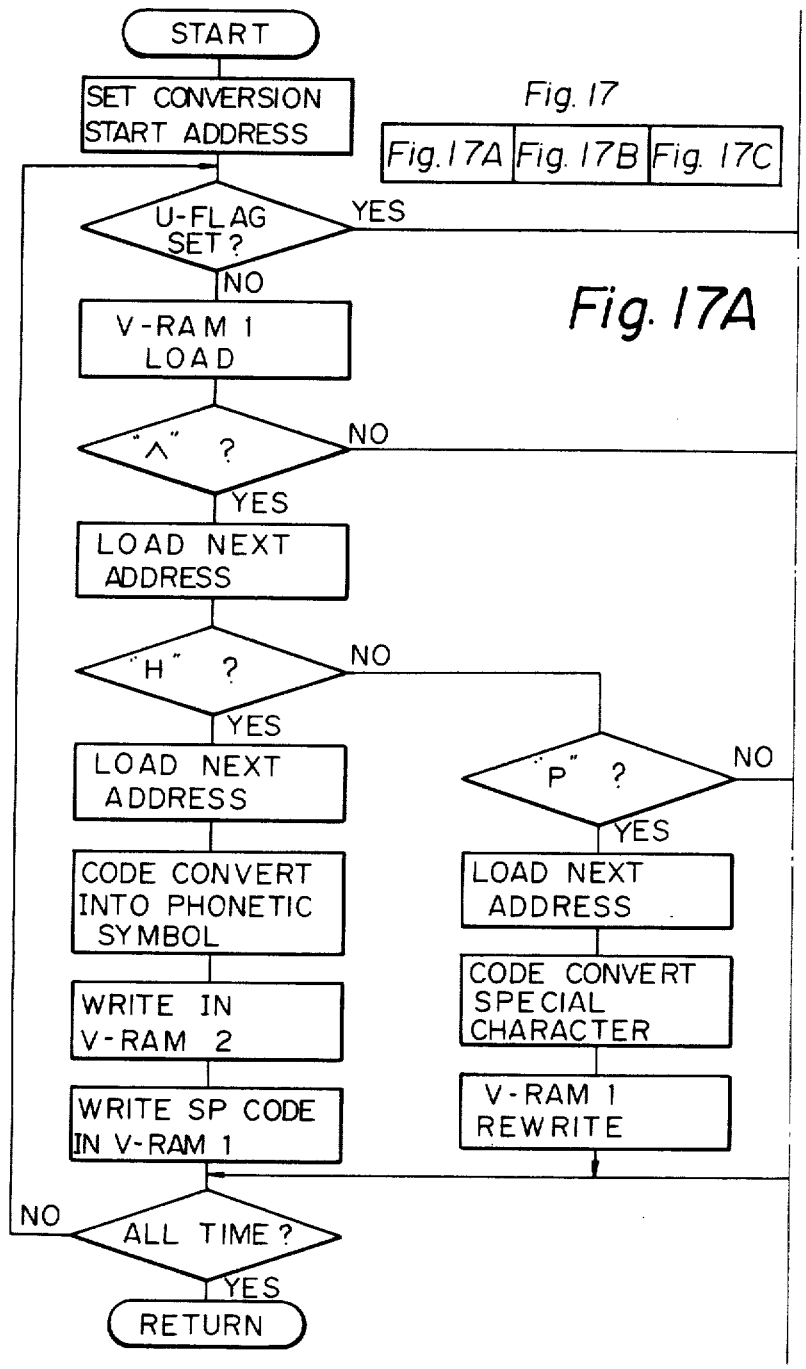
Figure 17C:
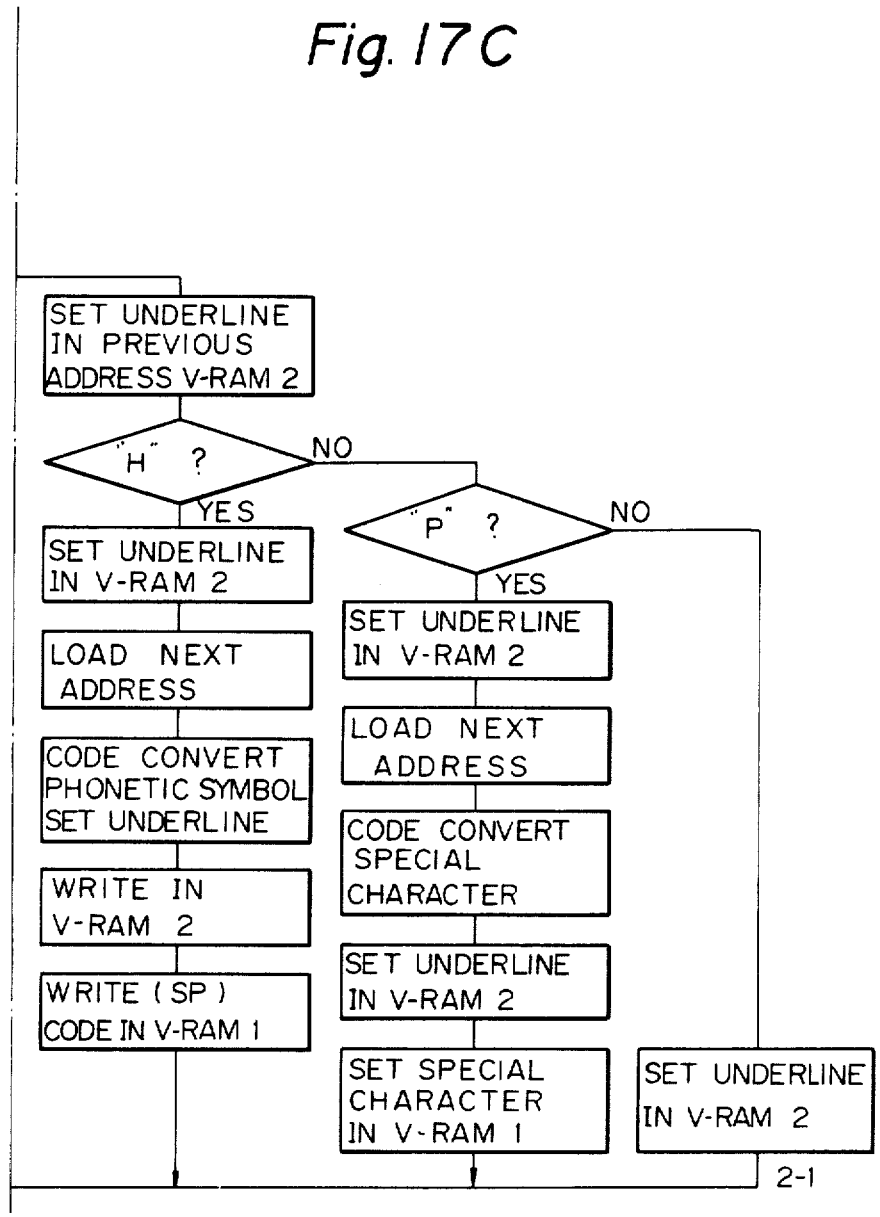

Now, the CRT control program stored in the ROM 242 of the CRT control 24 fulfills the following functions (1)–(5). The flow of a display control routine is shown in FIG. 16 and the flow of a display data conversion routine is shown in FIG. 17.

(1) Character Data Conversion for Display

This function will be described with reference to FIGS. 15–17.

(i) Character data to be displayed having seven or eight bits in accordance with the Japanese Industrial Standards is received (entered). In this embodiment, the character construction in the character display 20 is made up of one start bit, eight data bits and two stop bits, 11 bits in total.

(ii) All the characters in the area 2/0–2/F of FIG. 15 are entered as the code data shown in the same drawing and, therefore, not subjected to any code conversion (conversion of character data to be displayed).

(iii) Of the characters shown in A/1-F/F of FIG. 15, each of the characters in C/0-D/F other than the diacritical marks (referred to as "special characters" hereinafter) is input as 4-byte code data "5EH+50H+code of special character (where $b_7=0$)" as shown in FIG. 15. Thus, when the received data involves a code train "5EH+50H", the received data is converted into a code train "5EH+50H+code of special character" to display the special character. This will be discussed in detail taking the special character " Æ " for example.

Concerning the character " Æ ", making the code of this character shown in FIG. 15 $b_7=0$ gives a code "61H". Then, a code train "5EH=50H+61H" is entered. Although this received data should originally correspond to the display of " ∧, P, the actual display is " ∧, P, Æ " due to the previously stated code conversion to "5EH+50H+E1H".

(iv) All the characters with diacritical marks shown in Table 2 are input as 4-byte code data shown in FIG. 15 which is "code of basic character+5EH+48H+diacritical mark code ($b_7=0$)". Thus, where the received data involves a code train "5EH+48H" together with the basic character code, it is converted into a code train shown in FIG. 15 which is "basic character code+diacritical mark code+2DH+2DH". This will be described taking "Å" for example.

To display the character with diacritical mark "Å", the code of "°" shown in FIG. 15 is made b₇32 0 to give a code "4AH". Then, a code train "41H, 5EH, 48H, 4AH" is entered which should originally be displayed as "A, ʌ , H, J". Nevertheless, as previously described, the received data is converted into "41H, CAH+2DH+2DH" and, therefore, displayed as "˚ Å ", -, -".

As described above, to display a character other than the special characters and characters with diacritical marks, the 8-bit character code shown in FIG. 15 of the intended character is input in the character display 20. A special character is displayed by entering the combination of the character data of the character corresponding to b₇=0 of the code shown in FIG. 15 which indicates the desired special character, and additional character data " ʌ , P" which commands conversion of the character data to predetermined character data for display. Further, a character with a diacritic is displayed by entering character data of the basic character of the desired character in combination with character data " ʌ , H" which commands conversion of the character data into the character data shown in FIG. 15 which corresponds to b₇=0 of the associated code.

Thus, appearing on the display is the character data or its converted version on the basis of the result of entry of the character data and character data conversion command data. This permits all the character data which can be input through the keyboard 10 to be displayed on the character display 20.

(2) Normal Mode
This function will be described with reference to FIGS. 15–18.
  (i) In the normal mode, the system maintains its stand-by state ready to write received data in the RMA 244.
  (ii) When the received data is displayable character data (character code) or SUB data of the control data (control codes) shown in FIG. 18, the received data is displayed in the cursor position just before the reception and the cursor is advanced one column ahead. Table 9 shows the relationship between the control data (control codes) and the received data and in which "B.P.F" in the remarks stand for basic page format.
  (iii) When the received data is a displayable control code, a processing which the data requires is performed as will be described.
  (iv) When the received data is a code which corresponds to a blank both in FIGS. 15 and 18, and when it is DEL code shown in FIG. 15, the data is neglected without being processed and the system maintains the previous mode.
  (v) After a character or control code has been fully processed, the operation returns to the stand-by condition ready to write data in the RAM 244.

(3) Control Code
When the received data is one of the control codes shown in FIG. 18 which has a control function, controls (i)–(vi) shown below are selectively practiced.
  (i) Screen Clear
    In response to an FF (OCH) code, the display on the entire screen is deleted. The cursor is moved to the first column on the first line on the display surface, which is the uppermost and leftmost position.
  (ii) Return & Line Feed
    In response to a CR (0DH) code, the cursor is moved to the head of the existing line. Then, in response to an LF (0AH) code, the line is fed to the next with the cursor held in the same column position. This return and line feed operation does not erase the data from the cursor position over to the line end. If the cursor is in the final line when the LF code is received, the image surface is scrolled one line up while the cursor is set in the same column position on the same final line.
  (iii) Tabulation
    In response to a HT (09H) code, the cursor is set at 8-, 16-, 24-, 32-, 40-, 48-, 56-, 64-, 72- and 80-column positions skipping each eight columns from the left to the right.
  (iv) Backspace
    In response to a BS (08H) code, the cursor is returned one column to the left and the character already displayed is erased. If the cursor is in the first column, the received BS code is neglected without moving the cursor.
  (v) Underline (see FIG. 17)
    Of the CSI sequence functions, when a code " ʌ S (5EH, 53H)" indicative of "underline start" and a code " ʌ W (5EH, 57H)" indicative of "under line end" are received, an underline is displayed between " ʌ S" and " ʌ W". Thus, this is another case in which the character data is converted into predetermined one.
  (vi) ESC Sequence Mode
    An "ESC (LBH)" code is responded by an ESC sequence mode which will be described hereunder.

(4) ESC Sequence Mode
In response to an ESC code, an ESC sequence mode is set up and a display character code received next is utilized as an ESC sequence function code without having its associated character displayed.
  (i) Cursor-Up Control
    When the sequence of "ESC (1BH)+A (41͟ ' code is received, the cursor is moved one line up in the same column position. If the cursor is on the first line, it is not moved and the received sequence is neglected.
  (ii) Cursor-Down Control
    When the sequence of "ESC (1BH)+B (42H)" code is received, the cursor is moved one line down in the same column position. If the cursor is on the last line, the image surface is scrolled one line up while the cursor is set in the same column position on the same last line.
  (iii) Cursor Forward When the sequence of "ESC (1BH)+C (43H)" code is received, the cursor is moved one column to the right. When the cursor is in the end column of a line in the event of reception of this sequence, the cursor is moved to the first column of the next line. If the cursor is in the end column of the last line, then the image surface is scrolled one line up and the cursor is set in the first column of the same last line.

(iv) Cursor Back Forward

In response to a code "ESC (1BH)+D (44H)", the cursor is moved one column to the left. If the new position of the cursor is the first column, the cursor is no longer moved with the subsequent received code neglected.

(v) Cursor Home Control

In response to "ESC (1BH)+H (48H)" code, the cursor is set in the first column on the first line which is the uppermost and leftmost position on the display surface.

(vi) Cursor Addressing

In response to a code "ESC (1BH)+Y(59H)", an addressing mode is set up. The first one of two display character codes received next designates line no. and the second makes absolute designation of column no. Thus, the cursor can be set in any desired line and column position on the display surface according to the sequence of "ESC+Y+line designating character code". Tables 10 and 11 show cursor addressing designation codes. Based on these Tables, the first column on the first line is designated, for example, by the sequence of "ESC+Y+SP+SP".

(vii) Screen Clear

When the sequence of "ESC (1BH)+E(45H)" code is received, the display on the whole screen is erased. The cursor is set at the first column on the first line which is the uppermost and leftmost position on the screen.

(viii) Screen Erase

When the sequence of "ESC (1BH)+J (4AH)" code is received, the part of the display from the existing cursor position to the end column on the last line. At this instant, the cursor is not moved.

(ix) Line Erase

When the sequence of "ESC (1BH)+K (4BH)" code is received, the display is erased from the existing cursor position to the end column of the line. The cursor remains unmoved.

(x) Self-Diagnosis (a) When the sequence of "ESC (1BH)+U (55H)" code is received, "H" is displayed all over the screen and the cursor is set at the first column on the first line (b) When the sequence of "ESC (1BH)+V (56H)" code is received, displayable characters are displayed on the screen each at the interval of one space. The cursor is set at the first column on the first line.

(5) Received Signal Processing in ESC Sequence Mode

When the ESC sequence mode is set up, the foregoing processings are selectively practiced depending upon the content of the character code received next. Thereafter, either the normal mode or the ESC sequence mode is set up. Table 12 shows the relationship between received character codes, functions and post-processing modes.

As described above, the character display 2 serves to display character data and converted character data input through the keyboard 10, in response to form and control data introduced simultaneously with the character data. This allows one to prepare an edit a document on the character display 20.

THERMAL PRINTER 30

Figure 19B:
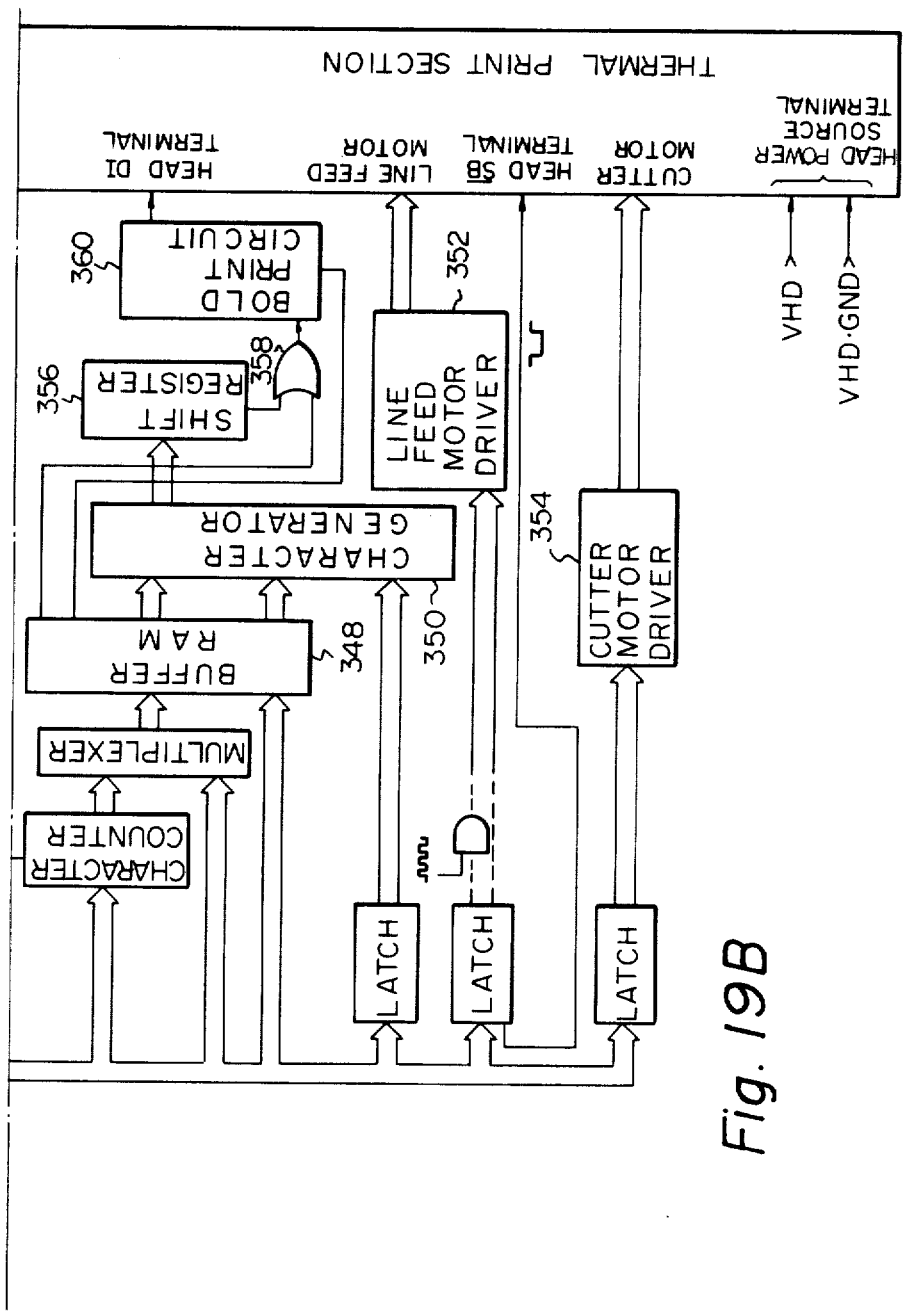
Figure 22A:
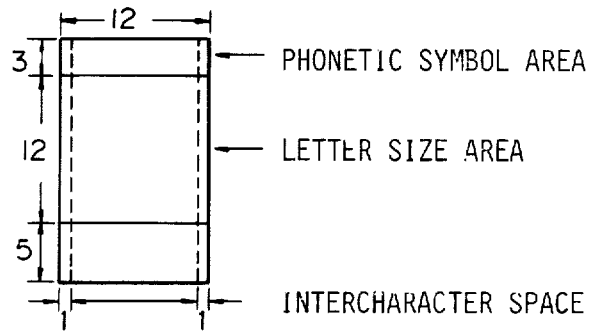
FIGS. 22a-22c are diagrams showing different examples of character blocks in the character generator shown in FIGS. 19A-19B.
Figure 22B:
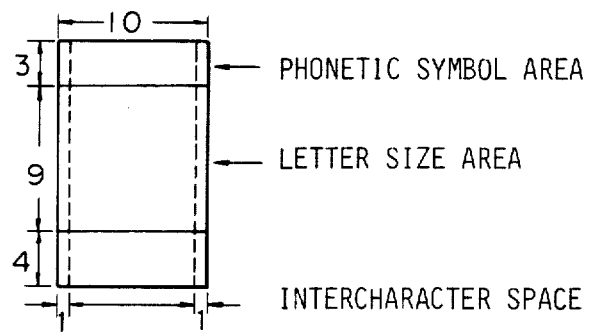
Figure 22C:
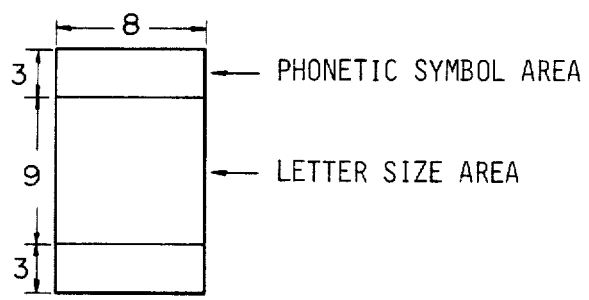

Referring to FIG. 19, the printer control 34 includes a CPU 340, a ROM 342, a RAM 344, an input buffer 346, a buffer RAM 348, a character generator 350, a line feed motor driver 352 and a cutter motor driver 354. The ROM 342 stores a printer control program for controlling the operation of the printing section 32. The RAM 344 stores various data and serves as a working area for running programs. The input buffer 346 is supplied with parallel data such as 8-bit print data PD and control data CD. Alternatively, the print data and control data may be input according to the USASCII codes shown in FIG. 21; the characters shown in the drawing are only illustrative.

The character generator 350 stores the characters shown in FIG. 23. Each of these characters comprises a dot pattern which is defined by 20 dots vertically and 12 dots horizontally in the case of a 1/10" character pitch, 16 dots vertically and 10 dots horizontally in the case of a 1/12" character pitch, and 15 dots vertically and 8 dots horizontally in the case of a 1/15" character pitch. Thus, the character generator 350 transforms character data into dot data. Concerning a character with a diacritical mark, the character generator 350 is supplied with data of its basic character and diacritic to compose one character. In FIG. 23, the symbols in the column C are for lower case characters and those in the column D are for upper case characters.

A shift register 356 processes the parallel data coupled thereto from the character generator 350 into serial data. The serial data is fed to the thermal printer section 32 via an OR gate, which receives underline data from the buffer RAM 348 at its other input terminal, and a bolt print circuit 360 adapted for bold print control in response to bold data output from the buffer 348.

The thermal printer 30 includes a control panel (not shown) which carries various switches and display lamps having the instructing or displaying functions stated below.

POWER switch: turning on the power source

PAPER FEED switch: momentary switch for feeding paper one line when operated once and becomes deactivated or feeds paper continuously up to TOF when operated continuously, the switch being effective only under offline condition.

OFFLINE/ONLINE switch: momentary switch which is actuated into online state when the power source is turned on and, thereafter, alternately into online and offline states at each time of operation.

LINE FEED PITCH SELECT switch: specifying a line feed pitch of 1/6", 1/4" or 1/3", the switch being effective only under offline condition.

CHARACTER PITCH SELECT switch: specifying a character pitch of 1/10", 1/12" or 1/15", the switch being effective under offline condition.

SELF-TEST switch: testing various functions and being effective under online condition.

HEAD RELEASE lever: enabling sheets to be loaded, releasing a head section, and setting up online mode.

AUTOMATIC CUTTER ON/OFF switch: controlling the drive of an automatic cutter

POWER lamp: turning on when the power source is turned on.

ONLINE lamp: displaying online condition and, when the offline switch or a SHEET EMPTY lamp is turned on, offline condition.

SHEET EMPTY lamp: turning on when sheet is absent or when the head is open and turning off when the online switch is turned on with the head closed, while flashing when the power source has failed.

The ROM 342 of the printer control section 34 stores a printer control program which fulfills the functions discussed below with reference to FIG. 20.

(1) Format Control
  (i) Space
    When a code SP (20H) is received, a printing head is moved one character to the right on the same line.
  (ii) Backspace
    In response to a code BS (08H), the head is moved one character to the left on the same line.
  (iii) Line Feed
    In response to a code LF (0AH), the operating position is shifted to the corresponding character position on the next line. If the LF code is received when an internal switch is in a new line position, a new line operation is performed.
  (iv) Reverse Line Feed
    In response to a code RLF (8DH), the operating position is shifted to the corresponding character position on the immediately preceding line.
  (v) Page Feed
    In response to a code FF (0CH), the operating position is advanced to the corresponding character position on the first line of the next form (page). At this instant, a broken line (alternating "-" and SP codes) is printed out at the boundary between the successive pages as designated by a page format selection code, which will be described. When the FF code has arrived while the AUTOMATIC CUTTER ON/OFF switch is ON, the paper is cut at TOF. When it has arrived while the AUTOMATIC CUTTER ON/OFF switch is OFF, a broken line is printed out.
  (vi) Return Line Feed
    In response to a code CR (0DH), the operating position is shifted to the home position on the same line. This action occurs only when the CR code is preceded by or followed by an LF code.
  (vii) Partial Line Lowering
    A PLD (8BH) code designates start-of-subscript or end-of-superscript. In response to this PLD code, the operating position is lowered 1/12" vertically and the characters appearing up to the reception of the next PLU (8CH) code are treated as a subscript.
  (viii) Partial Line Raising
    A PLD (8CH) code designates a start-of-superscript or end-of-subscript. In response to this code, the operating position is raised 1/12" vertically and the characters appearing up to the reception of the next PLD code are treated as a superscript.

(2) Display Control
  (i) Page Format Selection
    In response to a code "CSI (9BH)+Pn (parameter)+SP (20H)+J (4AH)", a page format is specified in accordance with the parameter Pn upon the arrival of the following FF (0CH) code. The relationship between the parameter Pn and the page format is as follows.
    Pn=0: standard page format, oriented longitudinally
    Pn=1: standard page format, oriented transversely
    Pn=2: A4 page format, oritented longitudinally
    Pn=3: A4 page format, oriented transversely
    The default value of the parameter Pn is Pn=0.
  (ii) Selection of Graphic Modification
    In response to a code "CSI (9BH)+Pn (parameter)+m (6DH)", whether or not the following text requires an underline. The relationship between the parameter Pn and the underline is as follows.
    Pn=0:no underline or end underline
    Pn=4: start underline
    The default value of the parameter Pn is Pn=0.
  (iii) Horizontal Space Selection
    In response to a code "CSI (9BH)+Pn (parameter)+SP(20H)+K(4BH)", the spacing (pitch) of the following characters is determined. The parameter Pn is variable in any position of a page and becomes effective after the reception of the next CR (0DH) and LF (0AH) codes. The relationship between the parameter Pn and the character pitch is as follows.
    Pn=0: 1/10"
    Pn=1: 1/12"
    Pn=2: 1/15"
    The default value of the parameter Pn is Pn=0.
  (iv) Vertical Space Selection
    In response to a code "CSI (9BH)+Pn (parameter)+SP(20H)+L (4CH)", the spacing (line feed pitch) between the lines of the following text is determined. The parameter Pn is variable at any position of a page and becomes effective when the next LF (0AH) or RLF (8DH) code is received. The relationship between the parameter Pn and the line feed pitch is as follows.
    Pn=0: 1/6"
    Pn=1: 1/4"
    Pn=2: 1/3"
    Pn=3: 1/12"
    The default value of the parameter is Pn=0.

(3) Print Control
  (i) Character Code Sequence
    (a) In response to a code "diacritical mark code+basic character code", a character with a diacritical mark shown in Table 2 is printed out.
  (b) In response to a code "non-spaced underline code (CCH)+character code (20H-7FH, A1H-BFH, D0H-FEH)", a character with a non-spaced underline is printed out.
  (c) In response to a code "character code+BSP (08H)+underline (5FH)", a character with a spaced underline is printed out.
 (ii) Character Replacement
   In response to a SUB (1AH) code, an error mark "?" is printed out in the corresponding print position.
(4) Other Controls
 (i) Bold-Faced Printing
   In response to a code "ESC (1BH)+B (42H)", bold printing (printing with the line thickened one dot in the horizontal direction) is started or terminated.
 (ii) Left Margin Setting
   In response to a code "ESC (1BH)+O (4FH)+Pn (parameter)", the print position is immediately shifted to the column position which corresponds to the parameter Pn, at the existing character pitch. Thereafter, the left margin position does not change unless changed by the LMS code.
 (iii) Restoration
   In response to a code "ESC (1BH)+R (52H)", the system is initialized to the condition which was set up when the power source was turned on, after the operation for all the data received up to that time has been completed.
 (iv) Automatic Paper Cut
   In response to a code "ESC (1BH)+E (45H)", the paper is cut at TOF if the AUTOMATIC CUTTER ON/OFF switch is ON and is cut at the then existing print position if the switch is OFF.
 (v) Automatic New Line
   When character codes are input beyond the maximum allowable number of characters on the line during printing operation with a specified pitch, the line is automatically fed to continue the printing operation.
 (vi) Self-Test
   The test characters (7FH, A0H, FEH) shown in FIG. 23 are generated and printed out automatically.

Where the communication terminal unit is constituted by the thermal printer as discussed above, significant reliability of operation is achieved due to thermal printing which is one supply. Additionally, the printing operation can be sped up due to the high printing rate.

EXTERNAL STORAGE 50

The FDD's 52 and 54 of the external storage 50 comprise known 8" both-side double density drive floppy disc devices and, therefore, details thereof will not be described for simplicity. The FDD control 56 forms part of the system control 80 and, therefore, it will be described in detail in connection with system control 80.

COMMUNICATION CONTROL (CCU) 60

Figure 24:
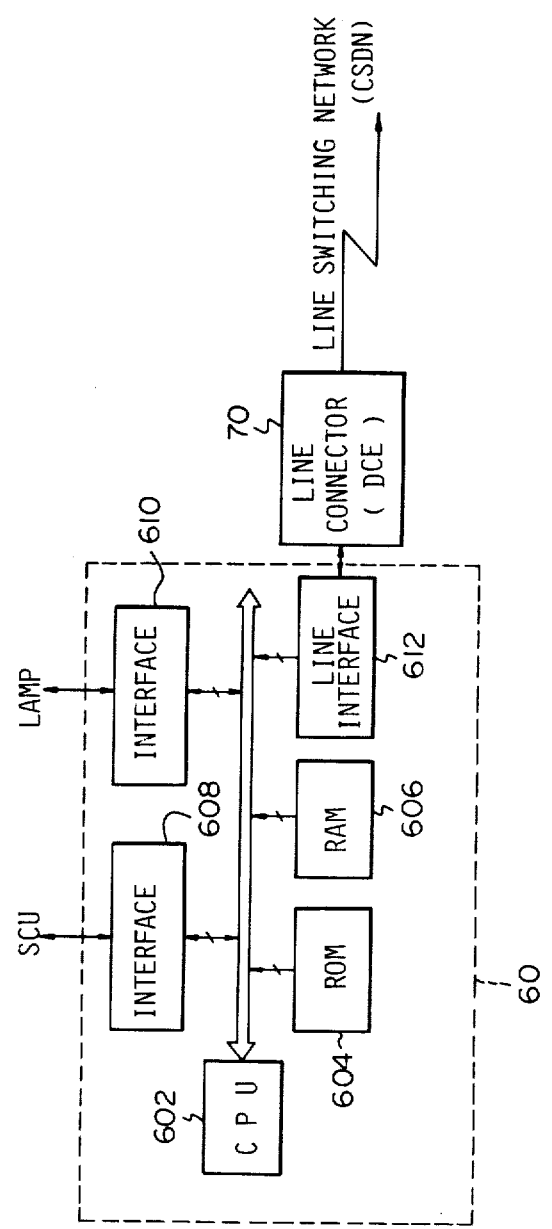
FIG. 24 is a block diagram showing the constructions of a communication control and a line terminal unit shown in FIG. 2.

Referring to FIG. 24, the communication control 60 includes a CPU 602, a ROM 604, a RAM 606 for storing document data, interfaces 608 and 610 and a line interface 612. The ROM 604 stores a CCU control program for the control of transfer of transmission document data and received document data. The RAM 606 temporarily stores such data while serving as a working area for practicing a program. The interface 608 exchanges data with the system control 80. The interface 610 supplies data to the display lamp 62 which is adapted to store that the RAM 606 has stored transmission document data. Further, the line interface 612 exchanges data with the line connecting section 70. Details of the interface 608 will be described later in connection with the system control 80.

Figure 25:
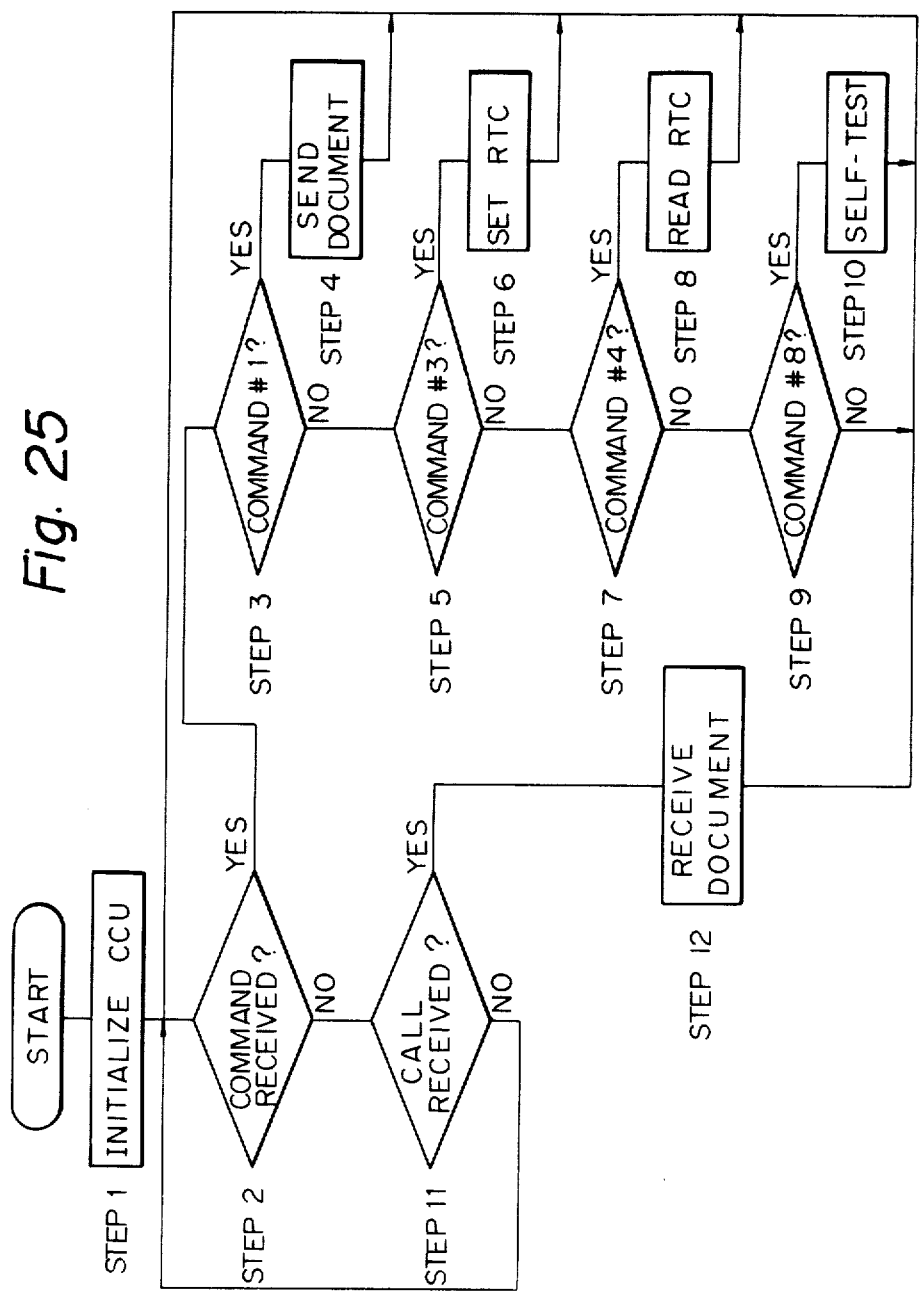
FIG. 25 is a flowchart schematically showing the entire CCU control program of FIG. 3.
Figure 26:
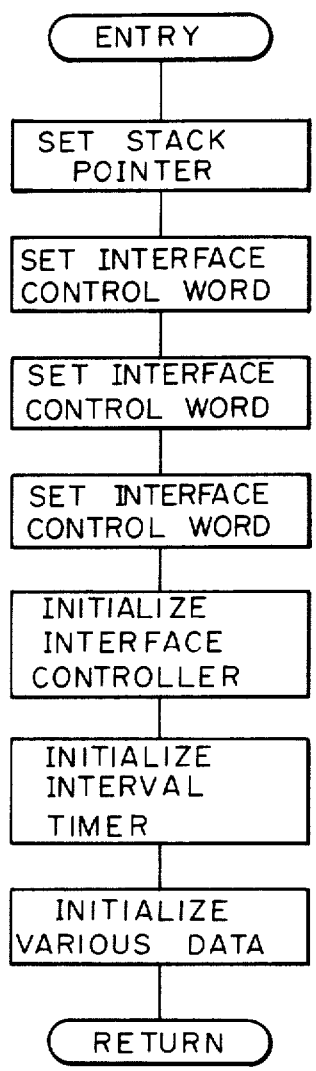
FIGS. 26-28 are flowcharts respectively representing a CCU initialize routine, a document send routine and a document receive routing each shown in FIG. 25.

Referring to FIG. 25, the CCU control program stored in the ROM 71 will be described in detail.
 STEP 1: The communication control 60 is initialized. The CCU initialize routine is shown in FIG. 26.
 STEPS 2-10: In response to a command from the system control 80, the document send, RTC set, RTC read and self-test are selectively practiced depending on the received command. "RTC" in the drawing stands for real time clock.
 STEPS 11, 12: In response to a call from another communication terminal unit, the document send control is effected.

Figure 27:
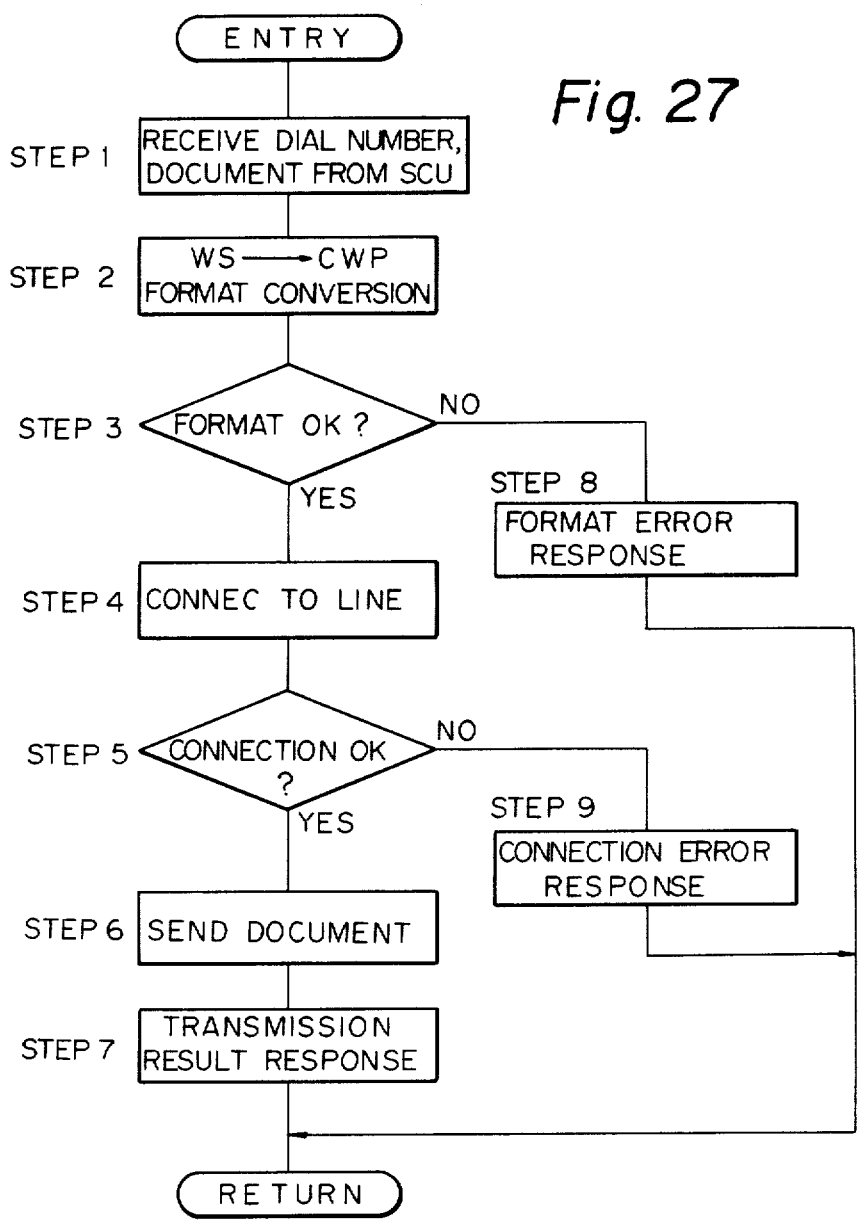
Figure 28:
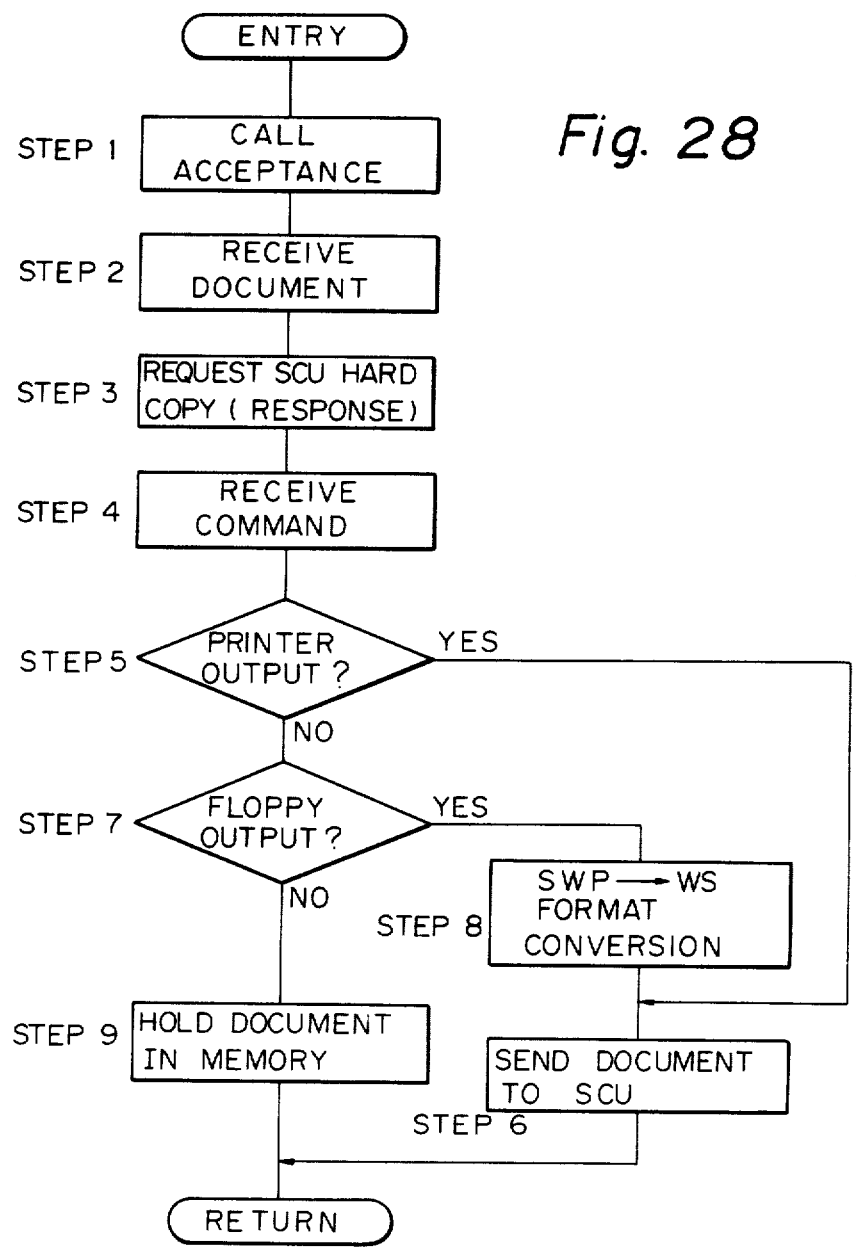

FIG. 27 is a flowchart showing the document send routine practiced at the STEP 4 of FIG. 25. In FIG. 27,
 STEP 1: The communication control 60 receives from the system control (SCU) 80 the dial number of a desired remote station together with transmission document data.
 STEP 2: Because the transmission document data from the system control 80 is in the WordStar (WS) format, it is transformed into the format for word processing terminal units capable of international communication (referred simply as "terminal unit (CWP) format" hereinafter). The transformed data is stored in the RAM 606.
 STEPS 3, 4: After the format conversion, the terminal device is connected to the line.
 STEPS 5-7: After the line connection, the transmission document data is transferred to the line connecting section 70 to be transmitted. The result of transmission is notified to the system control 80.
 STEPS 8 or 9: If the format conversion or the connection to the line has failed, the result is notified to the system control 80. Referring to FIG. 28, the document receive routine at a STEP 12 will be described. In FIG. 28,
 STEPS 1, 2: In response to a call from a remote terminal unit, the communication control 60 performs a predetermined processing, receives document data coming in through the line connecting section 70, and stores them in the RAM 606 for a moment.
 STEPS 3, 4: The communication control 60 informs the system control 80 of the storage of the received document data in the RAM 606 and receives a command from the system control 80.
 STEPS 5-8: If the command from the system control 80 commands recording at the thermal printer 30, the communication control 60 feeds the received document data to the system control 80. If the command commands storage in the external storage 50, the communication control 60 supplies the data to the system control 80 after transforming the format of the data.
 STEP 9: If the command from the system control 80 instructs the communication control 60 to hold the data in the RAM 606, the latter maintains the data in the RAM 606. However, when the capacity of the RAM 606 has approached its limit, the supply of the data to the thermal printer 30 or the external storage 50 has priority to the data hold in the RAM 606. Details of the conversion between the Word-Star (WS) format and the terminal unit (CWP) format at the STEP 2 of FIG. 27 and STEP 8 of FIG. 28 will be later described in detail in conjunction with the printer output program in SYSTEM CONTROL 80.

In this manner, the communication control 60 has the RAM 606 for storing document data so as to control the transmission and reception of document data independently of the operator's local work. When received document data is stored in the RAM 606, the communication control 60 informs the system control 80 of the storage and delivers the data from or holds the data in the RAM 606 depending upon a command from the system control 80. With this construction, document data can be received from another terminal unit even though both terminal printer 30 and external storage 50 may be unusable. This promotes high speed data transmission.

The communication control 60 is connected to the line switching network by the line connecting section 70.

The protocol for the line connection, transmission and reception occurs according to various layers which conform to the CCITT's advice and are enumerated below:

(i) line switching interface (layers 1, 2)
(ii) link layer, network layer procedure (layers 2, 3)
(iii) transportation layer procedure (layer 4)
(iv) session document layer procedure (layer 5)

For details of these layers, refer to CCITT's advice F.x, S.c, S.d, S.f, S.h, X.75 and Nippon Telegraph and Telephone Public Corporation's "Interfaces for Line Switching Services".

SYSTEM CONTROL 80

Figure 29B:
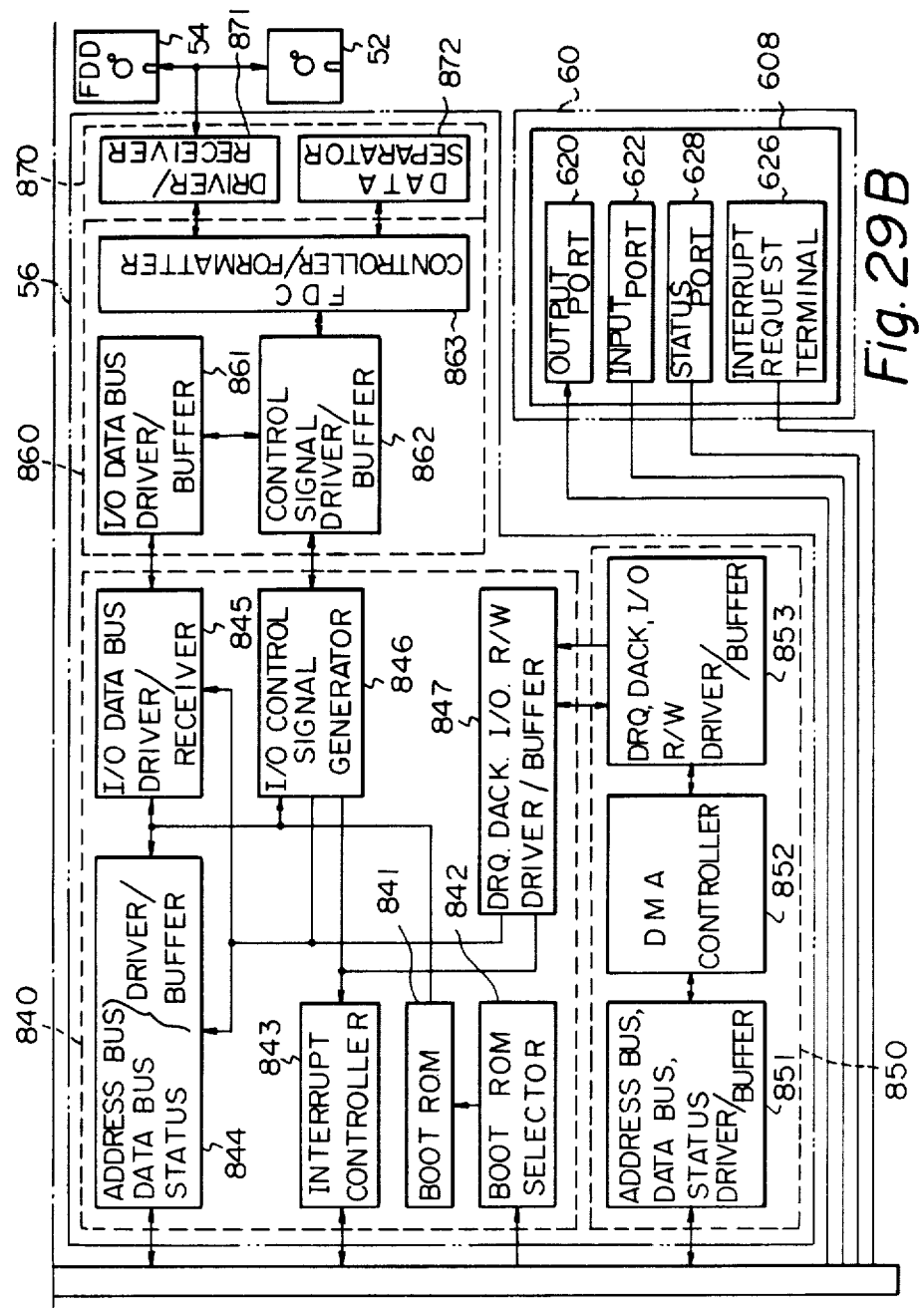

Referring to FIG. 29, the system control 80 comprises a CPU unit 810, a dynamic RAM or D-RAM unit 820, an interface unit 830 for the keyboard 10, character display 20 and thermal printer 30, and the FDD control 56 made up of an interface unit 840, a universal DMA unit 850, FDC controller formatter unit 860 and an FDD interface unit 870. The CPU unit 810 includes a CPU 811, a clock generator 812, an interrupt controller 813, a parallel I/O 814 supplied with parallel data and a driver/buffer 815. The D-RAM unit 920 includes a D-RAM 821 having a storage space which is divided into a system area, banks #0 and #1, a D-RAM controller 822 adapted to control the switching of the banks #0 and #1 from one to the other, and a driver/buffer 823. The interface unit 830 includes a driver/buffer 831, an interrupt controller 832, an interface 833 for the keyboard 10, an interface 834 for the character display 20 and an interface 835 for the thermal printer 30.

The interface unit 840 includes a boot ROM 841 for storing boostrap, a boot ROM selector circuit 842, a driver/buffer 844, an I/O data bus driver/buffer 845, an I/O control signal generator 846 and a DRQ, DACK, I/O, R/W driver/buffer 847. "DRQ" stands for DMA request, "DACK" for DMA request acknowledged and R/W for read/write. The universal DMA unit 850 includes a driver/buffer 851, a DMA controller 852, and DRQ, DACK, I/O, R/W driver/buffer 853. The interface unit 840 and universal DMA unit 850 cooperate to constitute a CPU interface for the FDD's 52 and 54 which controls the exchange of commands, statuses, track addresses, sector addresses and like control data as well as the transfer of storage data.

The FDC controller formatter unit 860 includes an I/O data bus driver/receiver 861, a control signal driver/buffer 862 and an FDC controller formatter 863. This unit 860 functions to control the head positioning based on storage data and control data from the interface unit 840 and to read or write data according to a format. The FDD interface unit 870 includes a driver/receiver 871 and a data separator 872. This unit 870 controls the signal exchange between the FDC controller formatter 863 and the FDD's 52 and 54 and separates read data into data and clock pulses.

In the system control 80 thus constructed, the previously mentioned operating system (OS), file maintenance program, word processing program, display output program, printer output program, CCU transmission program, CCU reception program and other programs are stored in a floppy disc. When the power source is turned on, a reset signal RESET is fed to the boot ROM selector 842 so that the OS, file maintenance program and CCU reception program are loaded in the system area of the D-RAM 821 in accordance with the bootstrap stored in the boot ROM 841. The other programs are selectively practiced by manipulating the keys on the keyboard 10 to input the file name of a selected program. Then, based on the OS, a program corresponding to the file name is read from the floppy disc into the non-resident program area of the D-RAM 821.

Hereinafter will be described the various programs on which the operation of the system control 80 is based.

(1) OS & File Maintenance Program

Concerning this program, reference is made to the MP/M User's Manual because it uses the general purpose MP/M software as already mentioned.

(2) Word Processing Program

Again, this program uses the general purpose WordStar software and will become apparent from the WordStar User's Manual.

(3) Display Output Program

The file of the WordStar (WS) format designated by keys on the keyboards 10 is read from the floppy disc. After format conversion, the file containing characters with diacritical mark symbols and special characters in terminal unit (CWP) format codes is supplied to the character display 20. The following functions (a)–(i) are satisfied.

(a) In response to manipulation of the keys OA>TYP↵", the program is read from the file into the D-RAM 821. As the run begins, the character display 20 displays on its associated CRT 210

ΔΔΔFILEΔNAMEΔ?

Then, the file name is input through the keyboard 10 and, if it consists of lower case characters, they are converted into upper case characters.

(b) When the question in (a) is answered only by the "↵" key, the control is returned to OS.

(c) When the file name input through the keyboard 10 is read, whether the file name matches with the format of the MP/M file name is checked. If erroneous, the CRT 210 displays
ΔΔΔΔΔERRORΔFILEΔNAMEΔFORMAT
and displays the question in (a) again.
(d) The designated file is opened. If the file is not found, the CRT 210 displays
ΔΔΔΔΔERRORΔFILEΔNOTΔFOUND
and displays the question in (a).
(e) The data in the designated file is read out sequentially one block at a time by use of a system call.
(f) The read data is subjected to code conversion as shown in Table 13.
(g) The code-converted data is coupled to the character display 20 and displayed using a system call.
(h) Upon completion of the output to the character display, the question shown in (a) is displayed on the CRT 210.
(i) This program is performed under MP/M.

(4) Printer Output Program

The file of the WordStar (WS) format specified through the keys on the keyboard 10 is read from the floppy disc, transformed into codes of the terminal unit (CWP) format, and fed to the thermal printer 30. This program fulfills the following functions.
(a) The keys "OA>PRINT⏎" are depressed to read the file into the D-RAM 821. As the run begins, the CRT 210 of the character display 20 displays
ΔΔΔFILEΔNAMEΔ?
and inputs the file name which is entered through the keyboard 10.
(b) When the file name is input, whether or not it matches with the format of the MP/M file name is checked and, if erroneous, the CRT 210 displays
ΔΔΔΔΔERRORΔFILEΔNAMEΔFORMAT
and the control returns to OS.
(c) The file is opened. If the file is not found, the CRT 210 displays
ΔΔΔΔΔERRORΔFILEΔNOTΔFOUND
and the control returns to OS.
(d) If the file has been opened, a queue is read out for mutual exclusion which prevents the use of the thermal printer 30 from conflicting with the print program of the received document data. The queue if read out shows that the use of the thermal printer 30 has been permitted.
(e) The data is read out block by block sequentially from the designated file by use of a system call.
(f) The read data is subjected to code conversion shown in FIGS. 14–16. The codes not shown in these Tables are not converted.
(g) The data undergone code conversion and the data unnecessitated code conversion are fed to and printed out by the thermal printer 30 using a system call.
(h) At the end-of-file, a message is written in the cross exclusion queue to indicate the end of use of the thermal printer 30 and the control returns to the OS.
(i) This program occurs under MP/M.
(j) Additionally, the status of the thermal printer may be read to control the irregular processing in accordance with the status.

(5) CCU Transmission Program

The file of the WordStar format designated through the keyboard 10 is read from the floppy disc and fed to the communication control 60. The dial number of a remote terminal device or addressee input through the keyboard 10 is also supplied to the communication control 60. This program satisfies the following functions (a)–(m).
(a) The keys "SEND⏎" are depressed so that the program is read from the file into the D-RAM 821. Then, the CRT 210 of the character display 20 displays
ΔΔΔDOCUMENTΔSENDΔPROGRAM.
(b) The communication control 60 supplies the system control 80 with the date and time of real time clock in the control 60. The CRT 210 displays the data and time, for example, May 28, 1981, 11.42, as
ΔΔΔDATAΔTIMEΔΔMAY. 28Δ'81Δ11.42
(c) The CRT 210 displays
ΔΔΔFILEΔNAMEΔ?
and the file name entered through the keyboard 10 is input.
(d) When the file name entered through the keyboard 10 is input, whether the file name matches with the format of the MP/M file name is checked and, if erroneous, the CRT 210 displays
ΔΔΔΔΔERRORΔFILEΔNAMEΔFORMAT
and then the question in (c).
(e) The file is opened. If the file is not found, the CRT 210 displays
ΔΔΔΔΔERRORΔFILEΔNOTΔFOUND
and then the same question as in (c).
(f) If the file has been opened, the CRT 210 displays
ΔΔΔDIALΔNUMBERΔ?
and the system control receives the addressee's dial number through the keyboard 10.
(g) Whether the dial number input through the keyboard 10 is a 7-digit number (in the case of NTT DDX) is checked, and, if not, the CRT 210 displays
ΔΔΔΔERRORΔDIALΔNUMBER
and the operation returns to (e).
(h) The dial number and the data of the designated file are fed to the communication control 60. The format (code) conversion for the data shown in Tables 14–16 is performed by the communication control 60 as previously described (see FIG. 27).
(i) The system control 80 receives the result of transmission from the communication control 60. If the transmission has been completed, the CRT 210 displays
ΔΔΔSENDΔCOMPLETION
but, if the transmission has failed due to error,
ΔΔΔΔERRORΔXXX ... XΔSENDΔFAIL
Here, "xxx ... x" indicates a kind of the error.
(j) The result of transmission fed from the communication control 60 is stored in a predetermined file.
(k) The CRT 210 displays
ΔΔΔΔERRORΔSYSTEMΔn
when any error has occured in the exchange of commands and responses between the communication control 60 and the system control 80. In this instance, "n" is a numeral.

(l) This program occurs under MP/M.

(m) For preparing this program, reference is also made to a CCU interface program which will be described.

(6) CCU Reception Program

The system control 80 receives document data received by the communication control 60 and instructs to print out, store or hold the data in the communication control 60, depending upon the states of the thermal printer 30 and external storage 50. This program fulfills the following functions (a)–(k).

(a) This program is loaded in the D-RAM 821 simultaneously with initial loading of MP/M and is capable of running whenever the communication control receives document data.

(b) This program remains in a waiting state until the communication control 60 requests by interruption to inform it of the reception of document data.

(c) Once out of the waiting state, the program checks whether or not the thermal printer 30 is usable and, if so, instructs the communication control 60 to feed the data to the system control 80.

(d) If the thermal printer 30 is unusable, fresh one of the files for storing received document data is searched and prepared. Then, the communication control is instructed to supply the data to the system control 80. As already mentioned, the format conversion as shown in FIGS. 14–16 is carried out at the communication control 60 (see FIG. 28).

(e) If the thermal printer 30 is unusable and no fresh file is available, the system control 80 notifies the communication control 60 that it cannot accept the received document data.

(f) The system control 80 prints out the data fed from the communication control 60 on a paper sheet at the thermal printer 30 or stores the data in the file of the external storage 50.

(b) Before using the thermal printer 30, another program is employed to check whether or not the thermal printer 30 is in operation by use of the MP/M queue 'MX List$\Delta\Delta$'. If the thermal printer 30 is in use, this program is held in the waiting state by MP/M until the printer becomes usable.

(h) The result of reception of the document data is stored in a predetermined file.

(i) After the reception processing, the operation returns to (b).

(j) This program proceeds under MP/M.

(k) For preparing this program, reference is also made to a CCU interface program which will be described hereunder.

The CCU interface program is referred to in preparing the CCU transmission and reception programs. This program prevents the exchange of commands and responses between the communication control 60 and the system control 80 from conflicting with each other in the interface 610 of the communication control 60, due to the run of the CCU transmission and reception programs.

Referring to FIG. 29, the interface 608 of the communication control 60 comprises an 8-bit output port 620 for the delivery of data from the system control 80 to the communication control 80, an 8-bit input port 622 for the delivery of data from the communication control 60 to the system control 80, a status port 622 for outputting status data, and an interrupt request terminal 626 for requesting the system control 80 an interruption. The status port 624 indicates a data set status at the output port 620 when $d_0-1$, a data set status at the input port 622 when $d_1=1$, and an idle state when $d_2=1$ which in neither the transmission state nor the reception state.

Next, description will be made of the commands and responses exchanged between the communication control 60 and the system control 80.

(a) Commands

The commands with which the system control 80 requests the communication control 60 to practice the various functions are constituted by the code trains shown in Table 17.

(b) Responses

Table 18 shows code trains which are the responses the communication control 60 makes upon accepting the commands from the system control 80. Table 19 shows code trains which are the responses the communication control makes when it does not accept the commands.

(c) Kinds of Commands and Responses

Tables 20–22 show the kinds of commands and responses.

The kinds of such commands and responses will be described with reference to Tables 20–22.

(i) Function no. 1: The system control feeds a document to the communication control 60 in order to transmit a document which is stored in the document send file. An addressee's dial number is added to the head of the document code train.

(ii) Function no. 2 (document receive): The system control is supplied with a document which the communication control 60 received. In this case, a response precedes a command, that is, the communication control delivers a response to request interruption when received a document. Then, the system control delivers a command with a parameter which designates the thermal printer 30 or the external storage 50.

(iii) Function no. 3 (RTC set): The data and time is set in the real time clock (RTC) included in the communication control 60.

(iv) Function no. 4 (RTC read): The data and time indication by the real time clock in the communication control is read.

(v) Function no. 5 (self-test): The communication control is caused to test itself.

Next, the CCU interface program will be described.

Referring to FIGS. 30–33, there are shown the commands and responses which appear in a background program, foreground program, interrupt routine and CCU receive routine.

(a) Foreground Routine

Figure 30:
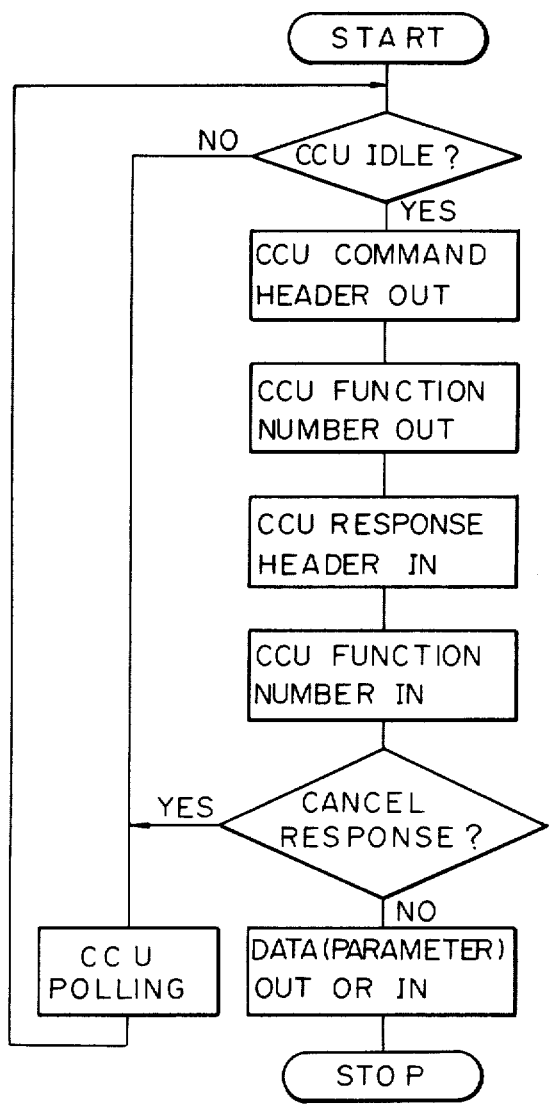
FIGS. 30-33 are flowcharts respectively showing a foreground program, a background program, an interrupt routine and a CCU receive routine used for the description of the system control shown in FIG. 30.

The foreground routine is shown in FIG. 30.

(i) CCU Idle

The idle state of the communication control implies that the background routine (CCU reception program) is waiting. In this situation, the foreground routine is allowed to freely use the interface 608 thereby causing the exchange of commands and responses. At this instant, the communication control must not respond to a call from the line until the processing of the function completes.

(ii) CCU Not Idle

The non-idle state of the communication control implies that a received document is present in the RAM 606 of the communication control. While the communication control 60 is also non-idle during transmission, a command will never be delivered from the foreground routine during transmission. In this case, the foreground program is maintained in the waiting state by CCU polling (see MP/M) until the communication control becomes idle. During this period of time, the background program rereceives the received document exclusively using the interface 608.

(iii) Cancel Response

This response appears when the communication control 60 becomes busy after the foreground routine has sensed the CCU idle state. Then, the communication control 60 delivers a cancel response against a command from the foreground program, in order to give priority to the transfer of the received document to the system control 80.

(b) Background Program

Figure 31:
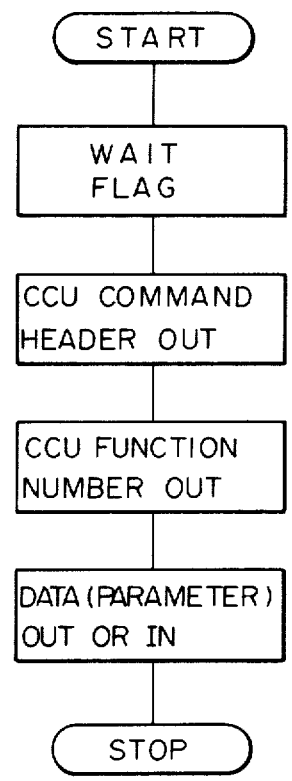
Figure 32:
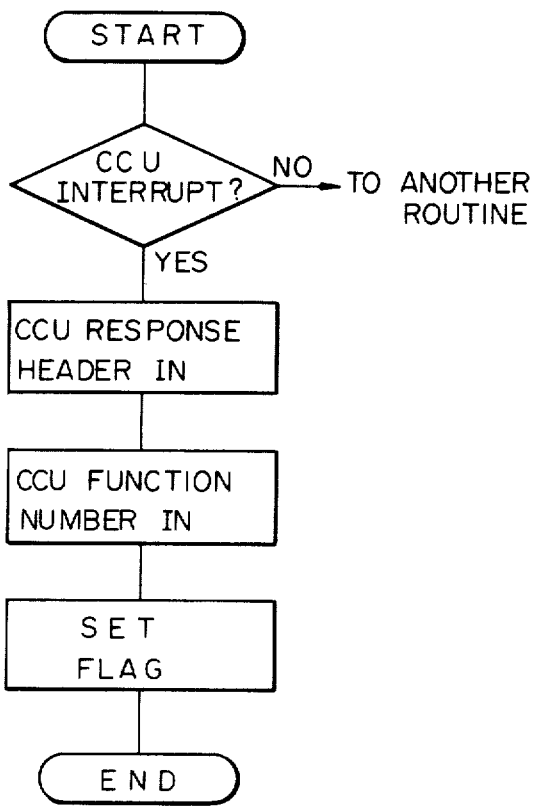

This program will be described with reference to FIGS. 31 and 32.

The background program is resident in the D-RAM 821 of the system control 80 but, before the communication control 60 delivers a received document output request, it is held in a FLAG WAIT (see MP/M) state. Then, as shown in FIG. 32, the background program inputs a response and sets FLAG by the interrupt routine in response to an interrupt request. Thus getting out of the waiting state, the background program exclusively uses the interface 608 to accept the received document fed from the communication control 60.

(c) CCU Receive Routine

Figure 33:
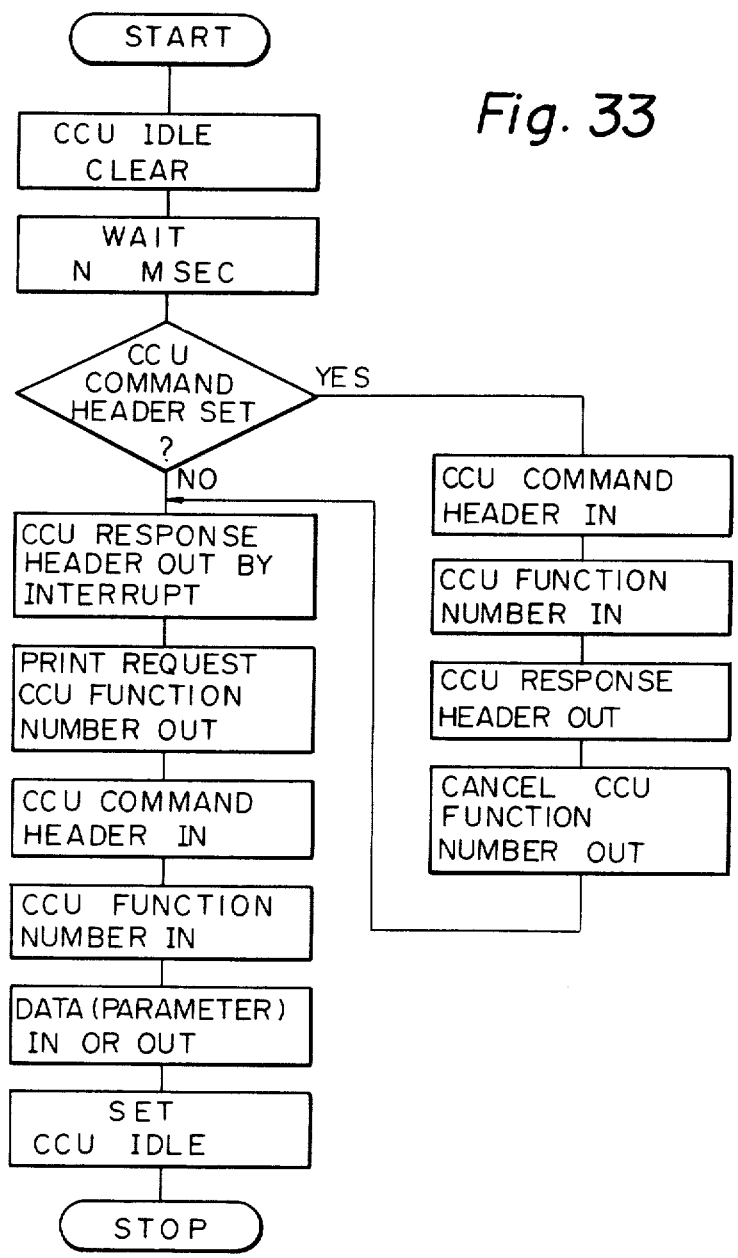

This program will be described with reference to FIG. 33.

When the received document is to be handed on to the system control 80, the CCU receive routine clears the CCU idle state so as to prevent the foreground routine from using the interface 608. Because the foreground routine may deliver a command just before clearing the CCU idle, the routine waits 40 msec, for example, and sees whether or not a command arrives. If it arrives, the routine delivers a cancel response; if not, the routine supplies the system control with a print request response by interruption, delivers the received document, and then sets CCU idle.

Such hardware and software constructions prevent the commands and responses from conflicting with each other at the interface 608 due to the CCU transmission and CCU reception programs.

Thus, the system control 80 is designed to control the system based on the general purpose soft ware. This readily permits the various units to be totally controlled for office automation.

Figure 34B:
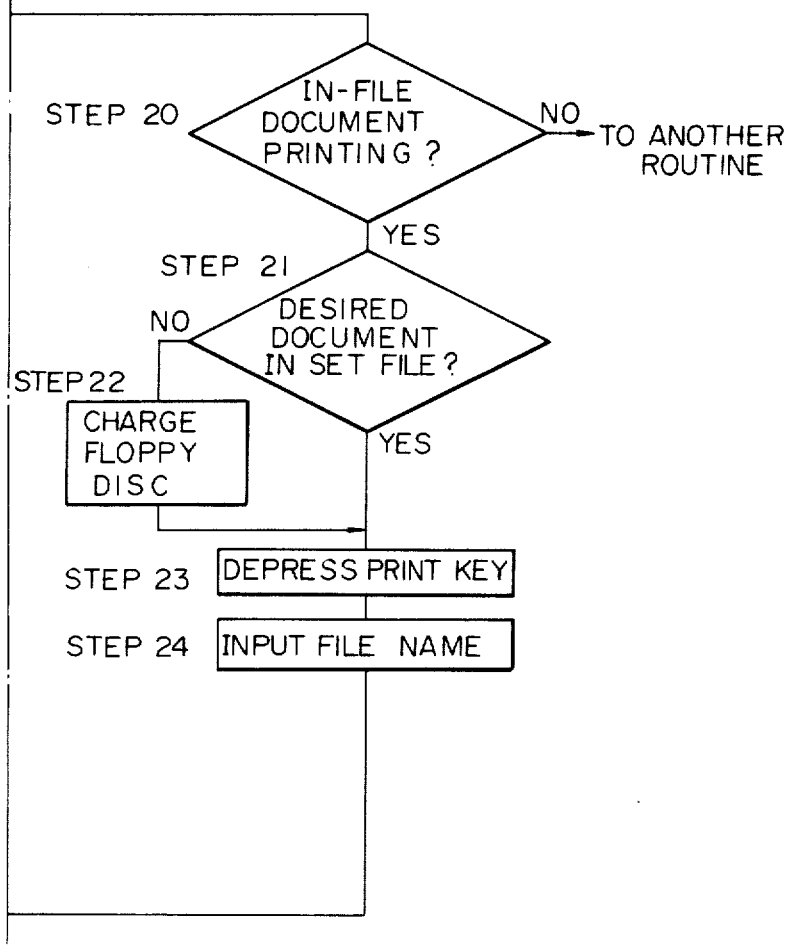

Reference will also be made to FIG. 34 to describe the procedure for operating the terminal device described hereinabove.

(1) Preliminary Operation (STEPS 1-3)

The floppy disc storing the OS, file maintenance program and the like for the system control 80 is loaded in the FDD 52 and, then, the main switch of the device is turned on. The OS, file maintenance program and CCU reception program are loaded in the D-RAM 821 of the system control 80, preparing the device for manipulation and reception. Thereafter, a floppy disc is loaded in the other FDD 54 to see whether the keyboard 10 is manipulatable.

(2) Preparation or Correction of Document (STEPS 4-12)

Whether or not to use the file of the loaded floppy disc is decided and, if not, the floppy disc is replaced by another which has a desired file. The keyboard 10 is manipulated to input the names of editing programs (word processing program and display output program). Then, the word processing program and display program are read from the file of the floppy disc into the D-RAM 821 of the system control 80 and practiced. The operator is now ready to prepare or correct a document.

The operator, watching the character display 20, manipulates the keyboard 10 to input a desired file name to designate a format so that the desired file is displayed on the character display 20. Thereafter, the operator manipulates various keys such as the graphic character keys and form control keys, causing the character display 20 to display the input text and form thereon. The operator is now allowed to prepare or correct a document on the character display 20.

After the preparation or correction of the document, the operator depresses the EOF key on the keyboard 10 to file various data concerned with the document in the floppy disc.

(3) Transmission of Document (STEPS 13-19)

The operator decides whether or not to transmit the document filed in the floppy disc and, if not, replaces the floppy disc with another which has filed a desired document. As the operator depresses the transmission (SEND ↵ ) keys on the keyboard 10, the CCU transmission program is read out into the D-RAM 821 of the system control 80 and practiced. The operator, watching the character display 20, manipulates the keyboard 10 to input the file name and addressee's dial number, so that the desired document is transmitted to the addressee or remote terminal unit.

(4) Document Printing (STEPS 20-24)

The operator decides whether or not to print out the document filed in the loaded floppy disc and, if not, replaced with another which has filed a desired document. The operator then depresses the print (PRINT ↵ ) keys to cause the print output program to be read out into the D-RAM 821 of the system control 80 and practiced. Finally, the operator inputs the file name through the keyboard 10 while watching the character display 20, the document thus being printed out on a sheet.

The terminal device discussed above is furnished with a first power source for supplying power to the keyboard 10, character display 20, system control 80 and external storage 50 which are adapted for local work such as word processing, and a second power source for supplying power to the printer 30, communication control 60 and line connector 70 which are adapted for communication. While the first power source powers the associated equipments only when local work is to be done, the second power source constantly powers the associated equipments for communication. With this arrangement, the terminal device of the present invention insures the communicating function all through the day, saves power consumption and remarkably prolongs the service life of each equipment.

In summary, it will be seen that the present invention provides a communication terminal device which achieves excellent operationability, reliability, durability and high speed operation while finding a wider range of application, in both the editing and communicating functions.

Various modifications will become possible for those skilled in the art after receiving the teachings of the present disclosure without departing from the scope thereof. For example, apart from the international communication, the terminal device may be constructed to accommodata the use of Japanese, for example, or to serve as a videotex or to have both the functions mentioned. The constructions of the keyboard 10, character display 20, thermal printer 30, external storage 50, communication control 60, line connector 70 are not limited to those shown and described but may be replaced with others.

TABLE 1

| | (1) IN F0 | | (4) OUT F3 |
|---|---|---|---|
| D₀ | KB | DATA 1 | Control Word Reg · A = 90 |
| D₁ | KB | DATA 2 | (5) IN F9 |
| D₂ | KB | DATA 3 | D₇ KB DELETE |
| D₃ | KB | DATA 4 | (6) OUT F9 |
| D₄ | KB | DATA 5 | D₅ KB DONE CLEAR |
| D₅ | KB | DATA 6 | (7) IN F8 . . . Unused |
| D₆ | KB | DATA 7 | R × D REAR |
| D₇ | KB | DATA 8 | (8) IN F9 |
| | (2) OUT F1 | | STATUS READ |
| D₀ | 10 | LED ON | (9) OUT F8 |
| D₁ | 12 | LED ON | R × D, MODE INSTRUCTION |
| D₂ | 15 | LED ON | WRITE |
| D₃ | 1 | LED ON | (10) OUT F9 |
| D₄ | 15 | LED ON | COMMAND INSTRUCTION |

TABLE 1-continued

| D₅ | 2 | LED ON | CONTROL WRITE |
|---|---|---|---|
| D₆ | xxx | LED ON | |
| D₇ | x | LED ON | |
| | (3) OUT F2 | | |
| D₀ | SYMB LED ON | | |
| D₁ | DIAC LED ON | | |
| D₂ | TELEX LED ON | | |
| D₃ | JUSTI LED ON | | |
| D₄ | | | |
| D₅ | | | |
| D₆ | | | |
| D₇ | BUZZER ON | | |

TABLE 2

| Basic Character | Acute | Gravity | Circumflex | Diaeresis Umlaut | Nasal | Carron | Breve | Double Acute | Ring | Dot | Macron | Cedilla | Ogonek |
|---|---|---|---|---|---|---|---|---|---|---|---|---|---|
| aA | áÁ | àÀ | âÂ | äÄ | ãÃ | | ǎĂ | | åÅ | | āĀ | | ąĄ |
| bB | | | | | | | | | | | | | |
| cC | ćĆ | | ĉĈ | | | čČ | | | | ċĊ | | çÇ | |
| dD | | | | | | ďĎ | | | | | | | |
| eE | éÉ | èÈ | êÊ | ëË | | ěĚ | | | | ėĖ | ēĒ | | ęĘ |
| fF | | | | | | | | | | | | | |
| gG | ǵ | | ĝĜ | | | | ğĞ | | | ġĠ | | ģ | |
| hH | | | ĥĤ | | | | | | | | | | |
| iI | íÍ | ìÌ | îÎ | ïÏ | ĩĨ | | | | | i | īĪ | | įĮ |
| jJ | | | ĵĴ | | | | | | | | | | |
| kK | | | | | | | | | | | | kK̦ | |
| lL | ĺĹ | | | | | ľĽ | | | | | | ļĻ | |
| mM | | | | | | | | | | | | | |
| nN | ńŃ | | | | ñÑ | ňŇ | | | | | | ņŅ | |
| oO | óÓ | òÒ | ôÔ | öÖ | õÕ | | | őŐ | | | ōŌ | | |
| pP | | | | | | | | | | | | | |
| qQ | | | | | | | | | | | | | |
| rR | ŕŔ | | | | | řŘ | | | | | | ŗŖ | |
| sS | śŚ | | ŝŜ | | | šŠ | | | | | | şŞ | |
| tT | | | | | | ťŤ | | | | | | ţŢ | |
| uU | úÚ | ùÙ | ûÛ | üÜ | ũŨ | | ŭŬ | űŰ | ůŮ | | ūŪ | | ųŲ |
| vV | | | | | | | | | | | | | |
| wW | | | ŵŴ | | | | | | | | | | |
| xX | | | | | | | | | | | | | |
| yY | ýÝ | | ŷŶ | ÿŸ | | | | | | | | | |
| zZ | źŹ | | | | | žŽ | | | | żŻ | | | |

TABLE 3

| | Input Code | Key | Output Code |
|---|---|---|---|
| 1 | 7B | Ä(ä) | 7B |
| 2 | 7C | Ö(ö) | 7D |
| 3 | 7D | Ü(ü) | 7E |
| 4 | 5B | ÄSF(Ä) | 24 |
| 5 | 5C | ÖSF(Ö) | 5C |
| 6 | 5D | ÜSF(Ü) | 60 |
| 7 | 5E | β | 23 |

TABLE 4

| | Input Code | Key | Output Code |
|---|---|---|---|
| 1 | 24 | $ | 10, 10, 24 |
| | | | ∧P∧P <$> |
| 2 | 23 | # | 10, 10, 26 |
| 3 | 3C | § | 10, 10, 27 |
| | | | <§> |
| 4 | 3E | ' | 10, 10, 30 |
| 5 | 60 | 2 | 10, 10, 32 |
| | | | <2> |
| 6 | 7E | 3 | 10, 10, 33 |
| | | | <3> |
| 7 | 40 | μ | 10, 10, 35 |
| | | | <μ> |

TABLE 5

| Input Code | Key | Output Code |
|---|---|---|
| 1 | 9E | ⬩ 10, 10, 41 ∧P∧P<⬩> |
| 2 | 9F | ⬩ 10, 10, 42 <⬩> |

TABLE 6

| Input Code | Key | Output Code |
|---|---|---|
| 1 | 8B | LHM | ∧OL |
| 2 | 8C | RHM | ∧OR |
| 3 | 8D | + TAB | ∧OI |
| 4 | 8E | − TAB | ∧·ON |
| 5 | 9D | ⊟ | ∧QR |
| 6 | 9C | ⊡ | ∧QE |
| 7 | 9B | CENTE | ∧OC |
| 8 | 99 | SEARC | ∧QF |
| 9 | 9A | MERGE | ∧KR |
| 10 | 83 | ↔ | ∧OX |
| 11 | 8F | EOF | ∧KD |
| 12 | 98 | PRINT | R PRINT↵ |
| 13 | 97 | SEND | R SEND↵ |

TABLE 7

| Input Code | Key | Output Code |
|---|---|---|
| 1 | 85 | 10 | ·CWΔ12↵ |
| 2 | 86 | 12 | ·CWΔ10↵ |
| 3 | 87 | 15 | ·CWΔ8↵ |
| 4 | 88 | 1 | ·LHΔ8↵ |
| 5 | 89 | 1.5 | ·LHΔ12↵ |
| 6 | 8A | 2 | ·LHΔ16↵ |

TABLE 8

| Input Code | Key | Output Code |
|---|---|---|
| 1 | 96 | CHAR | ∧G |
| 2 | 95 | WORD | ∧T |
| 3 | 94 | LINE | ∧Y |
| 4 | 93 | BLOCK | ∧KY |

TABLE 9

| Control Code | Received Data | Display | Remarks |
|---|---|---|---|
| PLD | ∧V (5 EH, 56 H) | ∧V | Subscript start/end |
| PLU | ∧T (5 EH, 54 H) | ∧T | Superscript start/end |
| SUB | SUB (1 AH) | ? (3 FH) | |
| CSI, 0, SP, J | ··PFS SP 0 | ··PFS⌣0 | Longitudinal B.P.F. |
| CSI, 1, SP, J | ··PFS SP 1 | ··PFS⌣1 | Transverse B.P.F. |
| CSI, 0, SP, K | ·CW SP 12 | ·CW⌣12 | Horizontal space 1/10" |
| CSI, 1, SP, K | ·CW SP 10 | ·CW⌣10 | Horizontal space 1/12" |
| CSI, 2, SP, K | ·CW SP 8 | ·CW⌣8 | Horizontal space 1/15" |
| CSI, 0, SP, L | ·LH SP 8 | ·LH 8 | Vertical space 1/6" |
| CSI, 1, SP, L | ·LH SP 12 | ·LH⌣12 | Vertical space 1/4" |
| CSI, 2, SP, L | ·LH SP 16 | ·LH 16 | Vertical space 1/3" |
| CSI, 3, SP, L | ·LH SP 4 | ·LH⌣4 | Vertical space 1/12" |

TABLE 10

| Line No. | Hexa Code | Character | Line No. | Hexa Code | Character |
|---|---|---|---|---|---|
| 1 | 20 | SP | 18 | 31 | 1 |
| 2 | 21 | ! | 19 | 32 | 2 |
| 3 | 22 | " | 20 | 33 | 3 |
| 4 | 23 | β | 21 | 34 | 4 |
| 5 | 24 | Ä | 22 | 35 | 5 |
| 6 | 25 | % | 23 | 36 | 6 |
| 7 | 26 | & | 24 | 37 | 7 |
| 8 | 27 | ' | 25 | 38 | 8 |
| 9 | 28 | ( | 26 | 39 | 9 |
| 10 | 29 | ) | 27 | 3A | : |
| 11 | 2A | * | 28 | 3B | ; |
| 12 | 2B | + | 29 | 3C | < |
| 13 | 2C | , | 30 | 3D | = |
| 14 | 2D | − | 31 | 3E | > |
| 15 | 2E | . | 32 | 3F | ? |
| 16 | 2F | / | 33 | 40 | @ |
| 17 | 30 | 0 | 34 | 41 | A |

TABLE 11

| Column No. | Hexa Code | Character | Column No. | Hexa Code | Character | Column No. | Hexa Code | Character | Column No. | Hexa Code | Character | Column No. | Hexa Code | Character |
|---|---|---|---|---|---|---|---|---|---|---|---|---|---|---|
| 1 | 20 | SP | 17 | 30 | 0 | 33 | 40 | @ | 49 | 50 | P | 65 | 60 | ù |
| 2 | 21 | ! | 18 | 31 | 1 | 34 | 41 | A | 50 | 51 | Q | 66 | 61 | a |
| 3 | 22 | " | 19 | 32 | 2 | 35 | 42 | B | 51 | 52 | R | 67 | 62 | b |
| 4 | 23 | β | 20 | 33 | 3 | 36 | 43 | C | 52 | 53 | S | 68 | 63 | c |
| 5 | 24 | Ä | 21 | 34 | 4 | 37 | 44 | D | 53 | 54 | T | 69 | 64 | d |
| 6 | 25 | % | 22 | 35 | 5 | 38 | 45 | E | 54 | 55 | U | 70 | 65 | e |
| 7 | 26 | & | 23 | 36 | 6 | 39 | 46 | F | 55 | 56 | V | 71 | 66 | f |
| 8 | 27 | ' | 24 | 37 | 7 | 40 | 47 | G | 56 | 57 | W | 72 | 67 | g |
| 9 | 28 | ( | 25 | 38 | 8 | 41 | 48 | H | 57 | 58 | X | 73 | 68 | h |
| 10 | 29 | ) | 26 | 39 | 9 | 42 | 49 | I | 58 | 59 | Y | 74 | 69 | i |
| 11 | 2A | * | 27 | 3A | : | 43 | 4A | J | 59 | 5A | Z | 75 | 6A | j |
| 12 | 2B | + | 28 | 3B | ; | 44 | 4B | K | 60 | 5B | [ | 76 | 6B | k |
| 13 | 2C | , | 29 | 3C | < | 45 | 4C | L | 61 | 5C | Ö | 77 | 6C | l |
| 14 | 2D | − | 30 | 3D | = | 46 | 4D | M | 62 | 5D | ] | 78 | 6D | m |
| 15 | 2E | . | 31 | 3E | > | 47 | 4E | N | 63 | 5E |   | 79 | 6E | n |
| 16 | 2F | / | 32 | 3F | ? | 48 | 4F | O | 64 | 5F | — | 80 | 6F | o |

TABLE 12

| Received Character Code | Function | Post-Process Mode |
|---|---|---|
| Neglected Control Code | Null | ESC |
| BS | Backspace | ESC |
| HT | Tab | ESC |
| NL | New line | Normal |
| CR, LF | Return, Line feed | ESC |
| FF | Screen clear | Normal |
| ESC | ESC Sequence | ESC |
| Character code with no function specified | Null | Normal |
| Undefined Character Code | Null | ESC |

TABLE 12-continued

| Received Character Code | Function | Post-Process Mode |
|---|---|---|
| A. | Cursor up control null | Normal |
| B. | Cursor down control | Normal |
| C. | Cursor forward control | Normal |
| D. | Cursor backward control | Normal |
| H. | Cursor home control | Normal |
| E. | Screen clear | Normal |
| I. | Read cursor address | Normal |
| J. | Screen erase | Normal |
| K. | Line erase | Normal |
| Y. | Cursor addressing | Normal |
| P. | Character normal display | Normal |
| Q. | Character blink display | Normal |
| R. | Character inverted display | Normal |
| U.V. | self-diagnosis | Normal. |

One of NL and CR.LF is employed according to the designation.

TABLE 13

| No. | Wordstar Code | Display Output |
|---|---|---|
| 1 | BS ( ^H) | BS (^H) |
| 2 | LF | LF |
| 3 | FF | FF |
| 4 | CR | CR |
| 5 | SUB | SUB |
| 6 | ESC | ESC |
| 7 | ^S | ^S |
| 8 | ^W | ^W |
| 9 | ^P O | $D_7$ of character in O made 1 |
| 10 | Control codes other than 1-9 | No output |
| 11 | All dot command | Output intact |

TABLE 14

| No. | Wordstar Code | Terminal Device Code | Remarks |
|---|---|---|---|
| 1 | ^S | CSI + 4 + m | Underline start |
| 2 | ^B | ESC + B | Bold start/end |
| 3 | ^D | ESC + D | Double strike start/end |
| 4 | ^X | ESC + X | Strike out start/end |
| 5 | ^V | PLD | Partial down start/Partial up end |
| 6 | ^T | PLU | Partial line up start/partial line down end |
| 7 | ^Y | ESC + Y | Ribbon lift start/end |
| 8 | ^C | ^C | Upon detection of ^C, printer output program is stopped and restarted by operator's (SP) key strike |
| 9 | ^A | CSI + 1 + SP + K | Specify 1/12" character pitch |
| 10 | ^N | CSI + 0 + SP + K | Specified 1/10" character pitch |
| 11 | ^K | Null | Neglect and omit this code |
| 12 | ^F | Null | Same as above |

TABLE 15

| No. | Wordstar Code | Terminal Device Code | Remarks |
|---|---|---|---|
| 13 | G | Null | Neglect and omit this code |
| 14 | O | Null | Same as above |
| 15 | H | BS | Backspace |
| 16 | Q | RLF | Reverse line feed |
| 17 | W | CSI + 0 + m | Underline end |
| 18 | E | ESC + E | Auto-paper cut |
| 19 | R | ESC + R | Restore |
| 20 | L | FF | Form feed |
| 21 | M | CR | Carriage return |
| 22 | J | LF | Line feed |
| 23 | ·LH n | CSI + Pn + SP + L | Interline pitch designation<br>n = 4→Pn = 3 (12 line/in)<br>n = 8→Pn = 0 (6 line/in)<br>n = 12→Pn = 1 (4 line/in)<br>n = 16→Pn = 2 (3 line/in)<br>Default value Pn = 0 |
| 24 | ·PL n | Null | Neglect and omit this code |
| 25 | ·MT n | Null | Same as above |
| 26 | ·MB n | Null | Same as above |
| 27 | ·HM n | Null | Same as above |
| 28 | ·FM n | Null | Same as above |
| 29 | ·PC n | Null | Same as above |
| 30 | ·PO n | Null | Same as above |
| 31 | ·PA | FF | Form feed |
| 32 | ·CP n | Null | Neglect and omit this code |
| 33 | ·HE | Null | Same as above |
| 34 | ·FO | Null | Same as above |
| 35 | ·OP | Null | Same as above |

TABLE 16

| No. | Wordstar Code | Terminal Device Code | Remarks |
|---|---|---|---|
| 36 | ·PN ↵ | Null | Neglect and omit this code |
| 37 | ·PN n↵ | Null | Same as above |
| 38 | ·CW n↵ | CSI + Pn + SP + L | Character pitch designation<br>n = 12→Pn = 0 (10/in)<br>n = 10→Pn = 1 (12/in)<br>n = 8→Pn = 2 (15/in)<br>Default value Pn = 0 |
| 39 | ·SR n ↵ | Null | Neglect and omit this code |
| 40 | ·UJ OFF ↵<br>(or·UJ 0↵) | ESC + J | Microjustify off<br>Thermal printer non-effective<br>Daisy printer effective |
| 41 | ·UJ ON↵<br>(or·UJ 1↵) | ESC + K | Microjustify on<br>Thermal printer non-effective<br>Daisy printer effective |
| 42 | ·BP OFF↵<br>(or·BP 0↵) | ESC + P | Bidirection print off |
| 43 | ·BP ON<br>(or·BP Select) | ESC + Q | Bidirection print on |
| 44 | ·IG text↵<br>(or··text↵) | Null | In response to this code, remaining text on the line inclusive of the code is |

TABLE 16-continued

| No. | Wordstar Code | Terminal Device Code | Remarks |
|---|---|---|---|
| 45 | ‥PFS 0↲ | CSI + 0 + SP + J | not delivered select longitudinal page format |
| 46 | ‥PFS 1↲ | CSI + 1 + SP + J | Select transverse page format |

TABLE 17

| | |
|---|---|
| Command Header | 1 byte ('C' ... Character C) |
| Function No. | 1 byte |
| Parameter | n byte (sometimes n = 0) |

TABLE 18

| | |
|---|---|
| Response Headet | 1 byte ('R') |
| Function No. | 1 byte |
| Parameter | n byte (sometimes n = 0) |

TABLE 19

| | |
|---|---|
| Response Heater | 'R' |
| Function No. | 'C' |

TABLE 20

| No. | Function | Command | Response | Remarks |
|---|---|---|---|---|
| 1 | Document Send | 'C' | | |
| | | '1' | | |
| | | | 'R' | |
| | | | '1' | |
| | | Document Code train | | |
| | | 1 AH | | |
| | | | 'R' | |
| | | | '1' | |
| | | | 'n' | |
| | | | n = 0 | Transmission Complete |
| | | | n = 1 | Character Improper |
| | | | n = 2 | Dial number |

TABLE 21

| No. | Function | Command | Response | Remarks |
|---|---|---|---|---|
| 2 | Document Receive | | 'R' | Recieve by Interrupt |
| | | | '2' | |
| | | 'C' | | |
| | | '2' | | |
| | | 'n' | | |
| | | n = P | | Printer Output |
| | | n = F | | File Output |
| | | n = C | | Cancel |
| | | | 'R' | |
| | | | '2' | |
| | | Document Code train | | |
| | | 1 AH | | |
| 3 | Real Time Clock Set | 'C' | | |
| | | '3' | | |
| | | | 'R' | |
| | | | '3' | |
| | | Y 10 | | |
| | | Y 1 | | |
| | | MO 10 | | |
| | | MO 1 | | |
| | | D 10 | | Terminal device Code |
| | | D 1 | | |
| | | H 10 | | |
| | | H 1 | | |
| | | MI 10 | | |

TABLE 21-continued

| No. | Function | Command | Response | Remarks |
|---|---|---|---|---|
| | | MI 1 | | |

TABLE 22

| No. | Function | Command | Response | Remarks |
|---|---|---|---|---|
| 4 | Real Time Clock Read | 'C' | | |
| | | '4' | | |
| | | | 'R' | |
| | | | '4' | |
| | | | Y 10 | |
| | | | Y 1 | |
| | | | MO 10 | |
| | | | MO 1 | |
| | | | D 10 | Terminal unit Code |
| | | | D 1 | |
| | | | H 10 | |
| | | | H 1 | |
| | | | MI 10 | |
| | | | MI 1 | |
| 5 | Self-Text | 'C' | | Used under Offline |
| | | '5' | | |
| | | | 'R' | |
| | | | '5' | |
| | | | 'n' | |
| | | | n = 0 | Test Complete |
| | | | n = 1 | Error |
| | Cancel Response | | 'R' | |
| | | 'C' | | |

What is claimed is:

1. A terminal device for preparing a document and communicating data, comprising:

input means for inputting prepared document data, format data and control data which are necessary for document preparation, document transmission and system control;

display means for displaying data which are necessary for document preparation;

print means for printing prepared document data and received document data;

external storage means for storing prepared document data and received document data;

communication control means for receiving document data and controlling transmission and reception of document data, the communication control means having a memory for storing prepared document data for transmission and received document data; and system control means having a supervisor program for alternately executing an operating system program for outputting the received document data from said memory to the print means and to the external storage means and a communications control program for storing the prepared document data and the received document data in the memory, the supervisor program controlling the operating system program and the communications control program in such a manner that received document data can be alternately output from said memory to the print means and to the external storage means simultaneously with document preparation using the input means and the display means; and stored in said memory simultaneously with document preparation using the input means and the display means.

2. A terminal device as claimed in claim 1, in which the system control means further comprises means for sensing an unavailable condition of the print means and the external storage means and inhibiting the operating system program from outputting the received document data from said memory to the print means or to the external storage means in response thereto.

3. A terminal device as claimed in claim 1, further comprising a first power source for supplying power to the input means, display means, external storage means and system control means only during use of the aforesaid means, and a second power source for supplying power to the communication control means and to the printer means at all times.

4. A terminal device for preparing a document and communicating document data, comprising:
keyboard means for inputting data constituting a prepared document;
communication means for receiving data constituting a received document;
display means for displaying a prepared or received document;
storage means for storing a prepared or received document;
printing means for printing a prepared or received document; and
first control means for controlling the keyboard means, display means, storage means and printing means to input, display, store and print a document;
the communication means comprising first memory means and second control means for storing a received document independently of the operation of the first control means, the second control means feeding a signal to the first control means upon reception and storage of a received document in the first memory means;
the first control means further comprising third control means for, in response to said signal, sensing for an available status of at least one of the storage means and the printing means and, in response to said available status, transferring the received document to at least one of the available storage means and printing means for storage and printing respectively;
whereby data constituting a received document may be received and stored by the communication means while data constituting a prepared document is being input and displayed by the keyboard means and display means respectively.

5. A terminal device as claimed in claim 4, in which the first control means comprises first computing means, the third control means comprising communication reception program means, the first computing means controlling the third control means to transfer the received document to the storage means and printing means under control of the communication reception program means.

6. A terminal device as claimed in claim 5, in which the communication reception program means comprises second memory means for storing a communication reception program.

7. A terminal device as claimed in claim 6, in which the storage means comprises removable storage media means on which the communication reception program is stored, the first control means comprising means for controlling the storage means to load the communication reception program from the removable storage media means into the second memory means upon startup of the terminal device.

8. A terminal device as claimed in claim 7, in which the second memory means comprises a first section for storing the communication reception program and a second section for temporarily storing a received document transferred thereto from the first memory means.

9. A terminal device as claimed in claim 4, in which the first control means comprises first computing means and operating system program means, the first computing means controlling the keyboard means, display means, storage means, printing means and third control means under control of the operating system program means.

10. A terminal device as claimed in claim 9, in which the operating system program means comprises second memory means for storing an operating system program.

11. A terminal device as claimed in claim 10, in which the storage means comprises removable storage media means on which the operating system program is stored, the first control means comprising means for controlling the storage means to load the operating system program from the removable storage media means into the second memory means upon startup of the terminal device.

12. A terminal device as claimed in claim 11, in which the second memory means comprises a first section for storing the operating system program and a second section for temporarily storing a received document transferred thereto from the first memory means.

13. A terminal device as claimed in claim 4, in which the communication means further comprises line interface means.

14. A terminal device as claimed in claim 13, in which the second control means comprises second computing means and communication control program means for controlling the communication control means to transmit and receive document data via the line interface means.

15. A terminal device as claimed in claim 14, in which the communication control program means comprises a read-only memory which stores a communication control program.

16. A terminal device as claimed in claim 4, in which the first control means comprises first computing means, the third control means further comprising communication transmission program means, the first computing means controlling the third control means to transfer a document from the storage means to the communication means for transmission under control of the communication transmission program means;
whereby data constituting a prepared document may be transferred from the storge means to the communication means and transmitted by the communication means while data constituting a prepared document is being input and displayed by the keyboard means and display means respectively.

17. A terminal device as claimed in claim 16, in which the communication transmission program means comprises second memory means for storing a communication transmission program.

18. A terminal device as claimed in claim 4, further comprising a first power source for constantly supplying power to the communication means, storage means and printing means; and a second power source for selectively supplying power to the keyboard means, display means and first control means for document preparation.

* * * * *